(12) United States Patent  (10) Patent No.: US 7,581,015 B2
Nakashima et al.  (45) Date of Patent: Aug. 25, 2009

(54) COMMUNICATION DEVICE HAVING TRANSMITTING AND RECEIVING UNITS SUPPORTS RDMA COMMUNICATION

(75) Inventors: Kota Nakashima, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 564 days.

(21) Appl. No.: 11/475,908

(22) Filed: Jun. 28, 2006

(65) Prior Publication Data

US 2006/0274748 A1 Dec. 7, 2006

(30) Foreign Application Priority Data

Mar. 24, 2006 (JP) ............... 2006-083185

(51) Int. Cl.
*G06F 15/16* (2006.01)
(52) U.S. Cl. ............... 709/230; 709/236; 709/237
(58) Field of Classification Search ............... 709/230, 709/231, 236, 237, 217, 212, 250; 713/151; 370/395

See application file for complete search history.

(56) References Cited

U.S. PATENT DOCUMENTS

| | | | | |
|---|---|---|---|---|
| 2003/0053462 A1* | 3/2003 | Garcia et al. | ............ | 370/394 |
| 2004/0073622 A1* | 4/2004 | McDaniel et al. | ............ | 709/212 |
| 2004/0193734 A1* | 9/2004 | Barron et al. | ............ | 709/250 |
| 2005/0108518 A1* | 5/2005 | Pandya | ............ | 713/151 |
| 2005/0223118 A1* | 10/2005 | Tucker et al. | ............ | 709/250 |
| 2006/0075057 A1* | 4/2006 | Gildea et al. | ............ | 709/212 |
| 2006/0075067 A1* | 4/2006 | Blackmore et al. | ............ | 709/217 |

FOREIGN PATENT DOCUMENTS

| | | |
|---|---|---|
| JP | 2004-192179 | 7/2004 |
| JP | 2005-044353 | 2/2005 |

* cited by examiner

*Primary Examiner*—Le Luu
(74) *Attorney, Agent, or Firm*—Staas & Halsey LLP

(57) ABSTRACT

When a data transfer request is received, a transmitting-side NIC generates an RDMA packet from transfer data and speculatively transmits it without inquiring the transfer destination about presence of reception permission. If reception of a receiving area is unpermitted, the RDMA packet is retransmitted when a retransmission request is received from the transfer destination. When transfer unpermission is determined by referencing transfer area control information upon packet reception, a receiving-side NIC discards the received packet and, if transfer permission is determined thereafter, transmits a retransmission request, thereby transferring it. If reception is unpermitted, that may be notified to the transmission source, thereby ceasing the transfer.

32 Claims, 55 Drawing Sheets

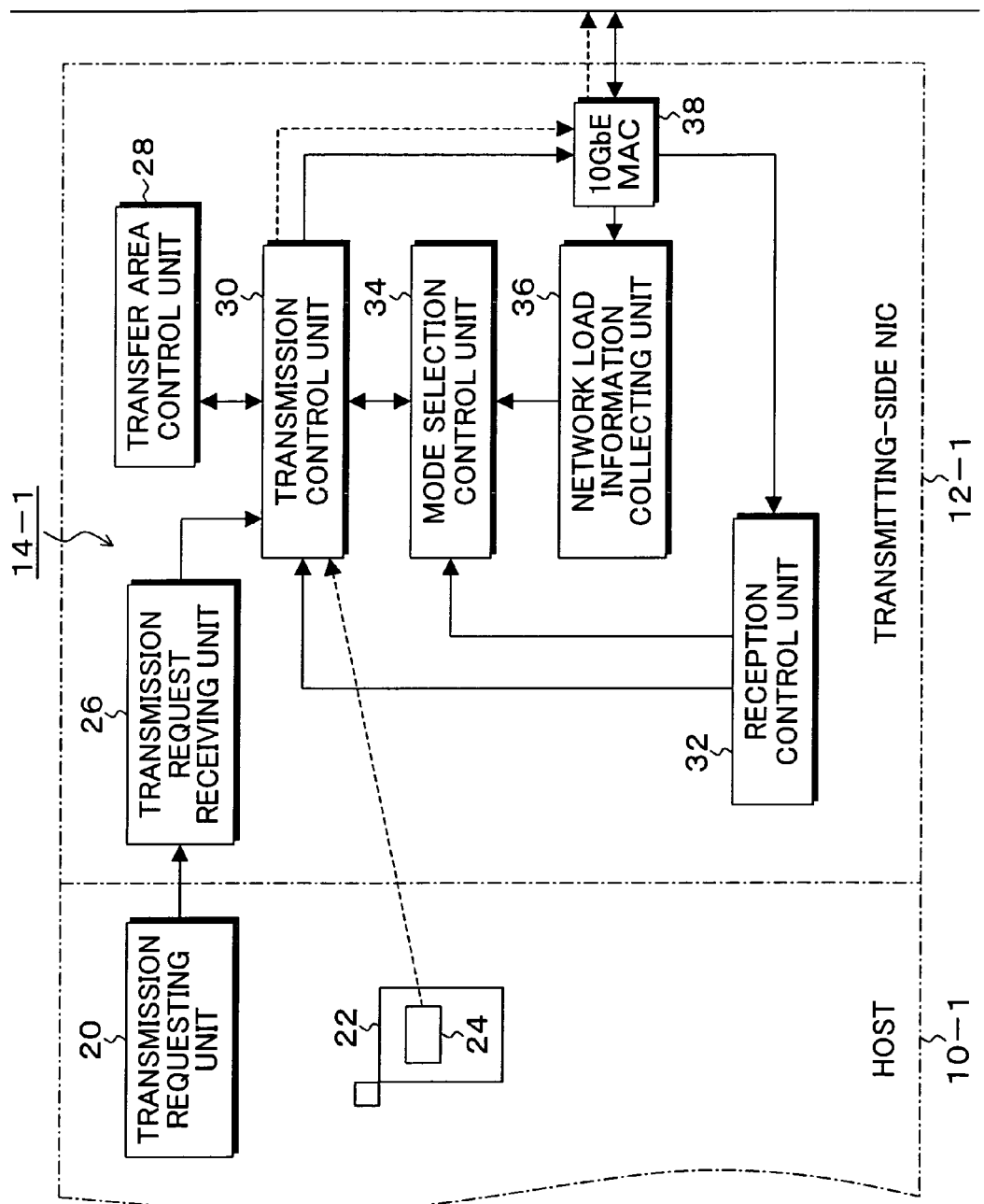

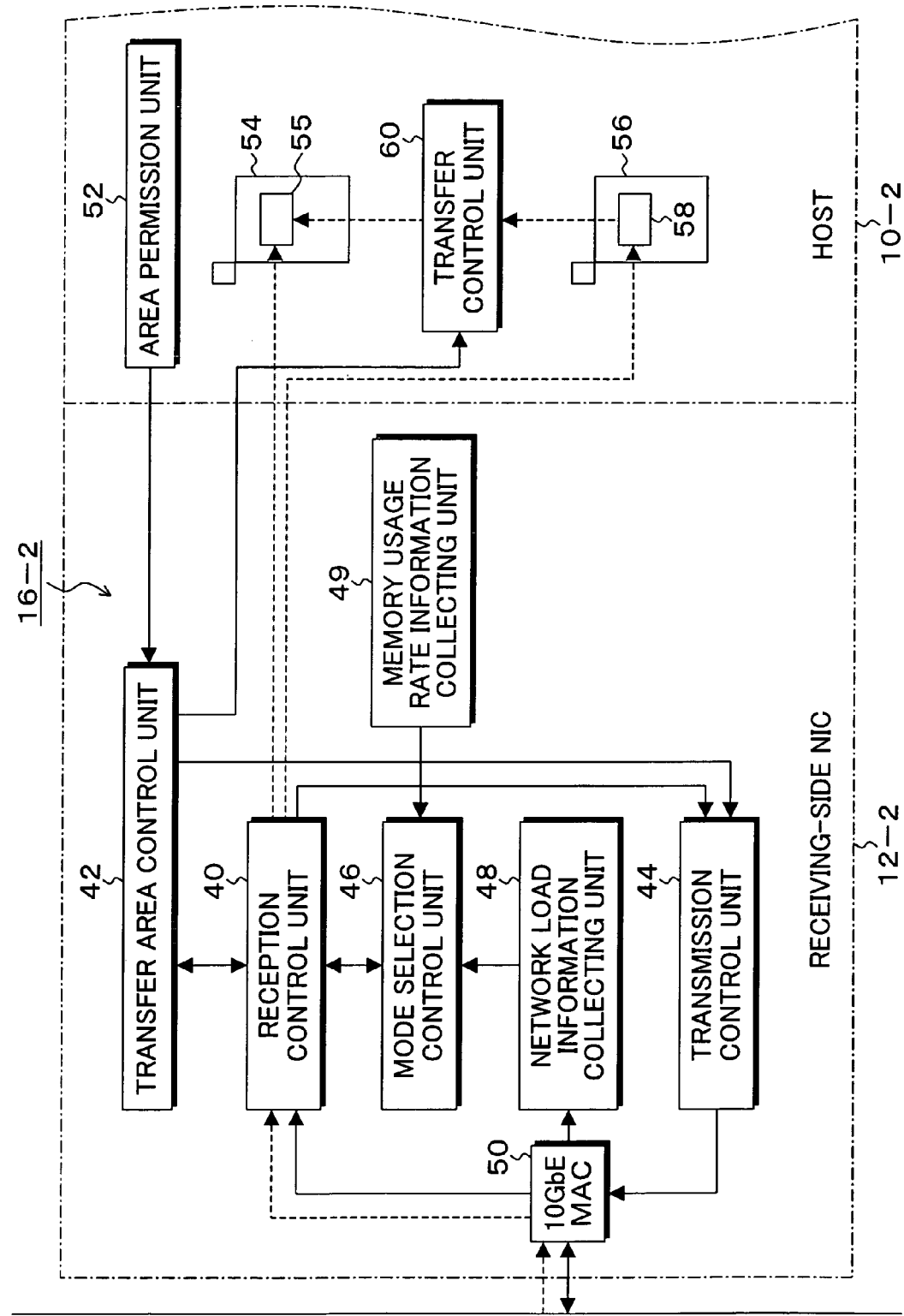

FIG. 3

| AREA ID 64 | LOGICAL ADDRESS 66 | PHYSICAL ADDRESS 68 | RECEPTION PERMISSION 70 | PACKET DISCARDING INFORMATION 72 | UNPERMITTED RECEPTION NOTIFYING INFORMATION 74 | TEMPORARY BUFFER ADDRESS 75 |
|---|---|---|---|---|---|---|
| 00 | 0x0000 | 0x3000 | 1 | | | |
| 01 | 0x1000 | 0x4000 | 1 | | | |
| 02 | 0x2000 | 0x5000 | 0 | | | |
| 03 | 0x3000 | 0x6000 | 1 | | | |
| 04 | 0x4000 | 0x7000 | 0 | | | |
| 05 | 0x5000 | 0x0000 | 0 | | | |
| 06 | 0x6000 | 0x8000 | 1 | | | |
| 07 | 0x7000 | 0x1000 | 1 | | | |
| 08 | 0x8000 | 0x2000 | 0 | | | |

62

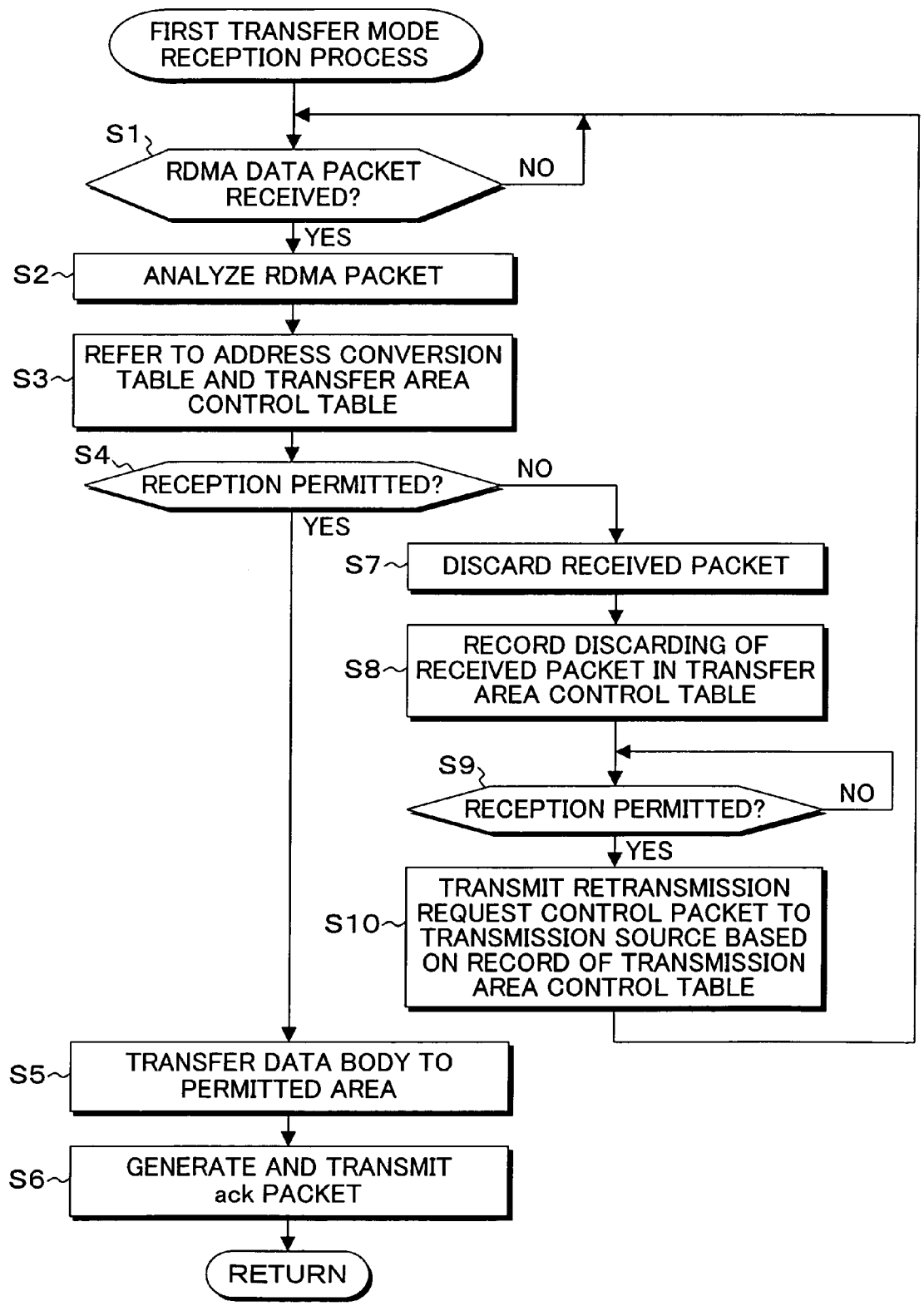

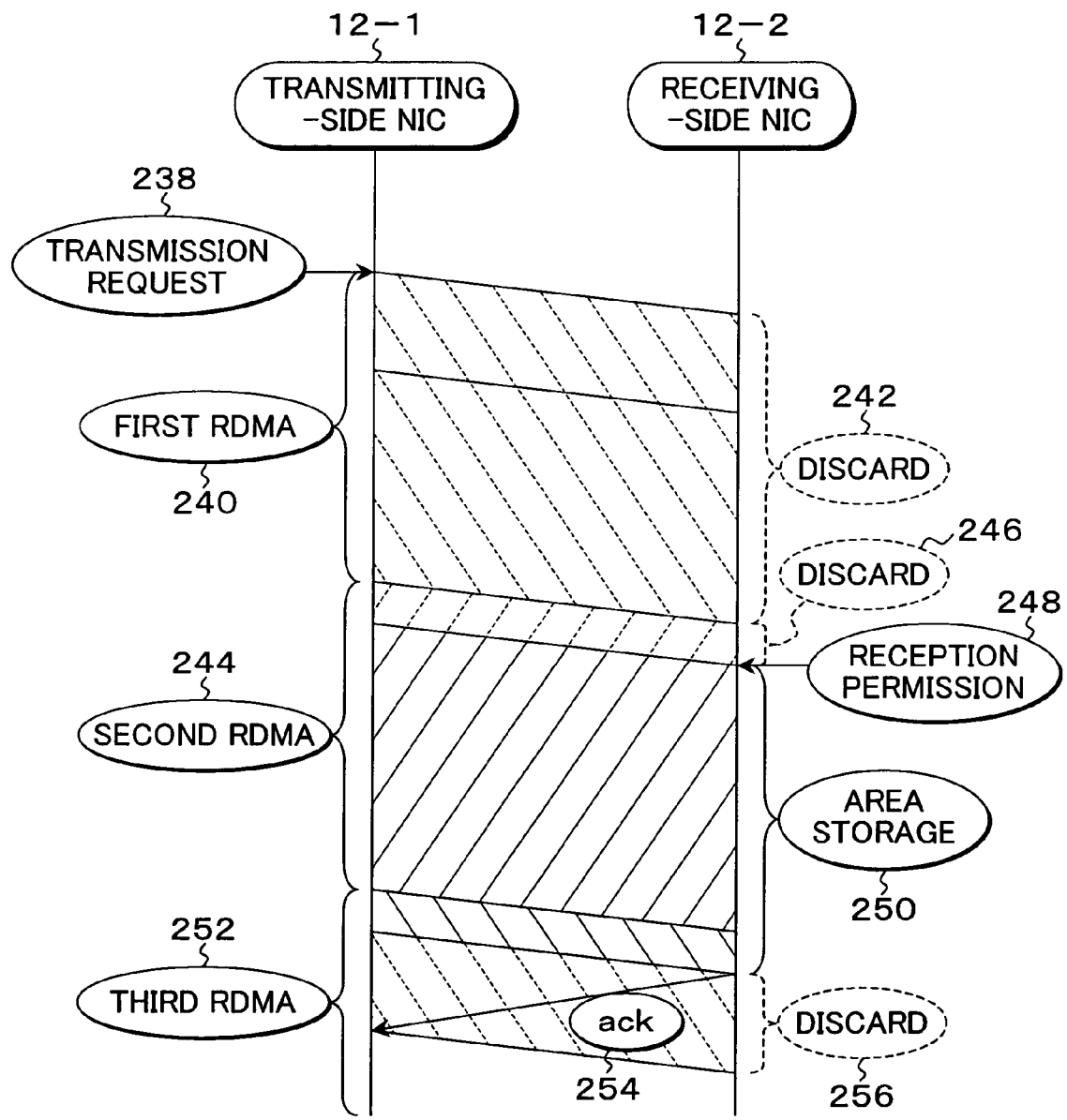

| VIRTUAL ADDRESS | PHYSICAL ADDRESS |
|---|---|
| ⋮ | ⋮ |
| 0x1000 | 0x3000 |
| ⋮ | ⋮ |
| 0x8000 | 0x6000 |
| ⋮ | ⋮ |

| VIRTUAL ADDRESS | PHYSICAL ADDRESS |
|---|---|
| ⋮ | ⋮ |
| 0x1000 | 0x6000 |
| ⋮ | ⋮ |
| 0x8000 | 0x3000 |
| ⋮ | ⋮ |

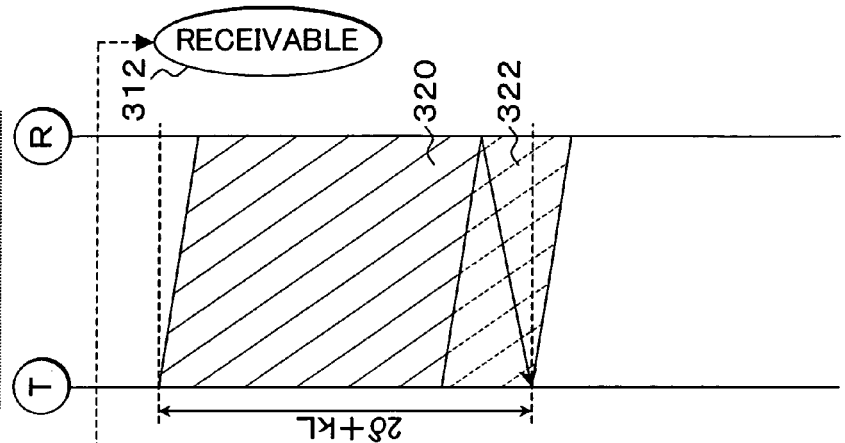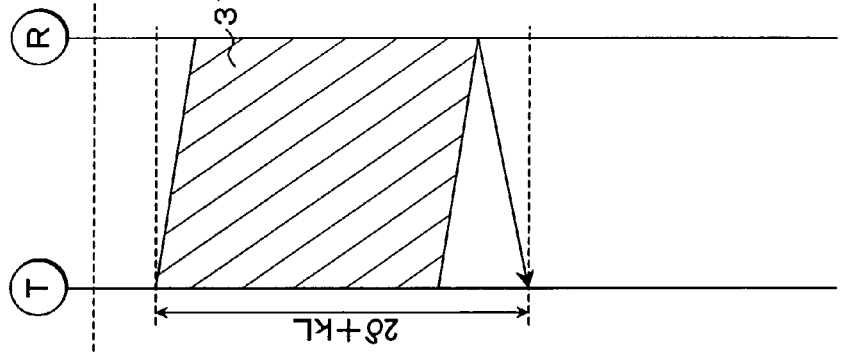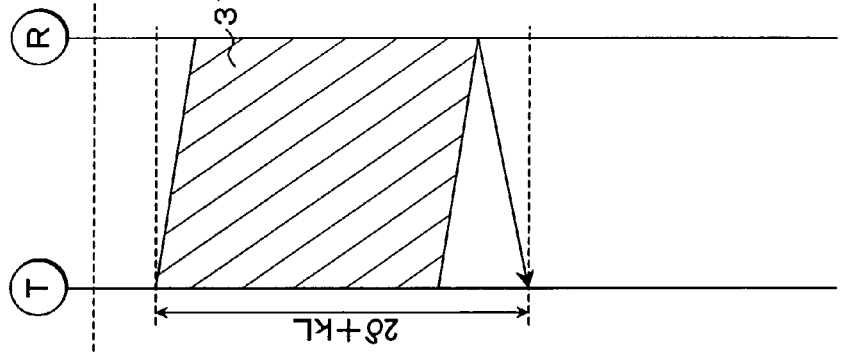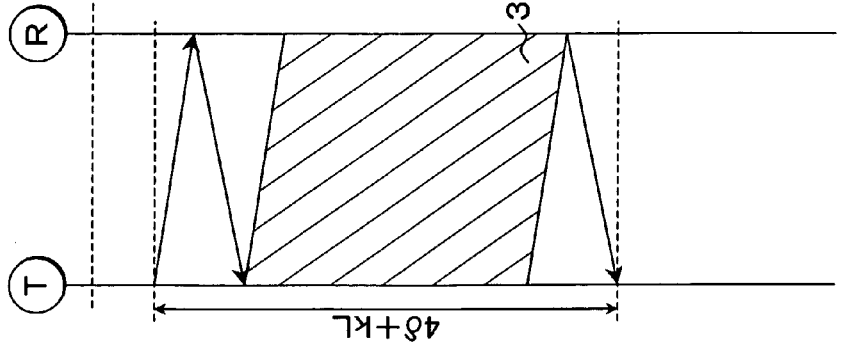

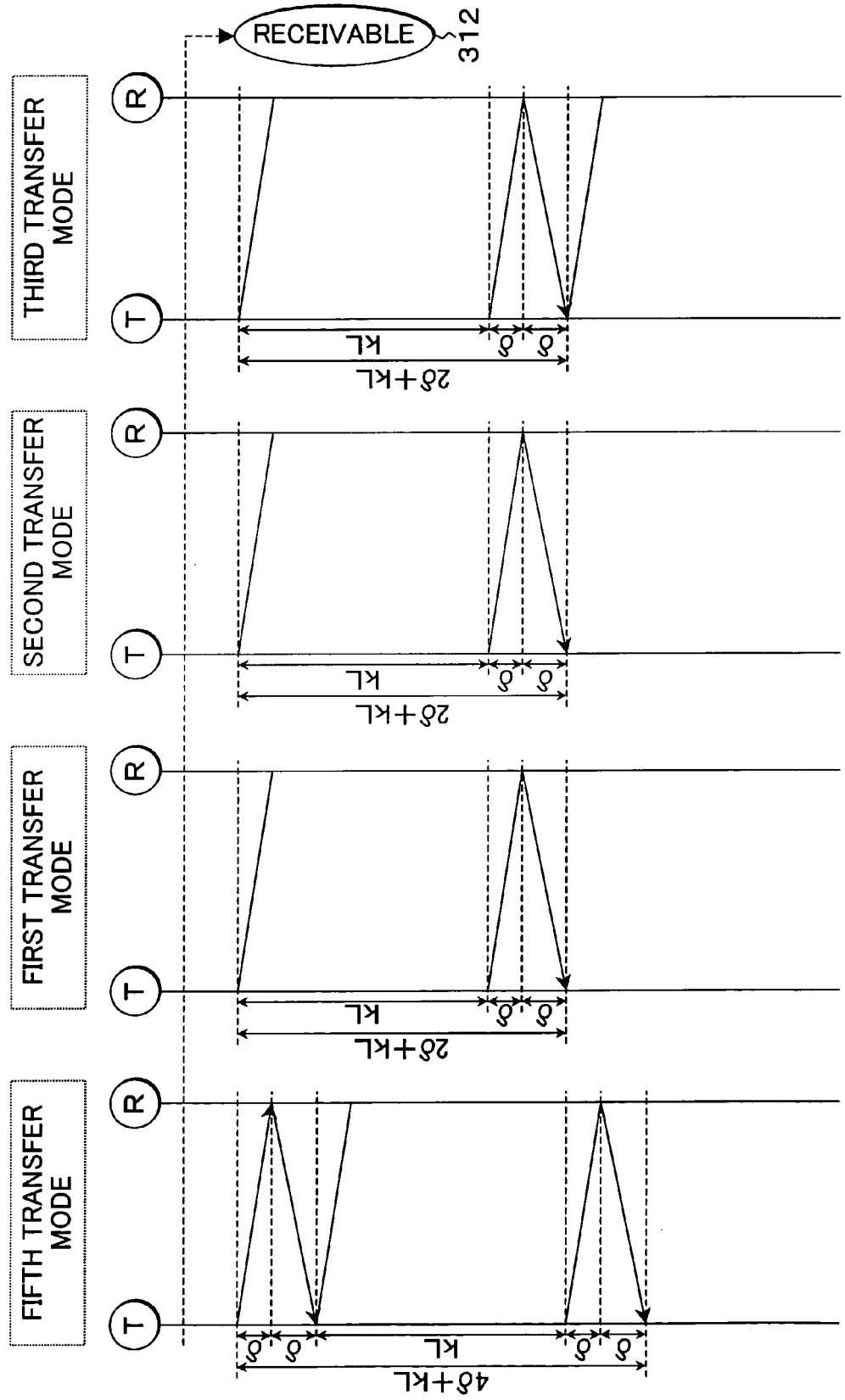

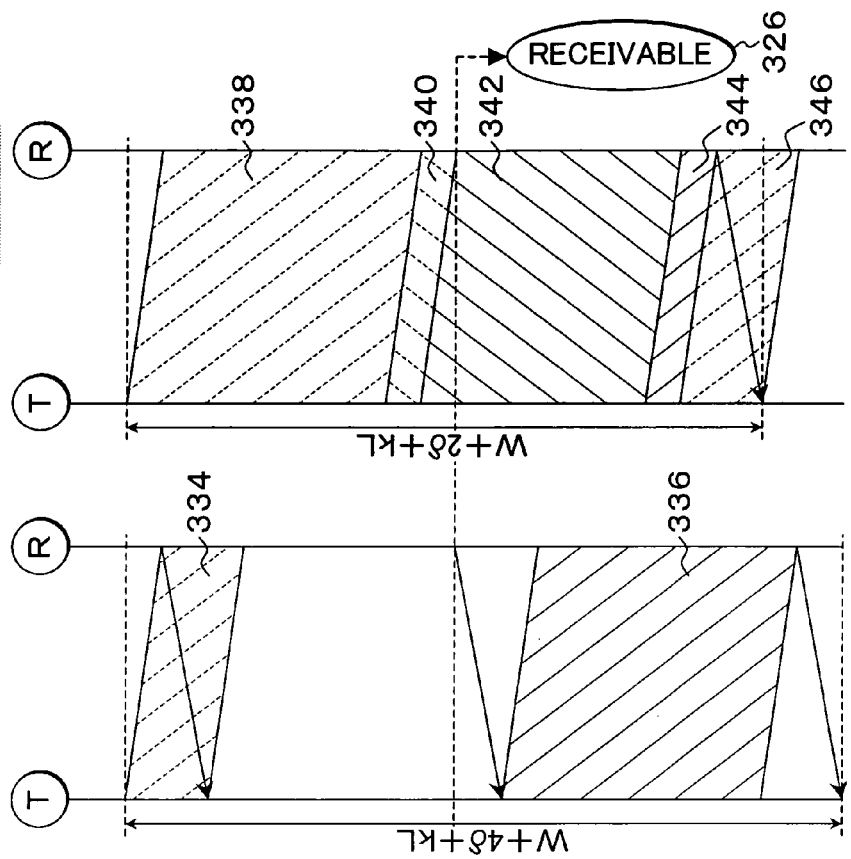
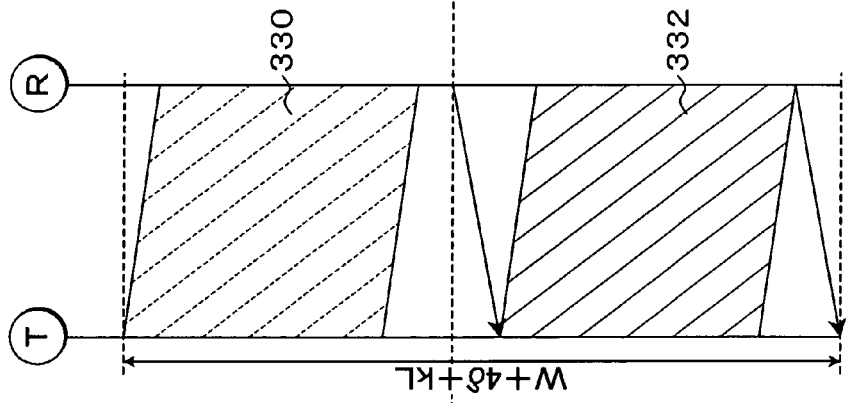
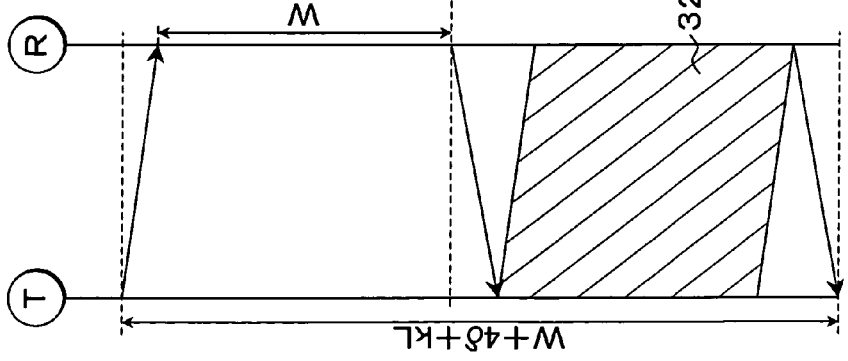

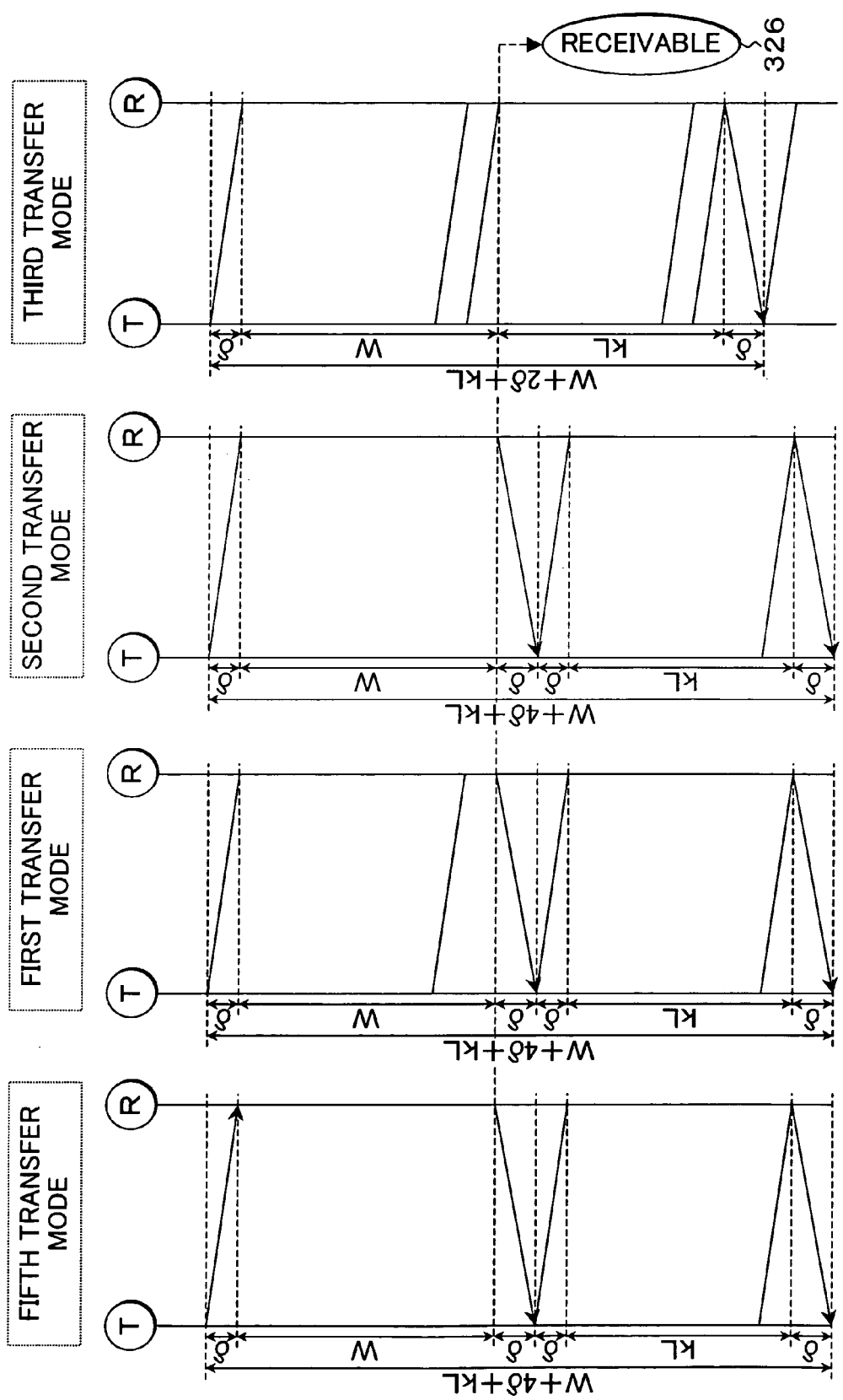

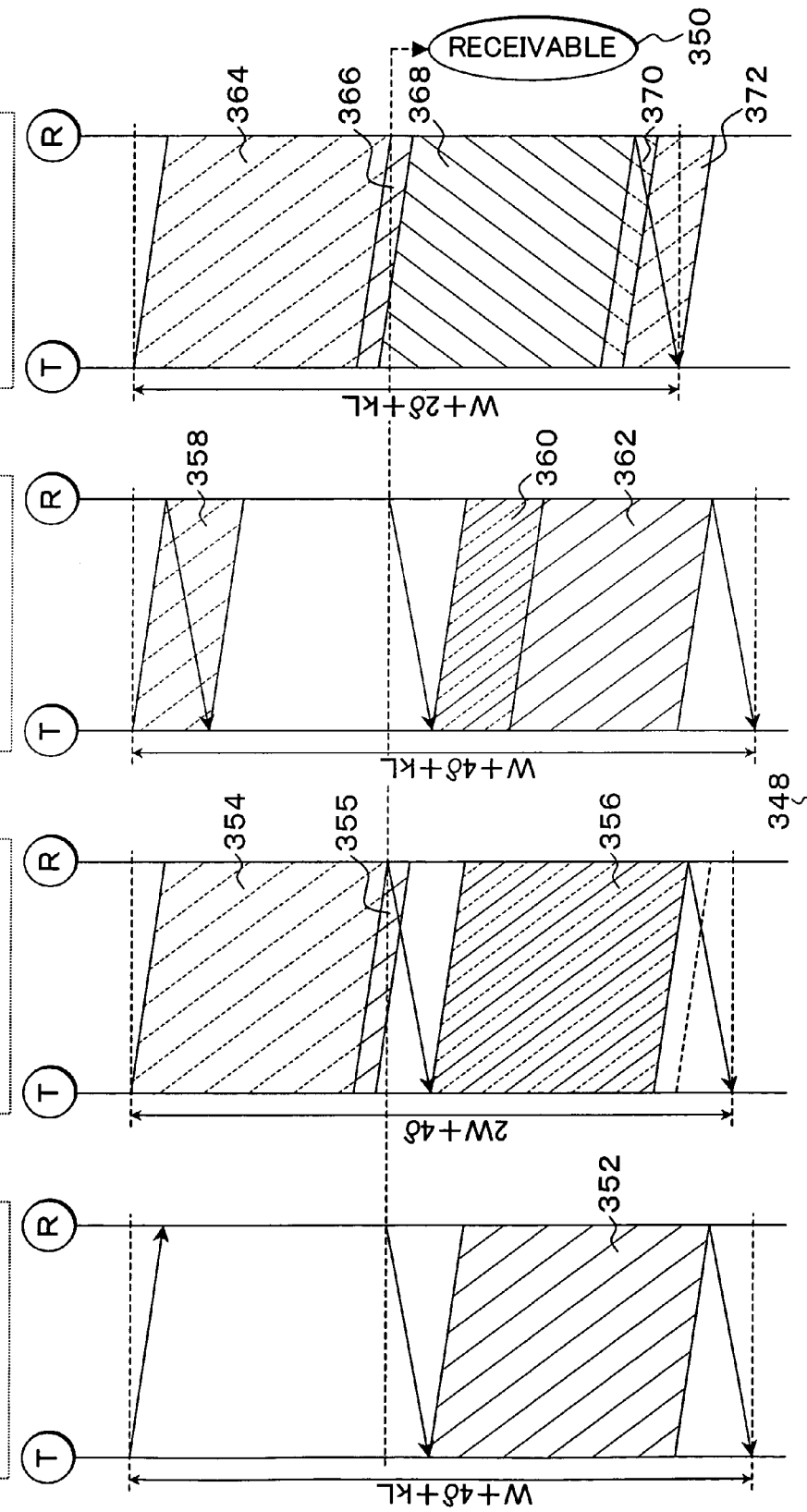

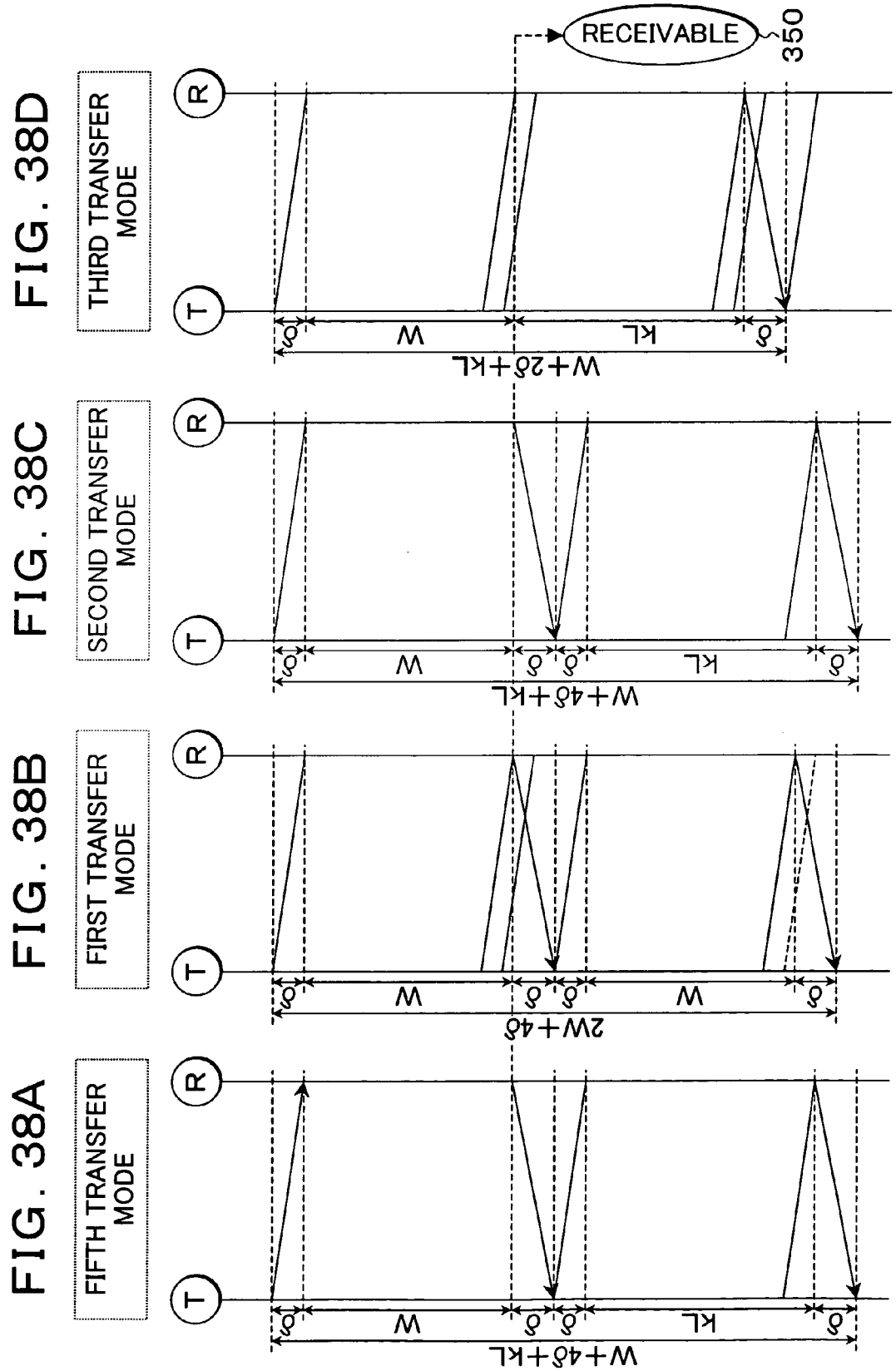

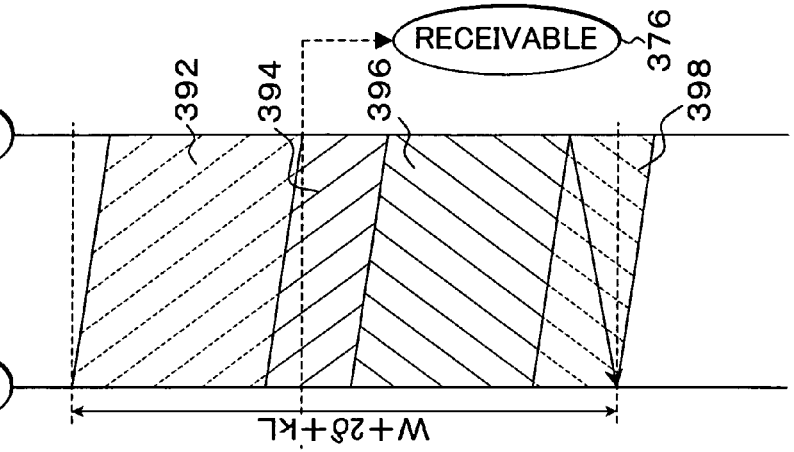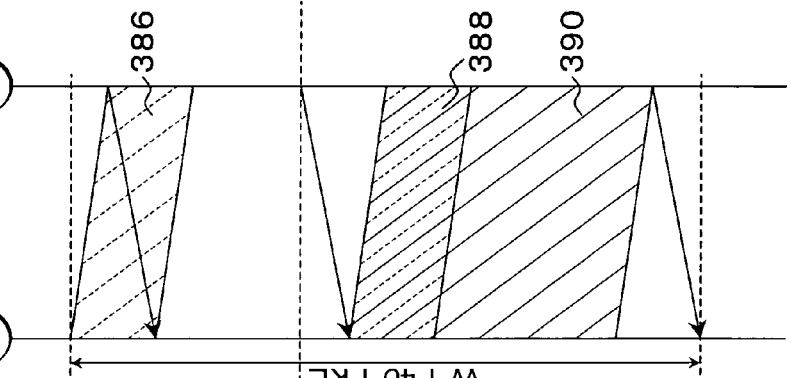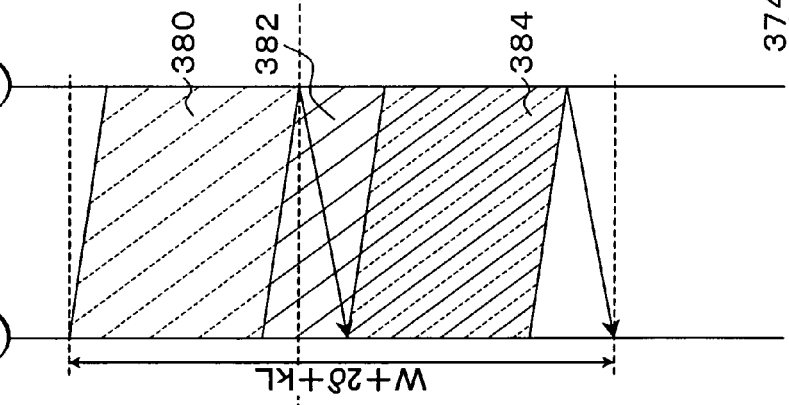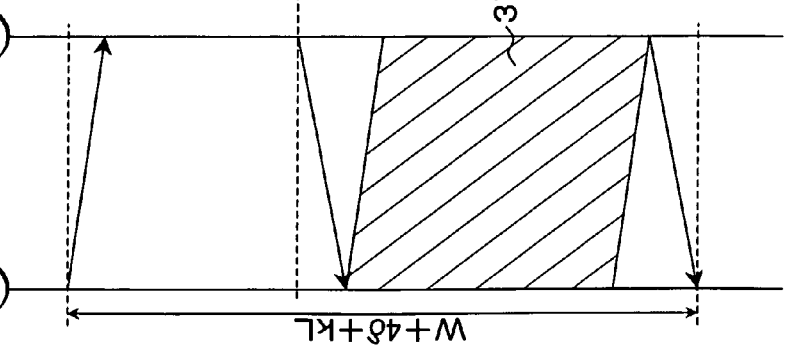

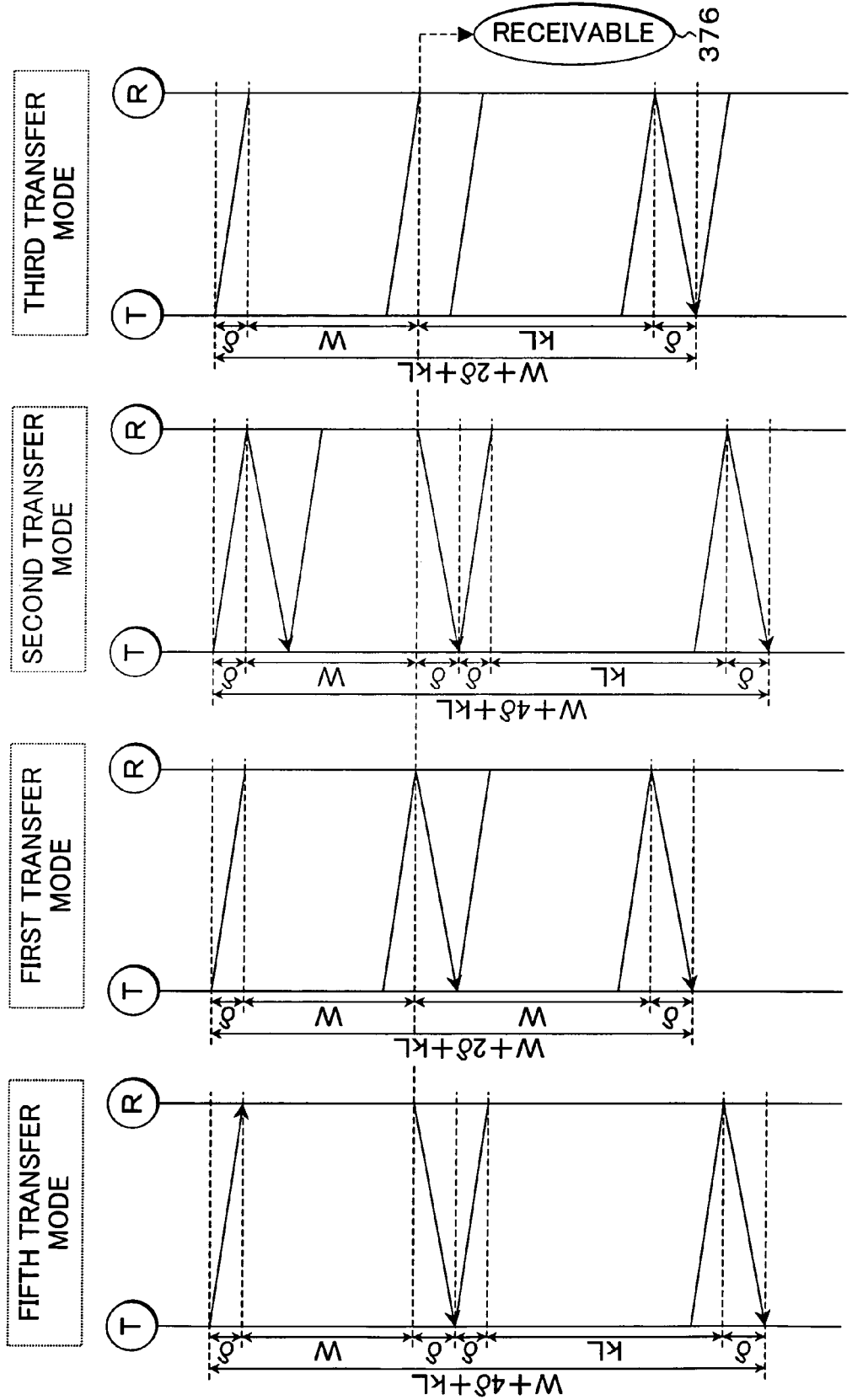

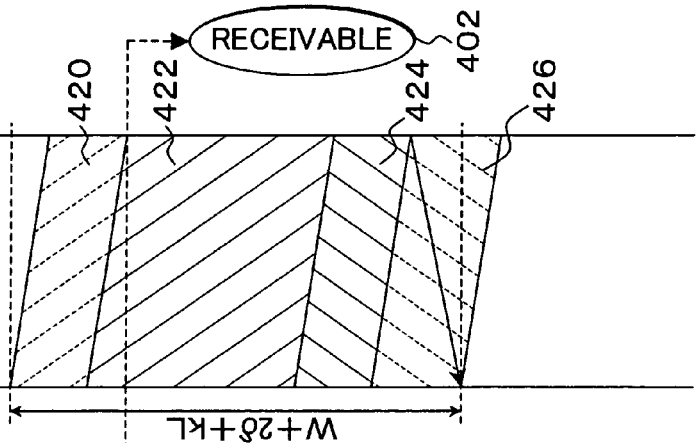
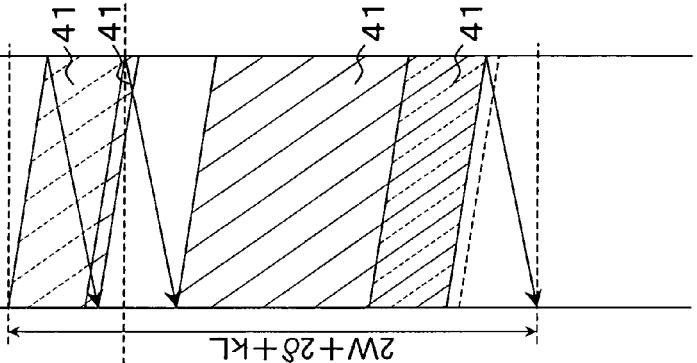
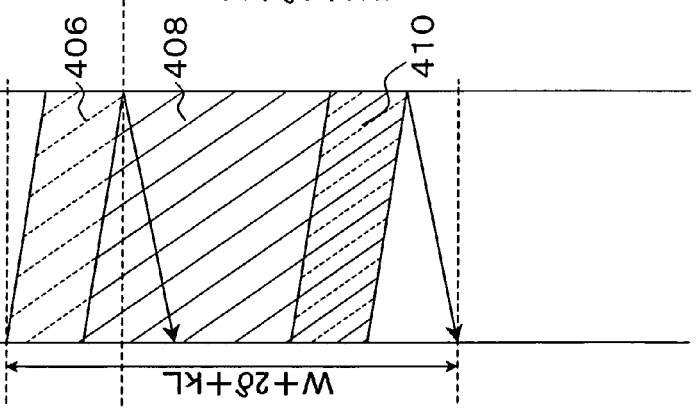
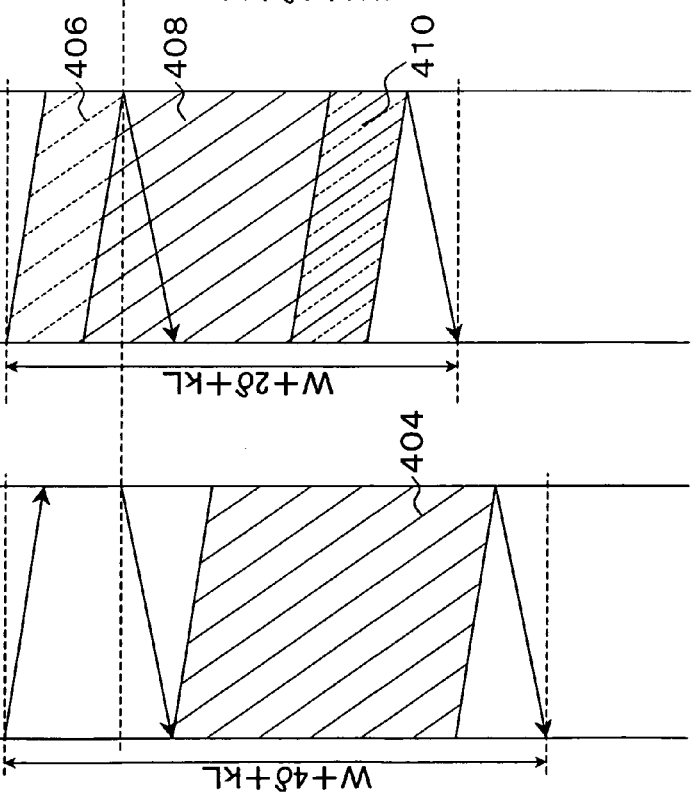

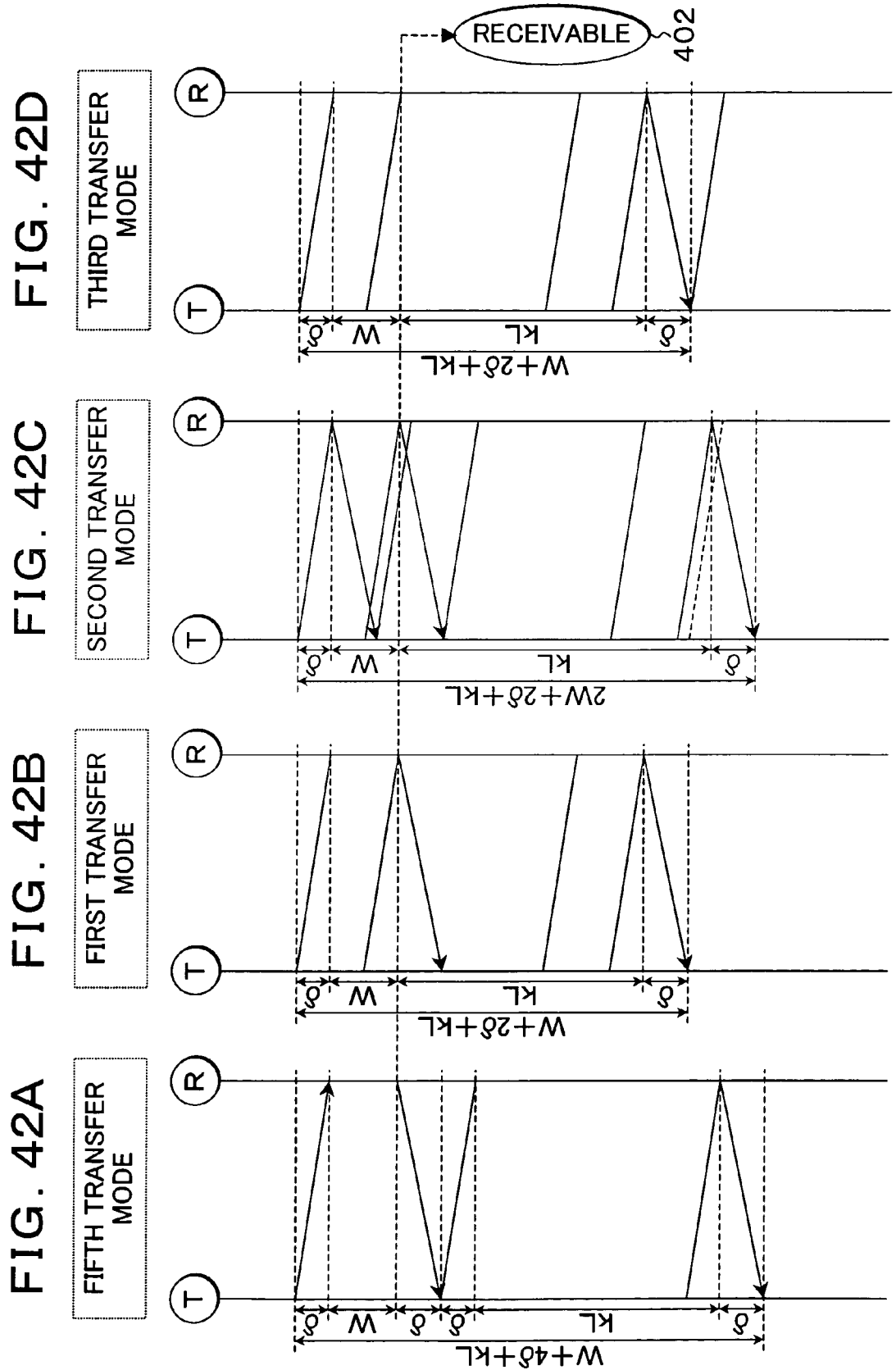

US 7,581,015 B2

COMMUNICATION DEVICE HAVING TRANSMITTING AND RECEIVING UNITS SUPPORTS RDMA COMMUNICATION

This application is a priority based on prior application No. JP 2006-083185, filed Feb. 24, 2006, in Japan.

BACKGROUND OF THE INVENTION

1. Field of the Invention

The present invention relates to a communication device, method, and program for transferring data at a high speed by an RDMA (Remote Direct Memory Access) method, and particularly relates to a communication device, method, and program for speculatively transferring an RDMA packet without inquiring permission of the reception destination.

2. Description of the Related Arts

Conventionally, in a massive PC cluster or a parallel distributed server system, in order to improve performance of connection between nodes or between storage/host, an RDMA method of a read/write (Read/Write) type communication has been employed in parts where high communication performance is required instead of a send/receive (send/receive) type communication typified by socket communication. In the send/receive type communication, communication is performed when a transfer source node specifies a memory area of the transfer source, and a transfer destination node specifies a memory area of the transfer destination; meanwhile, in the RDMA method, since a transmitting side specifies memory areas of both the transfer source and the transfer destination, intermediate buffers which are needed upon transfer can be reduced, and copy processing generated between the intermediate buffers and the memory areas of the transfer source and the transfer destination can be reduced. Particularly, when a high-speed network of 1 gigabyte/second (1 GB/s) class such as InfiniBand (InfiniBand) or a 10-gigabit Ethernet (R) (10 Gb Ethernet) is used, communication performance can be significantly improved because of reduction of copy processing. In RDMA communication, a transmitting side specifies memory areas of both a transfer source and a transfer destination and performs a transmitting process. In this course, the node with which communication is to be performed is not notified of initiation and termination of the transfer. Therefore, in practice, when RDMA communication is to be transmitted, a communication process for obtaining permission to initiate transfer to the memory area of the transfer destination has to be performed beforehand with respect to the node of the transfer destination with which communication is to be performed. A data transfer procedure of conventional RDMA communication is as the following.

(1) Transmitting Side

When RDMA transmission is enabled, a transmitting side inquires a receiving side about presence of reception permission. After receiving the reception permission, the RDMA data is transferred. At the end, when ack (transfer completion notification) is received, the transfer is completed.

(2) Receiving Side

At the point when reception is enabled, the receiving side transfers the reception permission with respect to the inquiry of the presence of the reception permission. After this, when reception of the RDMA data is completed, ack is returned to the transmitting side.

However, such conventional RDMA communication has a problem that, since the communication process for obtaining the transfer permission for the transfer destination is required before starting the RDMA communication, data transfer accordingly takes time. This communication process for obtaining the transfer permission for the transfer destination is a large problem particularly in a network having high throughput and high latency. For example, when an NIC (network interface card) used in recent 10-gigabit Ethernet (Note that Ethernet is a registered trade name. Hereinafter, this will be omitted) is mounted, although throughput is 1 gigabyte/second or more, latency is about 10 to 20 μs which is large. In such a case, when short data such as 1 kilobyte data is supposed to be subjected to RDMA transfer, the time taken for the data transfer is 1 μs or less for the RDMA transfer, however, since the time taken for the communication process for obtaining the transfer permission which is necessary beforehand is 10 to 20 μs, the latency creates a bottleneck, thereby causing a problem that the throughput cannot be fully exerted.

SUMMARY OF THE INVENTION

According to the present invention to provide a communication device, method, and program for supporting RDMA communication such that throughput is improved by making the communication process for obtaining the transfer permission with respect to the transfer destination unnecessary.

The present invention provides a communication device for supporting RDMA communication.

(First Transfer Mode Process)

The present invention provides a communication device for supporting RDMA communication of a first transfer mode having a transmitting unit for generating and transmitting an RDMA packet and a receiving unit for receiving the RDMA packet.

The first transfer mode process is a process in which transfer is speculatively performed without inquiring the transfer destination about permission, and retransmission is performed in response to a retransmission request if it is unpermitted.

Herein, it is characterized in that the transmitting unit has a packet transmitting unit for, when a data transfer request is received, generating the RDMA packet from transfer data and speculatively transmitting the packet without inquiring the transfer destination about presence or absence of reception permission, a packet retransmitting unit for, when a retransmission request is received from the transfer destination, generating the RDMA packet from the requested transfer data and transmitting the packet, and a transmission completion unit for receiving a transfer completion notification (ack) from the transfer destination and normally terminating the packet transmission; and the receiving unit has a transfer area control unit for controlling transfer area control information including transfer permission or transfer unpermission with respect to a receiving area, a packet receiving unit for, if transfer permission of the receiving area is determined by referencing the transfer area control information upon packet reception, transferring the received packet to the receiving area and changing the transfer permission of the receiving area to transfer unpermission, a packet discarding unit for, if transfer unpermission of the receiving area is determined by referencing the transfer area control information upon packet reception, discarding the received packet and recording the discarding of the packet in the transfer area control information, a retransmission requesting unit for, if transfer permission of the receiving area is determined after the received packet is discarded by the packet discarding unit, transmitting a retransmission request to the transfer source based on the record of the packet discarding of the transfer area control information, and a completion notifying unit for recognizing transfer completion of the received packet with respect to the receiving area and transmitting a transfer completion notification (ack).

(Second Transfer Mode Process)

Another mode of the present invention provides a communication device for supporting RDMA communication of a second transfer mode having a transmitting unit for generating and transmitting an RDMA packet and a receiving unit for receiving the RDMA packet.

The second transfer mode is a process in which transfer is speculatively performed without inquiring the transfer destination, the transfer is ceased in response to an unpermission notification if it is unpermitted, and retransmission is performed in response to a retransmission request.

It is characterized in that the transmitting unit has a packet transmitting unit for, when a data transfer request is received, generating the RDMA packet from transfer data and speculatively transmitting the packet without inquiring the transfer destination about presence or absence of reception permission, a transfer cessation unit for ceasing the packet transfer performed by the packet transmitting unit when a reception unpermission notification is received from the transfer destination, a packet retransmitting unit for, when a retransmission request is received from the transfer destination, generating the RDMA packet from the requested transfer data and transmitting the packet, and a transmission completion unit for receiving a transfer completion notification from the transfer destination and normally terminating the packet transmission; and the receiving unit has a transfer area control unit for controlling transfer area control information including transfer permission or transfer unpermission with respect to a receiving area, a packet receiving unit for, if transfer permission of the receiving area is determined by referencing the transfer area control information upon packet reception, transferring the received packet to the receiving area and changing the transfer permission of the receiving area to transfer unpermission, a packet discarding unit for, if transfer unpermission of the receiving area is determined by referencing the transfer area control information upon packet reception, discarding the received packet and recording the discarding of the packet in the transfer area control information, an unpermission notifying unit for transmitting a reception unpermission notification to the transfer source when transfer unpermission of the receiving area is determined by the packet discarding unit, a retransmission requesting unit for, if transfer permission of the receiving area is determined after the received packet is discarded by the packet discarding unit, transmitting a retransmission request to the transfer source based on the record of the packet discarding of the transfer area control information, and a completion notifying unit for recognizing transfer completion of the received packet with respect to the receiving area and transmitting a transfer completion notification.

(Third Transfer Mode Process)

Another mode of the present invention provides a communication device for supporting RDMA communication of a third transfer mode having a transmitting unit for generating and transmitting an RDMA packet and a receiving unit for receiving the RDMA packet. The third transfer mode is a process in which transfer is repeatedly performed without inquiring the transfer destination about permission until a transfer completion notification is received.

It is characterized in that the transmitting unit has a packet transmitting unit for, when a data transfer request is received, generating the RDMA packet from transfer data and speculatively and repeatedly transmitting the packet without inquiring the transfer destination about presence or absence of reception permission, and a transmission completion unit for receiving a transfer completion notification from the transfer destination and normally terminating the packet transmission; and the receiving unit has a transfer area control unit for controlling transfer area control information including transfer permission or transfer unpermission with respect to a receiving area, a packet receiving unit for, if transfer permission of the receiving area is determined by referencing the transfer area control information upon packet reception, transferring the received packet to the receiving area and changing the transfer permission of the receiving area to transfer unpermission, a packet discarding unit for discarding the received packet if transfer unpermission of the receiving area is determined by referencing the transfer area control information upon packet reception, and a completion notifying unit for recognizing transfer completion of the received packet with respect to the receiving area and transmitting a transfer completion notification.

(Fourth Transfer Mode Process)

Another mode of the present invention provides a communication device for supporting RDMA communication of a fourth transfer mode having a transmitting unit for generating and transmitting an RDMA packet and a receiving unit for receiving the RDMA packet. The fourth transfer mode is a process in which transfer is speculatively performed without inquiring the transfer destination about permission, it is saved in a temporary buffer in the case of unpermission, and it is transferred from the temporary buffer to a receiving area when permission is obtained.

It is characterized in that the transmitting unit has a packet transmitting unit for, when a data transfer request is received, generating the RDMA packet from transfer data and speculatively transmitting the packet without inquiring the transfer destination about presence or absence of reception permission, and a transmission completion unit for receiving a transfer completion notification from the transfer destination and normally terminating the packet transmission; and the receiving unit has a transfer area control unit for controlling transfer area control information including transfer permission or transfer unpermission with respect to a receiving area, a packet receiving unit for, if transfer permission of the receiving area is determined by referencing the transfer area control information upon packet reception, transferring the received packet to the receiving area and changing the transfer permission of the receiving area to transfer unpermission, a buffer transfer unit for, if transfer unpermission of the receiving area is determined by referencing the transfer area control information upon packet reception, transferring the received packet to a buffer area and recording the buffer transfer in the transfer area control information, a data moving unit for, if transfer permission of the receiving area is determined after the buffer transfer, moving the data of the buffer area to the receiving area based on the record of the buffer transfer of the transfer area control information, and a completion notifying unit for recognizing transfer completion of the received packet with respect to the receiving area and transmitting a transfer completion notification.

(Transfer Mode Selection)

In another mode of the present invention, a transmitting unit for generating and transmitting an RDMA packet and a receiving unit for receiving the RDMA packet is characterized by having a first transfer mode processing unit for speculatively transferring the packet without inquiring the transfer destination about permission and retransmitting the packet in response to a retransmission request if it is unpermitted;

a second transfer mode processing unit for speculatively transferring the packet without inquiring the transfer destination, ceasing the transfer in response to an unpermission notification if it is unpermitted, and retransmitting the packet in response to a retransmission request;

a third transfer mode processing unit for speculatively and repeatedly transferring the packet without inquiring the transfer destination about permission until a transfer completion notification is received;

a fourth transfer mode processing unit for speculatively transferring the packet without inquiring the transfer destination about permission, saving the packet in a temporary buffer if it is unpermitted, and transferring the packet from the temporary buffer to a receiving area when permission is obtained;

a fifth transfer mode processing unit for inquiring the transfer destination about permission and transferring the packet in response to a permission notification; and a transfer mode setting unit for selecting any one of the first to fifth transfer mode processing unit based on at least either one of network load and a memory usage rate of the receiving side and executing RDMA data transfer.

Herein, the first to fourth transfer mode processing units are same as the above described receiving units and transmitting units of the first transfer modes to the fourth transfer modes.

A fifth transfer mode processing unit has a transmitting unit and a receiving unit, wherein the transmitting unit of the fifth transfer mode processing unit has a packet transmitting unit for, when a data transfer request is received, transmitting a reception permission confirmation to the transfer destination and, if a reception permission notification is received, generating the RDMA packet from transfer data and transmitting the packet, and a transmission completion unit for receiving a transfer completion notification from the transfer destination and normally terminating the packet transmission; and the receiving unit of the fifth transfer mode processing unit has a transfer area control unit for controlling transfer area control information including transfer permission or transfer unpermission with respect to the receiving area, an acknowledgement unit for referencing the transfer area control information when the reception confirmation notification from the transfer source is received and transmitting the reception permission notification or a reception unpermission notification, a packet receiving unit for transferring the received packet to the receiving area, and a completion notifying unit for recognizing transfer completion of the received packet with respect to the receiving area and transmitting the transfer completion notification.

The transfer mode setting unit is provided in the transmitting unit of the transfer destination and notifies a selected transfer mode to the transmitting unit and the receiving unit so as to execute RDMA data transfer by any one of the first to fifth transfer mode processing units.

Moreover, the transfer mode setting unit may be provided in the receiving unit so as to notify a selected transfer mode to the transmitting unit and the receiving unit and to execute RDMA data transfer by any one of the first to fifth transfer mode processing unit.

The transfer mode setting unit selects the fourth transfer mode processing unit if a memory usage rate of the receiving side is low, and, if the memory usage rate of the receiving side is high, the third transfer mode processing unit, the first transfer mode processing unit, and the fifth transfer mode processing unit are sequentially selected in the ascending order of the network load.

The communication device of the present invention further has address conversion information of a logical address and a physical address, wherein the transfer area control information is contained in and integrated with the address conversion information.

The present invention provides a communication method of supporting RDMA communication.

(First Transfer Mode Processing Method)

A communication method of supporting RDMA communication of a first transfer mode having a transmitting step of generating and transmitting an RDMA packet and a receiving step of receiving the RDMA packet is characterized in that the transmitting step has a packet transmitting step of, when a data transfer request is received, generating the RDMA packet from transfer data and speculatively transmitting the packet without inquiring the transfer destination about presence or absence of reception permission, a packet retransmitting step of, when a retransmission request is received from the transfer destination, generating the RDMA packet from the requested transfer data and transmitting the packet, and a transmission completion step of receiving a transfer completion notification from the transfer destination and normally terminating the packet transmission; and the receiving step has a transfer area control step of controlling transfer area control information including transfer permission or transfer unpermission with respect to a receiving area, a packet receiving step of, if transfer permission of the receiving area is determined by referencing the transfer area control information upon packet reception, transferring the received packet to the receiving area and changing the transfer permission of the receiving area to transfer unpermission, a packet discarding step of, if transfer unpermission of the receiving area is determined by referencing the transfer area control information upon packet reception, discarding the received packet and recording the discarding of the packet in the transfer area control information, a retransmission requesting step of, if transfer permission of the receiving area is determined after the received packet is discarded in the packet discarding step, transmitting a retransmission request to the transfer source based on the record of the packet discarding of the transfer area control information, and a completion notifying step of recognizing transfer completion of the received packet with respect to the receiving area and transmitting a transfer completion notification.

(Second Transfer Mode Processing Method)

In another mode of the present invention, a communication method of supporting RDMA communication of a second transfer mode having a transmitting step of generating and transmitting an RDMA packet and a receiving step of receiving the RDMA packet is characterized in that the transmitting step has a packet transmitting step of, when a data transfer request is received, generating the RDMA packet from transfer data and speculatively transmitting the packet without inquiring the transfer destination about presence or absence of reception permission, a transfer cessation step of ceasing the packet transfer performed in the packet transmitting step when a reception unpermission notification is received from the transfer destination, a packet retransmitting step of, when a retransmission request is received from the transfer destination, generating the RDMA packet from the requested transfer data and transmitting the packet, and a transmission completion step of receiving a transfer completion notification from the transfer destination and normally terminating the packet transmission; and the receiving step has a transfer area control step of controlling transfer area control information including transfer permission or transfer unpermission with respect to a receiving area, a packet receiving step of, if transfer permission of the receiving area is determined by referencing the transfer area control information upon packet reception, transferring the received packet to the receiving area and changing the transfer permission of the receiving area to transfer unpermission, a packet discarding step of, if transfer unpermission of the receiving area is determined by referencing the transfer area control information upon packet reception, discarding the received packet and recording the discarding of the packet in the transfer area control information, an unpermission notifying step of transmitting a reception unpermission notification to the transfer source when transfer unpermission of the receiving area is determined in the packet discarding step, a retransmission requesting step of, if transfer permission of the receiving area is determined after the received packet is discarded in the packet discarding step, transmitting a retransmission request to the transfer source based on the record of the packet discarding of the transfer area control information, and a completion notifying step of recognizing transfer completion of the received packet with respect to the receiving area and transmitting a transfer completion notification.

(Third Transfer Mode Processing Method)

In another mode of the present invention, a communication method of supporting RDMA communication of a third transfer mode having a transmitting step of generating and transmitting an RDMA packet and a receiving step of receiving the RDMA packet is characterized in that the transmitting step has a packet transmitting step of, when a data transfer request is received, generating the RDMA packet from transfer data and speculatively and repeatedly transmitting the packet without inquiring the transfer destination about presence or absence of reception permission, and a transmission completion step of receiving a transfer completion notification from the transfer destination and normally terminating the packet transmission; and the receiving step has a transfer area control step of controlling transfer area control information including transfer permission or transfer unpermission with respect to a receiving area, a packet receiving step of, if transfer permission of the receiving area is determined by referencing the transfer area control information upon packet reception, transferring the received packet to the receiving area and changing the transfer permission of the receiving area to transfer unpermission, a packet discarding step of discarding the received packet if transfer unpermission of the receiving area is determined by referencing the transfer area control information upon packet reception, and a completion notifying step of recognizing transfer completion of the received packet with respect to the receiving area and transmitting a transfer completion notification.

(Fourth Transfer Mode Processing Method)

In another mode of the present invention, a communication method of supporting RDMA communication of a fourth transfer mode having a transmitting step of generating and transmitting an RDMA packet and a receiving step of receiving the RDMA packet is characterized in that the transmitting step has a packet transmitting step of, when a data transfer request is received, generating the RDMA packet from transfer data and speculatively transmitting the packet without inquiring the transfer destination about presence or absence of reception permission, and a transmission completion step of receiving a transfer completion notification from the transfer destination and normally terminating the packet transmission; and the receiving step has a transfer area control step of controlling transfer area control information including transfer permission or transfer unpermission with respect to a receiving area, a packet receiving step of, if transfer permission of the receiving area is determined by referencing the transfer area control information upon packet reception, transferring the received packet to the receiving area and changing the transfer permission of the receiving area to transfer unpermission, a buffer transfer step of, if transfer unpermission of the receiving area is determined by referencing the transfer area control information upon packet reception, transferring the received packet to a buffer area and recording the buffer transfer in the transfer area control information, a data moving step of, if transfer permission of the receiving area is determined after the buffer transfer, moving the data of the buffer area to the receiving area based on the record of the buffer transfer of the transfer area control information, and a completion notifying step of recognizing transfer completion of the received packet with respect to the receiving area and transmitting a transfer completion notification.

(Transfer Mode Selection Method)

In another mode of the present invention, a communication method supporting RDMA communication having a transmitting step of generating and transmitting an RDMA packet and a receiving step of receiving the RDMA packet is characterized by having a first transfer mode processing step of speculatively transferring the packet without inquiring the transfer destination about permission and retransmitting the packet in response to a retransmission request if it is unpermitted;

a second transfer mode processing step of speculatively transferring the packet without inquiring the transfer destination, ceasing the transfer in response to an unpermission notification if it is unpermitted, and retransmitting the packet in response to a retransmission request;

a third transfer mode processing step of speculatively and repeatedly transferring the packet without inquiring the transfer destination about permission until a transfer completion notification is received;

a fourth transfer mode processing step of speculatively transferring the packet without inquiring the transfer destination about permission, saving the packet in a temporary buffer if it is unpermitted, and transferring the packet from the temporary buffer to a receiving area when permission is obtained;

a fifth transfer mode processing step of inquiring the transfer destination about permission and transferring the packet in response to a permission notification; and a transfer mode setting step of selecting any one of the first to fifth transfer mode processing step based on at least either one of network load and a memory usage amount of the receiving side and executing RDMA data transfer.

Furthermore, the present invention provides communication programs for causing a computer of a communication device supporting RDMA communication to execute the steps of the above described communication methods.

According to the present invention, since an RDMA packet is speculatively transferred without inquiring the transfer destination about presence or absence of reception permission, the data body of the received RDMA packet can be stored in the receiving area so as to complete the data transfer if the receiving area is receivable, and the communication process of obtaining transfer permission in advance is not required; therefore, the latency of about 10 t 20 μs required for the communication process of obtaining transfer permission can be made unnecessary. Therefore, throughput of RDMA packet transfer of a data size which can be done within transfer time which is shorter than the latency of the transfer permission communication process can be increased, and communication performance can be improved when viewed as a whole communication process. Moreover, also in the case in which the transfer destination is not receivable with respect to the speculative transfer of the RDMA packet, transfer time becomes shorter than the conventional method, in which presence of reception permission is inquired, by retransmitting it by a retransmission request when it becomes receivable (first and second transfer modes). Moreover, under the condition in which there is a surplus in the bandwidth of the network, when the RDMA packet corresponding to the transfer data is repeatedly transferred until a transfer completion notification (ack) is obtained (third transfer mode), it is effectively received from the point when it becomes receivable, thereby shortening the transfer time more than the conventional method. Furthermore, when there is a surplus in a memory area of the transfer destination, the data body of the RDMA packet which is received in an unreceivable state is saved in the temporary buffer, the RDMA packet is effectively received when it becomes receivable, and the data of the temporary buffer is moved to the receiving area (fourth transfer mode), thereby shortening the transfer time more than the conventional method. Furthermore, in the present invention, RDMA packet transfer is performed by dynamically selecting any one of the first to fourth transfer modes, in which speculative transfer is performed, and the fifth transfer mode, which is a conventional method, such that an optimal transfer mode is set based on the network load and the memory usage rate of the receiving side; as a result, efficient data transfer fully exerting advantages of the transfer modes can be performed, and the communication performance as a whole can be improved. The above and other objects, features, and advantages of the present invention will become more apparent from the following detailed description with reference to the drawings.

BRIEF DESCRIPTION OF THE DRAWINGS

FIGS. 2A and 2B are block diagrams of a functional configuration of a transmitting unit and a receiving unit of NICs in the present embodiment;

FIG. 3 is an explanatory diagram of a transfer area control table used in the present embodiment;

FIG. 12 is a flow chart of the first transfer mode reception process;

FIGS. 19A and 19B are explanatory diagrams of transfer processes according to the third transfer mode in the present embodiment;

FIGS. 28A and 28B are explanatory diagrams of the address conversion table before and after address mapping of FIG. 27;

FIGS. 33A to 33D are explanatory diagrams of transfer completion time according to the first to third and fifth transfer modes in a case in which it is receivable before starting transfer;

FIGS. 34A to 34D are explanatory diagrams of calculations of transfer completion time of FIGS. 33A to 33D;

FIGS. 35A to 35D are explanatory diagrams of transfer completion time according to the first to third and fifth transfer modes in a case in which waiting time W for starting transfer is $W \geq kL$;

FIGS. 36A to 36D are explanatory diagrams of calculations of transfer completion time of FIGS. 35A to 35D;

FIGS. 37A to 37D are explanatory diagrams of transfer completion time according to the first to third and fifth transfer modes in a case in which waiting time W for starting transfer is $kL \geq W \geq kL - 2\delta$;

FIGS. 38A to 38D are explanatory diagrams of calculations of transfer completion time of FIGS. 37A to 37D;

FIGS. 39A to 39D are explanatory diagrams of transfer completion time according to the first to third and fifth transfer modes in a case in which waiting time W for starting transfer is $kL - 2\delta \geq W \geq 2\delta$;

FIGS. 40A to 40D are explanatory diagrams of calculations of transfer completion time of FIGS. 39A to 39D;

FIGS. 41A to 41D are explanatory diagrams of transfer completion time according to the first to third and fifth transfer modes in a case in which waiting time W for starting transfer is $2\delta \geq W$;

FIGS. 42A to 42D are explanatory diagrams of calculations of the transfer completion time of FIGS. 41A to 41D;

DETAILED DESCRIPTION OF THE PREFERRED EMBODIMENTS (Configuration of Communication Device)

Figure 1:
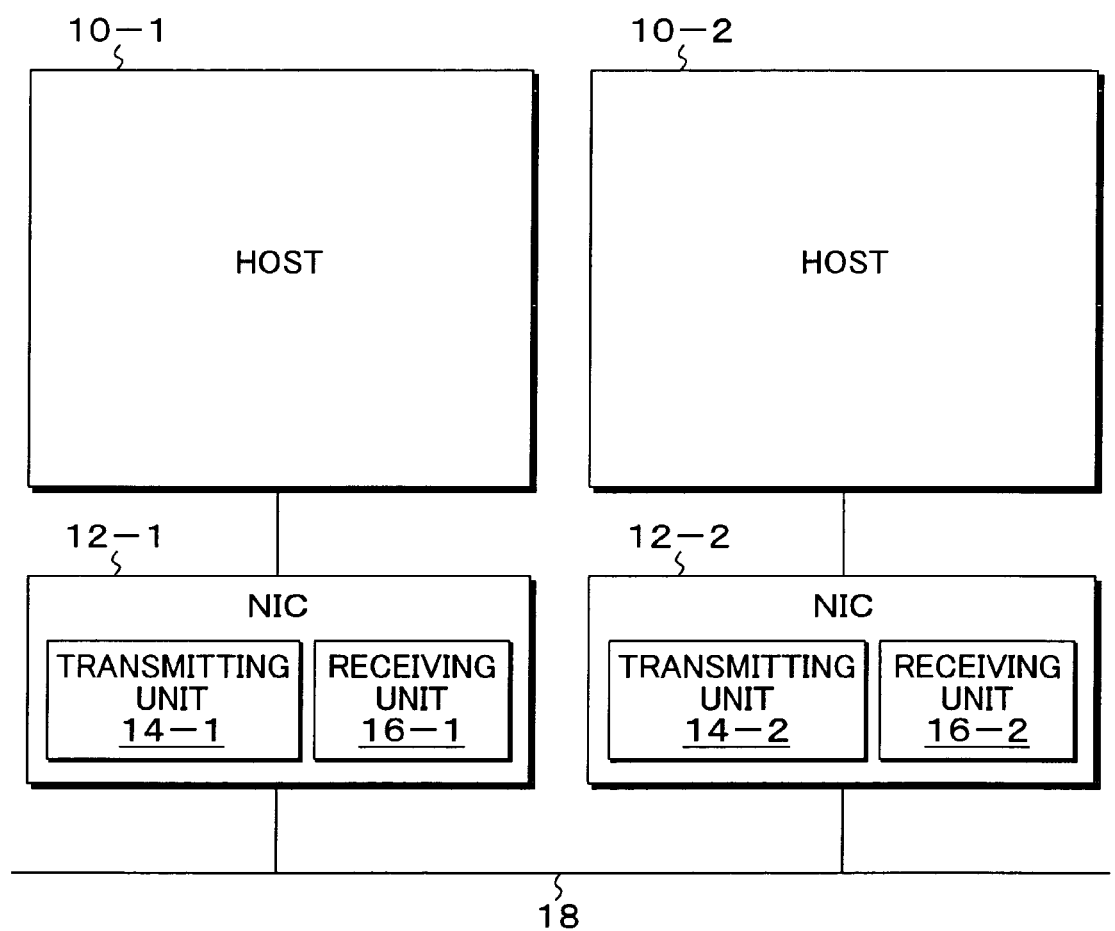
FIG. 1 is an explanatory diagram of an embodiment of the present invention applied to inter-host communication.

FIG. 1 is an explanatory diagram of an embodiment of the present invention applied to inter-host communication. In FIG. 1, with respect to hosts 10-1 and 10-2 respectively provided are network interface cards (hereinafter, referred to as "NICs") 12-1 and 12-2 of 10-Gb Ethernet which are connected via a network 18. A transmitting unit 14-1 and a receiving unit 16-1 are provided in the NIC 12-1, and a transmitting unit 14-2 and a receiving unit 16-2 are similarly provided in the NIC 12-2. The NICs 12-1 and 12-2 support RDMA packet transfer between the hosts 10-1 and 10-2 via the network 18.

FIGS. 2A and 2B are block diagrams of a functional configuration of the transmitting unit and the receiving unit of the NICs in the present embodiment. In FIGS. 2A and 2B, the host 10-1 side serves as a transmitting node (transfer source), and a function as the transmitting unit 14-1 is provided in the NIC 12-1 which is provided at the host 10-1. Meanwhile, the host 10-2 is a receiving node (transfer destination) serving as the receiving side, and the NIC 12-2 provided at the host 10-2 is exhibiting a function as the receiving unit 16-2. In the transmitting-side NIC 12-1, a transmission request receiving unit 26, a transfer area control unit 28, a transmission control unit 30, a reception control unit 32, a mode selection control unit 34, a network load information collecting unit 36, and a 10 Gb Ethernet MAC (denoted as "10 Gb EMAC")38 are provided. The transmission request receiving unit 26 has a transmission request receiving register which receives transmission requests. The transmission request receiving register can be mapped in an address space of the host 10-1 via a PCI. Therefore, the transmission requesting unit 20 of the host 10-1 issues a transmission request by writing parameters in the transmission request receiving register mapped in the address space. Moreover, the transmission requesting unit 20 specifies transmission data 24 which is allocated in a transmission area 22 which is a memory space of the host 10-1 so as to request transmission. The transfer area control unit 28 has an address conversion table for performing conversion of logical addresses and physical addresses and a transfer area control table for controlling presence of reception permission of transfer areas. In the present embodiment, the address conversion table and the transfer area control table are combined with each other. Accordingly, by causing information of the transfer area control table to be included in the address conversion table, referencing the information of the transfer area control table can be executed at the same time as referencing addresses; consequently, the performance of information referencing can be improved. The transmission control unit 30 obtains the transmission data 24 which is in the transmission area 22 in a memory of the host 10-1 through DMA transfer based on a transmission request from the transmission request receiving unit 26 or the reception control unit 32. In this course, a physical address which is converted from a logical address of the transmission data 24 is obtained from the transfer area control unit 28. An RDMA data packet including a header added to the transmission data, which is obtained in this manner from the host 10-1 side, is generated and transferred to a 10 Gb Ethernet MAC 38. In this case, in accordance with an instruction from the mode selection control unit 34, a transmission process is executed in accordance with a transfer procedure of a selected transfer mode. The reception control unit 32 receives (1) ack packets,
(2) retransmission control packets,
(3) reception permission notifying packets,
(4) reception unpermission notifying packets, and
(5) transfer mode notifying packets from the NIC 12-2 of the receiving side.

When the ack packet is received, a transfer process is normally terminated. When the retransmission control packet is received, retransmission is notified to the transmission control unit 30. When the reception permission notifying packet is received, reception permission is notified to the transmission control unit 30. When the reception unpermission notifying packet is received, an RDMA transmission process with respect to the unpermitted receiving area is stopped. When the transfer mode notifying packet is received, it is notified to the mode selection control unit 34. The mode selection control unit 34 selects an optimal transfer mode from among first to fifth transfer modes which are prepared in the present embodiment, and notifies the transmission control unit 30 to perform a transfer procedure based on that. When selection of the transfer modes is to be performed, network load information from the network load information collecting unit 36 and mode selection instruction information which is received by the reception control unit 32 and according to the NIC 12-2 of the receiving side are used. Herein, the first to fifth transfer modes in the present embodiment have the following contents.

(1) In the first transfer mode, transfer is speculatively performed without inquiring the transfer destination about permission, and, if it is unpermitted, retransmission is performed in response to a retransmission request.

(2) In the second transfer mode, transfer is speculatively performed without inquiring the transfer destination about permission, and, if it is unpermitted, the transfer is ceased in response to an unpermission notification and retransmission is performed thereafter in response to a retransmission request.

(3) In the third transfer mode, transfer is speculatively repeated without inquiring the transfer destination about permission until an ack packet is received.

(4) In the fourth transfer mode, transfer is speculatively performed without inquiring the transfer destination about permission, and, if it is unpermitted, it is temporarily saved in a buffer in the transfer destination and transferred from the temporary buffer to the receiving area when permission is obtained.

(5) The fifth transfer mode is a transfer mode of a conventional method in which the transfer destination is inquired about permission, and transfer is performed in response to a permission notification. Details of these first to fifth transfer modes will be elucidated in later descriptions. The NIC 12-2 of the receiving side will next be described. In the NIC 12-2 of the receiving side, as a configuration which functions as the receiving unit 16-2, a reception control unit 40, a transfer area control unit 42, a transmission control unit 44, a mode selection control unit 46, a network load information collecting unit 48, a memory usage rate information collecting unit 49, and a 10 Gb Ethernet MAC 50 are provided. The reception control unit 40 receives an RDMA data packet or a control packet of a reception permission confirmation notification in the fifth transfer mode which is the conventional method. When the RDMA data packet is received, the header is analyzed, and the transfer area control unit 42 is inquired whether the receiving area is receivable or not. With respect to this inquiry, the transfer area control unit 42 notifies about presence or absence of reception permission of the receiving area and, at the same time, notifies about a physical address which is varied from a logical address. If it is receivable, a data body obtained from a DMA data packet is transferred to a receiving area 54 of the host 10-2 through DMA transfer. If reception is not permitted, in accordance with the instruction of the transfer mode which is in a currently selected state of the mode selection control unit 46, the packet is discarded (the first to third transfer modes) or transferred to and saved at a predetermined position of a temporary buffer 56 of the host 10-2 (the fourth transfer mode). Moreover, if the second transfer mode is specified by the mode selection control unit 46, the transmission control unit 44 is requested to transfer a reception unpermission notification to the transfer source by a control packet. The transfer area control unit 42 has, as well as the case of the NIC 12-1 of the transmitting side, a logical/physical address conversion table and a transfer area control table wherein both of them are mutually combined. With respect to an inquiry from the reception control unit 40 about presence or absence of reception permission for the receiving area, it references the transfer area control table and makes a response. In this course, if the reception is permitted, a physical address corresponding to a logical address is, obtained from the address conversion table and returned. In this course, the state of the receiving area of which reception permission is notified is changed at the same time to reception unpermission so as to prevent double reception. Meanwhile, if reception of the receiving area is unpermitted with respect to the inquiry from the reception control unit 40, reception unpermission is responded, and, at the same time, it is recorded that the RDMA packet data received at the receiving area which is unpermitted to receive is discarded. Furthermore, if the fourth transfer mode is specified, the address of the temporary buffer 56 in which transfer data 58 is saved is notified to the transfer area control unit 42 and recorded in the transfer area control table. If a notification of an area permission unit 52 of the host 10-2 is received and reception is permitted with respect to the inquiry from the reception control unit 40 after once unpermission of the receiving area is responded, whether there has been a transfer request with which data is discarded or not is confirmed by referencing the transfer area control table. If a record of the transfer request with which data is discarded is present, whether transfer to the temporary buffer 56 has been done or not is confirmed. If the transfer has been done, since this is the case of the fourth transfer mode, the address of the transfer destination of the temporary buffer 56 is notified to the host 10-2, and a transfer control unit 60 is caused to perform a data transfer process from the temporary buffer 56 to the receiving area 54. If it is not retained in the temporary buffer 56, a retransmission request is notified to the transmission control unit 44. Furthermore, if a reception permission confirmation notification is received from the reception control unit 40 in the state of the fifth transfer mode which is the conventional method, the transfer area control unit 42 requests the transmission control unit 44 to transmit a reception permission notification at the point when the corresponding receiving area becomes receivable. In accordance with requests of ack notification reception and unpermission notifications from the reception control unit 40 the transmission control unit 44 generates and transmits control packets thereof. In addition, in accordance with retransmission requests and reception permission notifications from the transfer area control unit 42, it generates and transmits control packets thereof. The mode selection control unit 46 selects an optimal transfer mode from among the first to fifth transfer modes supported by the present embodiment, and notifies the reception control unit 40 to perform a transfer procedure based on that. In addition, it notifies a currently selected transfer mode to the NIC 12-1 of the transmitting side via the transmission control unit 44. When the transfer mode is to be selected by the mode selection control unit 46, a memory usage rate of the receiving side which is collected by the memory usage rate information collecting unit 49 and network load information collected by the network load information collecting unit 48 are used. The network load information collecting unit 48 obtains and collects network load information from the 10 Gb Ethernet MAC 50. In addition, it measures transfer completion time from initiation to completion of RDMA transfer. The memory usage rate information collecting unit 49 collects the usage rate of the temporary buffer 56 which can be reserved in the host 10-2. The 10 Gb Ethernet MAC 50 transmits packets passed from the transmission control unit 44 to the network and passes packets received from the network to the reception control unit 40. In addition, it obtains load information of the network and transfers it to the network load information collecting unit 48. Functions of the host 10-1 of the transmitting side will next be described. In the host 10-1, the transmission requesting unit 20 is provided. In response to a communication request from a communication process, the transmission requesting unit 20 requests RDMA transmission to the NIC 12-1 of the transmitting side. On the other hand, in the host 10-2 of the receiving side, functions of the area permission unit 52 and the transfer control unit 60 are provided. In response to area permission from a communication process using the receiving area 54, the area permission unit 52 notifies reception permission of the permitted area to the receiving-side NIC 12-2. In response to a notification from the transfer area control unit 42 of the NIC 12-2 of the receiving side, the transfer control unit 60 moves data transferred to and retained in the temporary buffer 56 to the reception-permitted receiving area 54. In the data movement from the temporary buffer 56 to the receiving area 54, data transfer to the receiving area 54 and address offset in page units are performed together. More specifically, when the saved data 58 of the temporary buffer 56 is to be moved, although copy processing is performed for a top page and a last page, pages other than that are moved by remapping of the pages without copy processing, thereby reducing overhead of the copy processing. This data movement will be elucidated in later descriptions. Such functions as the NIC 12-1 and 12-2 of the transmitting side and the receiving side are realized by executing programs in hardware environment including processors for communication processing respectively having CPUs and memories.

FIG. 3 is an explanatory diagram of the transfer area control table used in the receiving side of the present embodiment. In FIG. 3, the transfer area control table 62 is composed of area IDs 64, logical addresses 66, physical addresses 68, reception permission 70, packet discarding information 72, reception unpermission notifying information 74, and temporary buffer saving addresses 75. In this manner, the presence or absence of permission of receiving areas, the packet discarding state according to the transfer mode, the reception unpermission notifying information, the temporary buffer addresses, etc. are recorded so as to be integrated with the first-half address conversion table for converting logical addresses into physical addresses, thereby efficiently performing, with respect to inquiries from the reception control unit 40, address conversion which is performed by referencing the transfer area control table 62 by the transfer area control unit 42 and obtainment of information of, for example, reception permission about the receiving areas.

Figure 4:
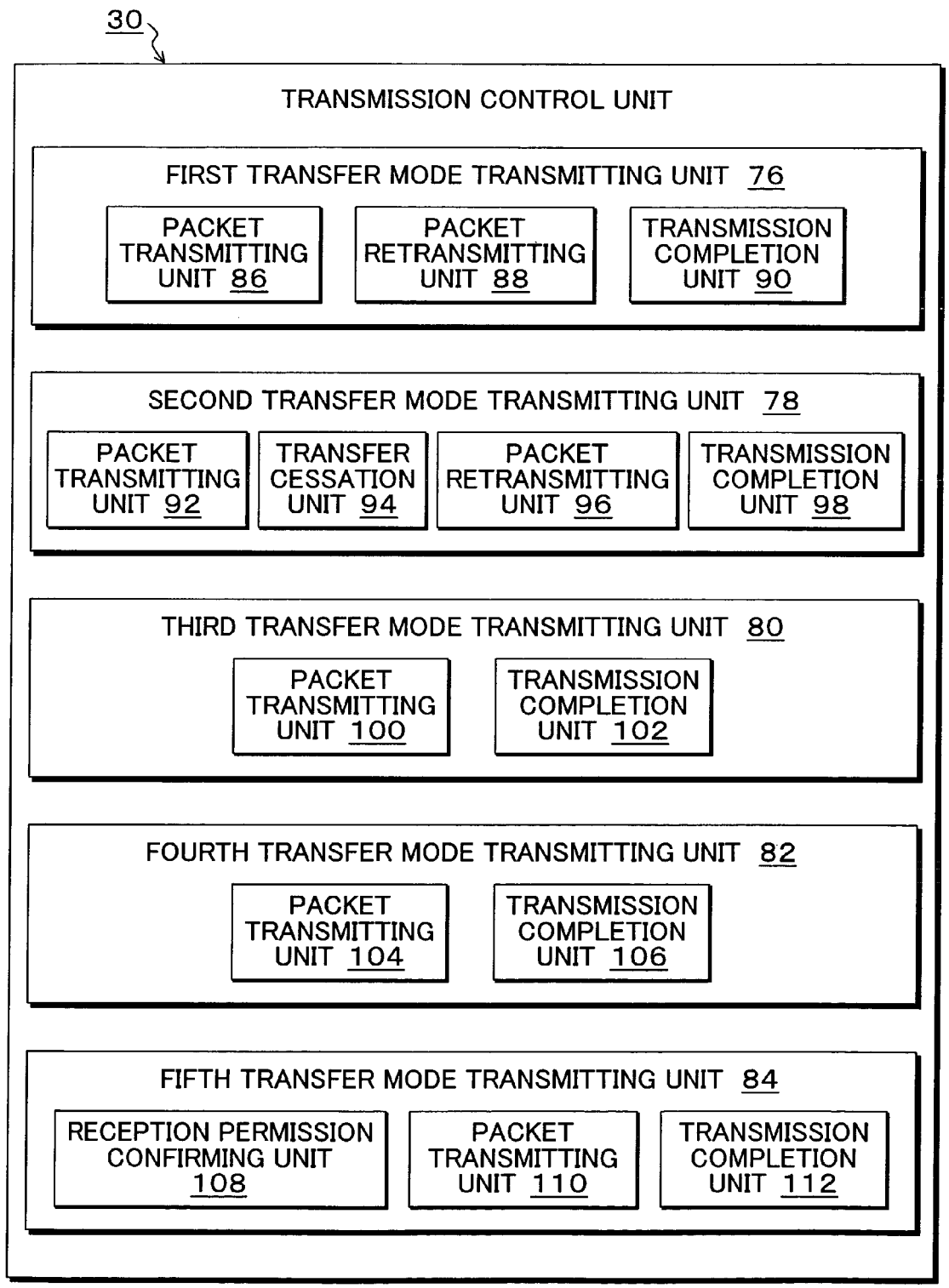
FIG. 4 is a block diagram of a transmission control unit in the present embodiment.

FIG. 4 is a block diagram of a functional configuration of a transmission control unit in the present embodiment; specifically, a functional configuration of the transmission control unit 30 which is provided in the NIC 12-1 of the transmitting side of FIGS. 2a and 2B are shown. In the transmission control unit 30, a first transfer mode transmitting unit 76, a second transfer mode transmitting unit 78, a third transfer mode transmitting unit 80, a fourth transfer mode transmitting unit 82, and a fifth transfer mode transmitting unit 84 are provided; and the transmitting unit corresponding to any of the transfer modes is selected by an instruction from the mode selection control unit 34 of FIGS. 2A and 2B so as to perform transmission control. In the first transfer mode transmitting unit 76, a packet transmitting unit 86, a packet retransmitting unit 88, and a transmission completion unit 90 are provided. When a data transfer request is received, the packet transmitting unit 86 generates an RDMA data packet from transfer data and speculatively transmits that without inquiring the transfer destination about presence or absence of reception permission. The packet retransmitting unit 88 generates an RDMA data packet from requested transfer data and transmits it when a retransmission request is received from the transfer destination. The transmission completion unit 90 receives ack which is a transfer completion notification from the transfer destination and normally terminates the data transfer. In the second transfer mode transmitting unit 78, a packet transmitting unit 92, a transfer cessation unit 94, a packet retransmitting unit 96, and a transmission completion unit 98 are provided. When a data transfer request is received, the packet transmitting unit 92 generates an RDMA data packet from transfer data and speculatively transmits that without inquiring the transfer destination about presence of reception permission. When a reception unpermission notification is received from the transfer destination, the transfer cessation unit 94 ceases packet transfer which is performed by the packet transmitting unit 92. When a retransmission request is received from the transfer destination, the packet retransmitting unit 96 generates an RDMA data packet from requested transfer data and retransmits it. The transmission completion unit 98 receives ack which is a transfer completion notification from the transfer destination and normally terminates the data transfer. The third transfer mode transmitting unit 80 has a packet transmitting unit 100 and a transmission completion unit 102. When a data transfer request is received, the packet transmitting unit 100 generates an RDMA data packet from transfer data and speculatively and repeatedly transmits that without inquiring the transfer destination about presence or absence of reception permission. A transmission completion unit 106 receives ack which is a transfer completion notification from the transfer destination and normally terminates the data transfer. Therefore, in the fourth transfer mode transmitting unit 82, until ack is received by the transmission completion unit 106 from the transfer destination, the transmission data to be transferred is repeatedly transferred from a packet transmitting unit 104. The fifth transfer mode transmitting unit 84 has a reception permission confirming unit 108, a packet transmitting unit 110, and a transmission completion unit 112. The fifth transfer mode transmitting unit 84 is a conventional method; thus, when a data transfer request is received, the reception permission confirming unit 108 transmits a reception permission confirmation to the transfer destination. When a reception permission notification is received from the transfer destination, the packet transmitting unit 110 generates an RDMA packet from the transfer data and transmits it. The transmission completion unit 112 receives ack which is a transfer completion notification from the transfer destination and normally terminates the data transfer.

Figure 5:
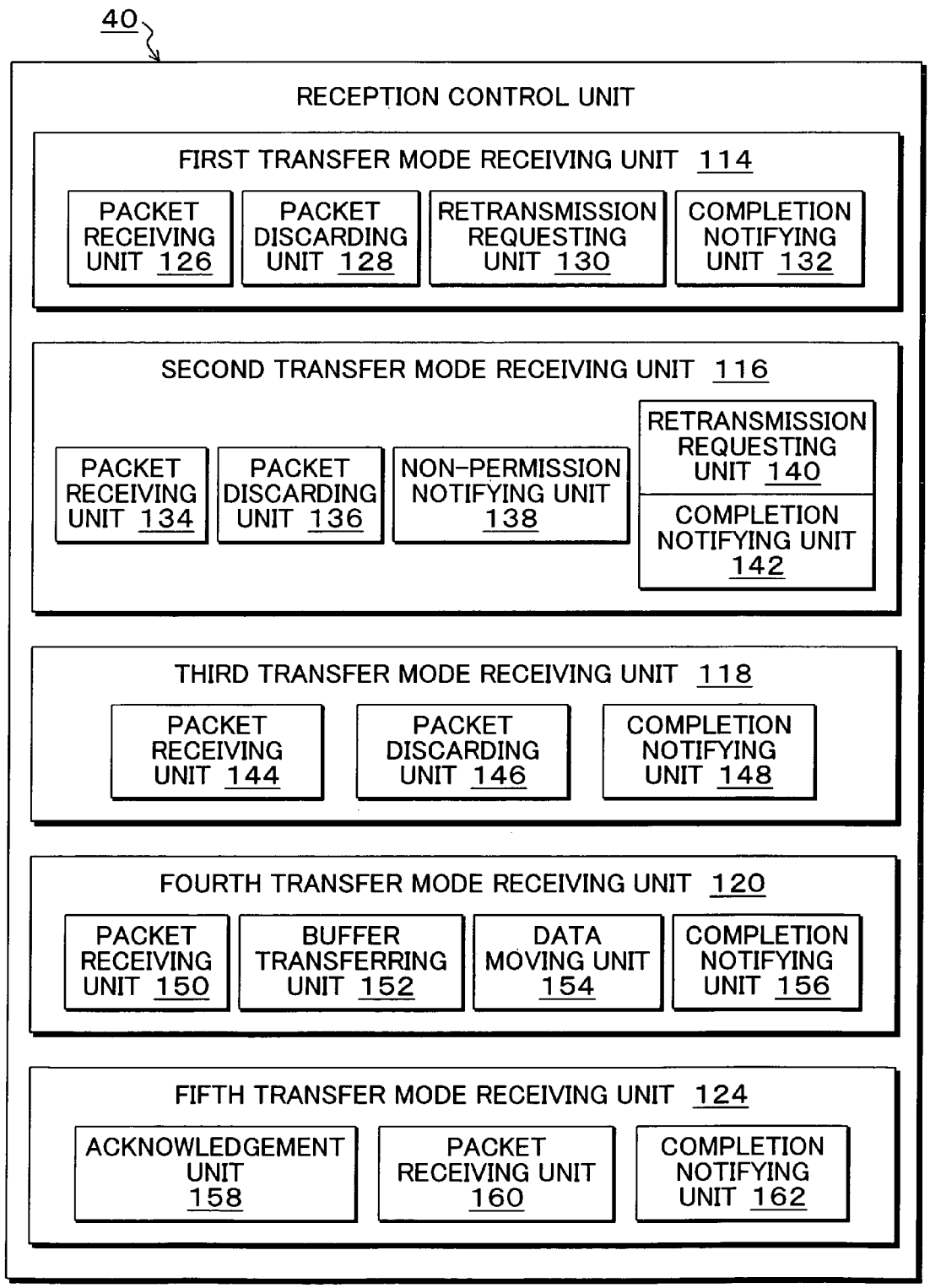
FIG. 5 is a block diagram of a reception control unit in the present embodiment.

FIG. 5 is a block diagram of a reception control unit in the present embodiment; specifically, it is a functional configuration of the reception control unit 40 provided in the NIC 12-2 of the receiving side of FIGS. 2A and 2B. In FIG. 5, in the reception control unit 40, a first transfer mode receiving unit 114, a second transfer mode receiving unit 116, a third transfer mode receiving unit 118, a fourth transfer mode receiving unit 120, and a fifth transfer mode receiving unit 124 are provided. Among the first to fifth receiving units, any one of the transfer modes is selected according to an instruction from the mode selection control unit 46 of FIGS. 2A and 2B so as to perform reception control. In the first transfer mode receiving unit 114, a packet receiving unit 126, a packet discarding unit 128, a retransmission requesting unit 130, and a completion notifying unit 132 are provided. When an inquiry is made to the transfer area control unit 42 upon packet reception and transfer permission of a receiving area is determined, the packet receiving unit 126 transfers the data body of the received RDMA data packet to the receiving area and changes the transfer permission of the receiving area to transfer unpermission so as to prevent double reception. When the inquiry is made to the transfer area control unit 42 upon packet reception and transfer unpermission is determined, the packet discarding unit 128 discards the received packet and records the discarding of the packet in the packet discarding information 72 of the transfer area control table 62 of FIG. 3. When transfer permission of the receiving area is determined after the packet is discarded by the packet discarding unit 128, the retransmission requesting unit 130 transmits a retransmission request to the transfer source based on the packet discarding information recorded in the transfer area control table. The completion notifying unit 132 recognizes completion of the transfer of the data body by means of the received packet with respect to the receiving area, and transmits an ack packet serving as a transfer completion notification. In the second transfer mode receiving unit 116, a packet receiving unit 134, a packet discarding unit 136, an unpermission notifying unit 138, a retransmission requesting unit 140, and a completion notifying unit 142 are provided. When transfer permission of the receiving area obtained by referencing the transfer area control table which is inquired upon packet reception is determined, the packet receiving unit 134 transfers the data body of the received packet to the receiving area and changes the transfer permission of the receiving area in the transfer area control table to transfer unpermission so as to prevent double reception. When transfer unpermission of the receiving area based on the transfer area control table obtained by an inquiry made upon packet reception is determined, the packet discarding unit 136 discards the received packet and records the discarding of the packet in the transfer area control table. When transfer unpermission of the receiving area is determined by the packet discarding unit 136, the reception unpermission notifying unit 138 transmits a reception unpermission notification to the transfer source. When transfer area of the receiving area is determined after the received packet is discarded by the packet discarding unit, the retransmission requesting unit 140 transmits a retransmission request to the transfer source based on the record of the packet discarding of the transfer area control table. Furthermore, the completion notifying unit 142 recognizes completion of the transfer of the data body of the received packet with respect to the receiving area and transmits an ack packet serving as a transfer completion notification. In the third transfer mode receiving unit 118, a packet receiving unit 144, a packet discarding unit 146, and a completion notifying unit 148 are provided. When transfer permission of a receiving area obtained by referencing the transfer area control table which is inquired upon packet reception is determined, the packet receiving unit 144 transfers the data body of the received packet to the receiving area and changes the transfer permission of the receiving area to transfer unpermission so as to prevent double reception. When transfer unpermission of the receiving area notified through referencing of the transfer area control table upon packet reception is determined, the packet discarding unit 146 discards the received packet. Since retransmission is not requested in this case, the discarding of the received packet is not recorded in the transfer area control table. The completion notifying unit 148 recognizes completion of transfer of the data body of the received packet with respect to the receiving area and transmits an ack packet serving as a transfer completion notification. A function of such third transfer mode receiving unit 118 is a simple process of receiving packets until reception is permitted and completed and performing data transfer to the receiving area with respect to the transfer data which is repeatedly speculatively transmitted from the third transfer mode transmitting unit 80 of FIG. 4 without inquiring presence of reception permission. In the fourth transfer mode receiving unit 120, a packet receiving unit 150, a buffer transfer unit 152, a data moving unit 154, and a completion notifying unit 156 are provided. When transfer permission of the receiving area obtained by referencing the transfer area control table upon packet reception is determined, the packet receiving unit 150 transfers the data body of the received packet to the receiving area and changes the transfer permission of the receiving area to transfer unpermission so as to prevent double reception. When transfer unpermission of the receiving area is determined by referencing the transfer area control table upon packet reception, the buffer transfer unit 152 transfers and saves the data body obtained from the received packet to and in the buffer area of the temporary buffer and records the saving to the temporary buffer in the transfer area control table 62. When transfer permission of the receiving area is determined after buffer transfer with respect to the temporary buffer, the data moving unit 154 moves the saved data in the buffer area of the temporary buffer to the receiving area based on the record of the buffer transfer, i.e., a saved address of the transfer area control table. The completion notifying unit 156 recognizes completion of transfer of the data body of the received packet with respect to the receiving area and transmits an ack packet serving as a transfer completion notification. In the fifth transfer mode receiving unit 124, an acknowledgement unit 158, a packet receiving unit 160, and a completion notifying unit 162 are provided. The fifth transfer mode receiving unit has a reception function of a conventional method. When a confirming notification is received from the transfer source, the acknowledgement unit 158 transmits a notification of reception permission or reception unpermission obtained by referencing the transfer area control table. The packet receiving unit 160 transfers the data body of a received packet, which is received corresponding to the notification of the reception permission with respect to the transfer source, to the receiving area. The completion notifying unit 162 recognizes completion of the transfer of the data body of the received packet with respect to the receiving area and transmits an ack packet serving as a transfer completion notification.

Figure 6:
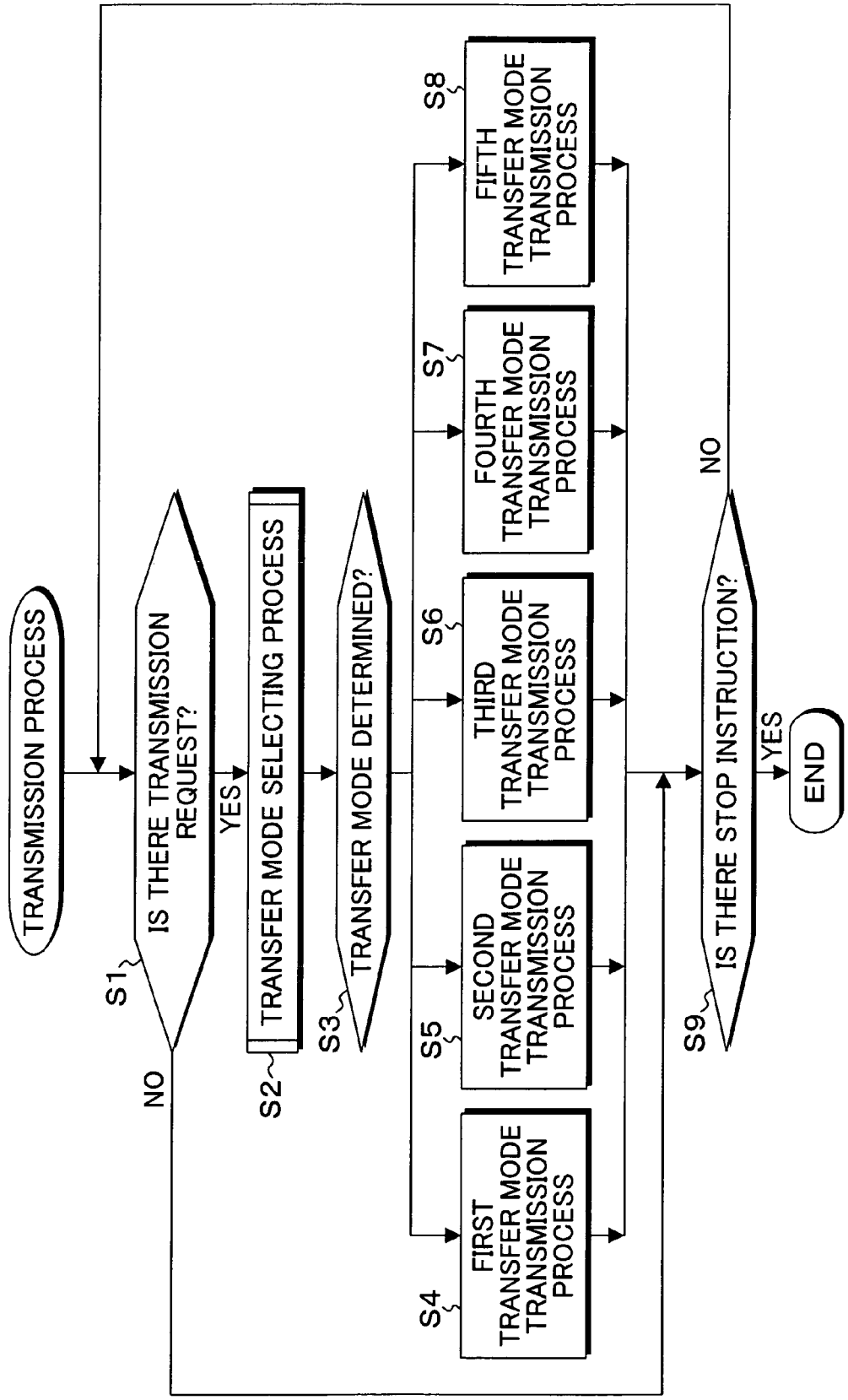
FIG. 6 is a flow chart of a transmission process in the present embodiment.

FIG. 6 is a flow chart of a transmission process in the present embodiment. In FIG. 6, in the transmission process, presence of a transmission request is checked in step S1; if the transmission request is present, the process proceeds to step S2 in which a transfer mode selecting process is executed; the selected transfer mode is determined in step S3; and any of first to fifth transfer mode transmission processes shown in steps S4 to S8 is selected so as to perform a transmission process. Such processes of steps S1 to S8 are repeated until stop is instructed in step S9. Note that details of the first to fifth transfer mode transmission processes of steps S4 to S8 will be elucidated in later descriptions.

Figure 7:
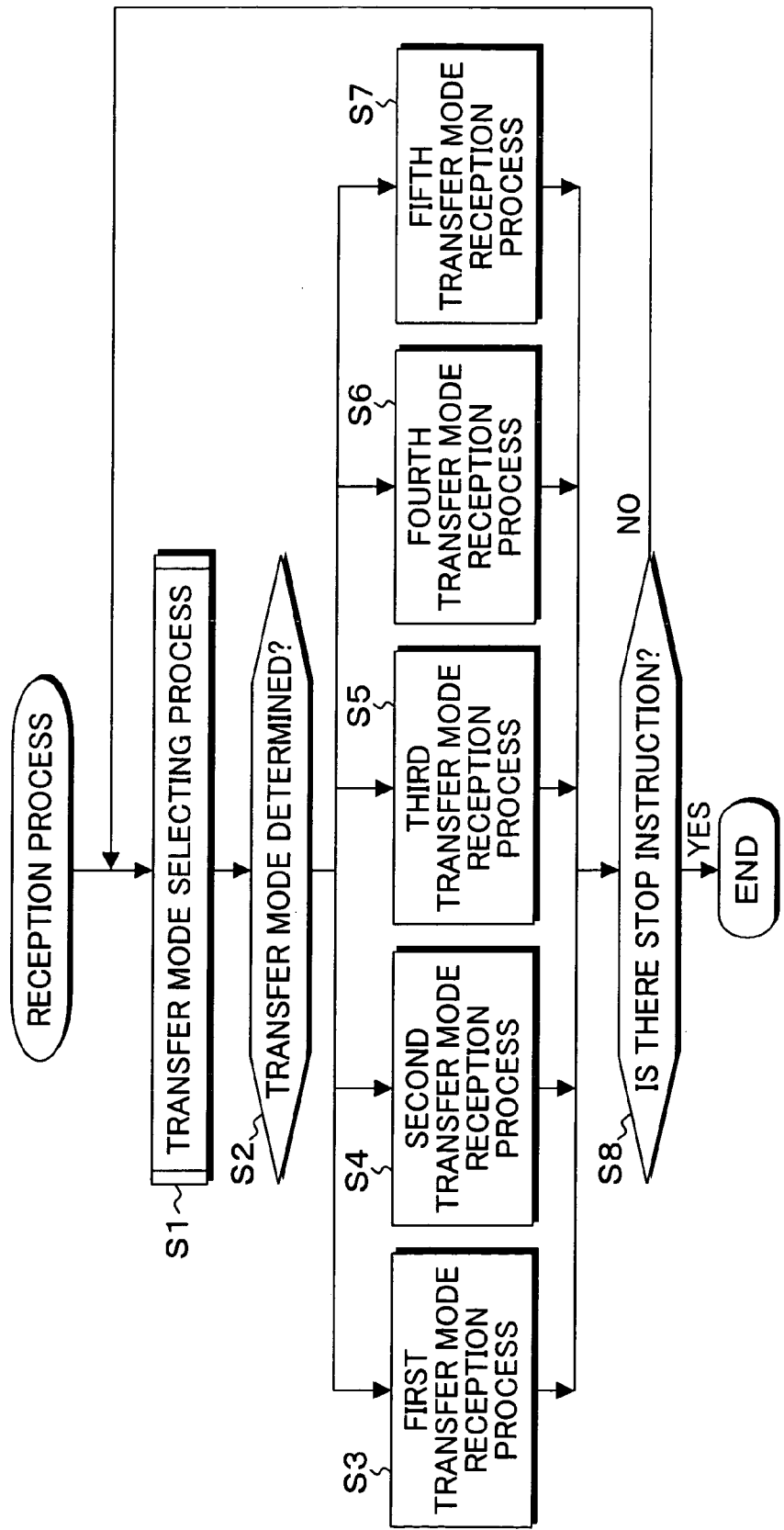
FIG. 7 is a flow chart of a reception process in the present embodiment.

FIG. 7 is a flow chart of a reception process in the present embodiment. In FIG. 7, in the reception process, after a transfer mode selecting process is executed in step S1, the transfer mode is determined in step S2, and any one of first to fifth transfer mode reception processes of steps S3 to S7 is selected so as to perform a reception process. Such processes of steps SS1 to S7 are repeated until stop is instructed in step S8. Details of the transfer mode setting process of step S1 and details of the first to fifth transfer mode reception processes of steps S3 to S7 in FIG. 7 will be elucidated in later descriptions. Note that the transfer mode selecting process according to the present embodiment includes a method in which selection is performed in the transmitting side like step S2 of FIG. 6 and notified to the receiving side and a method in which selection is performed in the receiving side like step S1 of FIG. 7 and notified to the transmitting side, and either one of the transfer mode selecting processes is implemented. The present embodiment employs, as an example, the case in which selection is performed in the transmitting side and notified to the receiving side.

(First Transfer Mode)

Figure 8A:
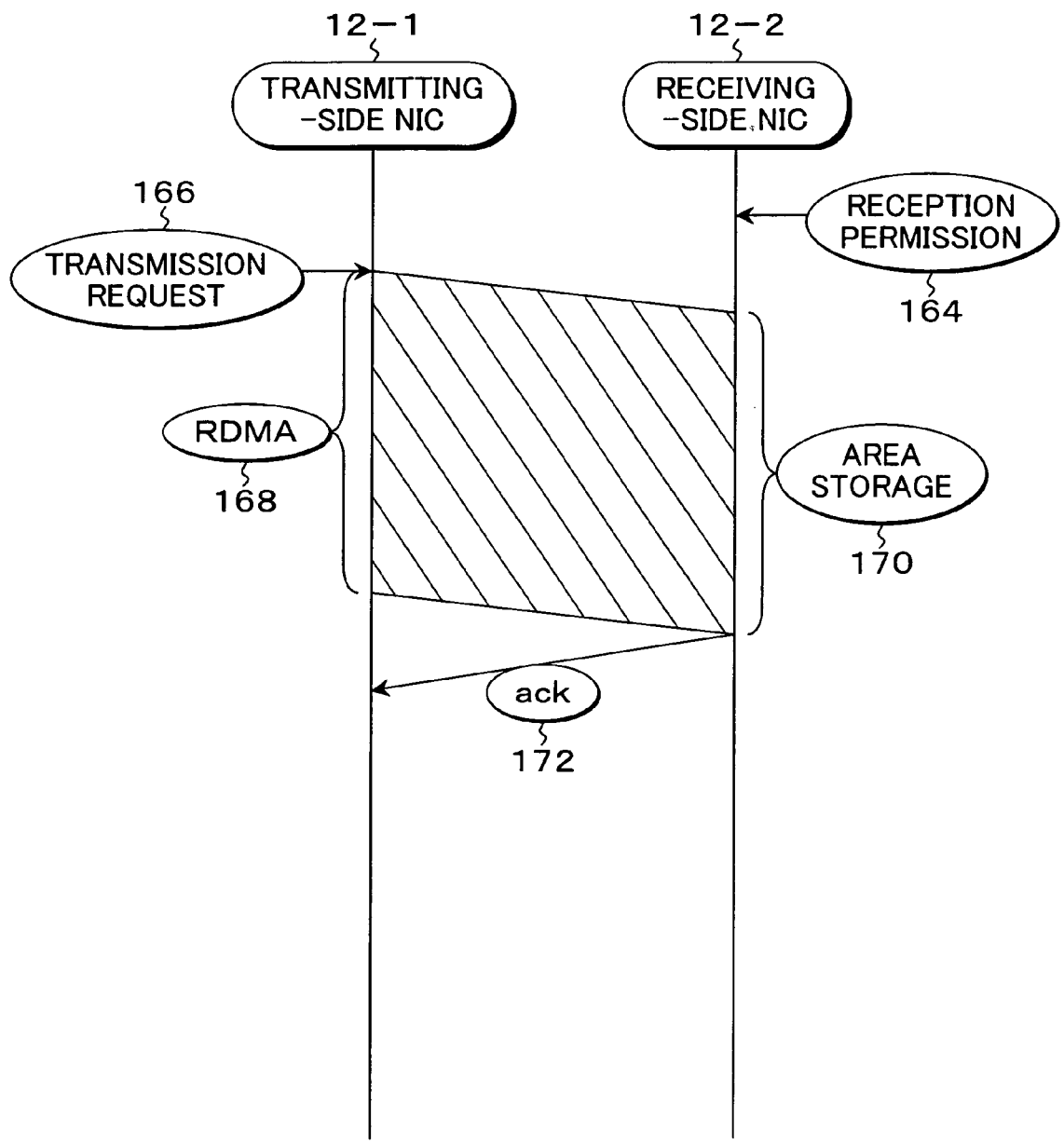
FIGS. 8A and 8B are explanatory diagrams of transfer processes according to the first transfer mode in the present embodiment.
Figure 8B:
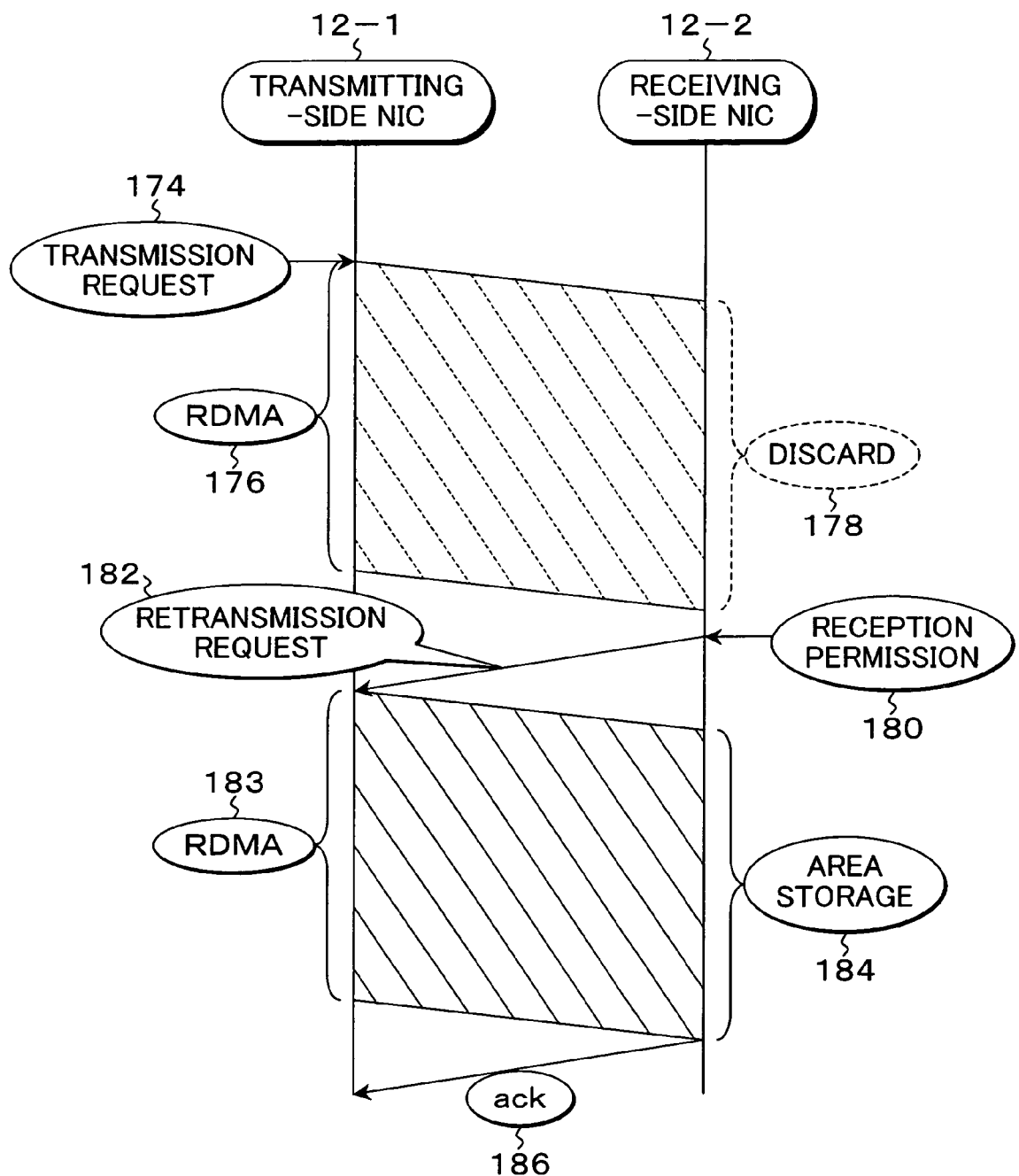

FIGS. 8A and 8B are explanatory diagrams of transfer processes according to the first transfer mode in the present embodiment. FIG. 8A is a transfer process of a case in which a receiving area of the transfer destination becomes receivable before transfer is started, and FIG. 8B is a transfer process of a case in which it becomes receivable after transfer is started. Herein, the transfer processes according to the first transfer mode are processes in which transfer is speculatively performed without inquiring the transfer destination about permission, and transfer is performed in response to a retransmission request if it is unpermitted. In the case of FIG. 8A in which reception is permitted before transfer is started, when reception permission 164 is received with respect to the receiving area in the receiving-side NIC 12-2, and then, a transmission request 166 with respect to the receiving area is generated in the transmitting-side NIC 12-1, an RDMA data packet is generated from the transfer data without inquiring the receiving side about the presence or absence of reception permission, and RDMA communication 168 is performed. In the receiving-side NIC 12-2, when the RDMA data packet is received, the reception permission is determined from the transfer area control table, area storage 170 for storing the data body of the received packet in the permitted receiving area is performed, and an ack packet 172 is transmitted when storage is terminated so as to terminate the data transfer. In addition, when the reception permission is recognized by referencing the transfer area control table by the receiving-side NIC 12-2, in order to prevent double reception, transfer permission of the receiving area is changed to be unpermitted.

FIG. 8B is a case in which it becomes receivable after transfer is started, wherein when a transmission request 174 is generated in the transmitting-side NIC 12-1, RDMA communication 176 is speculatively performed without inquiring the receiving side so as to transfer a data packet. In the receiving-side NIC 12-2, when the receiving area of the transfer area control table is referenced according to the header of the RDMA data packet, it is unpermitted at this point; therefore the received packet is discarded 178. Thereafter, when reception permission 180 is determined to be output for the corresponding receiving area in the receiving-side NIC 12-2, a retransmission request control packet 182 is transmitted to the transmitting-side NIC 12-1 based on the information about the discarded packet which is recorded in the transfer area control table. In response to this, the transmitting-side NIC 12-1 generates an RDMA data packet from the transfer data and performs retransmission through RDMA communication 183; since reception is permitted in the receiving-side NIC 12-2 at this point, it is received so as to perform area storage 184 in which the data body of the RDMA packet is transferred to the receiving area, and an ack packet 186 is transmitted when the storage is terminated so as to complete the data transfer.

Figure 9:
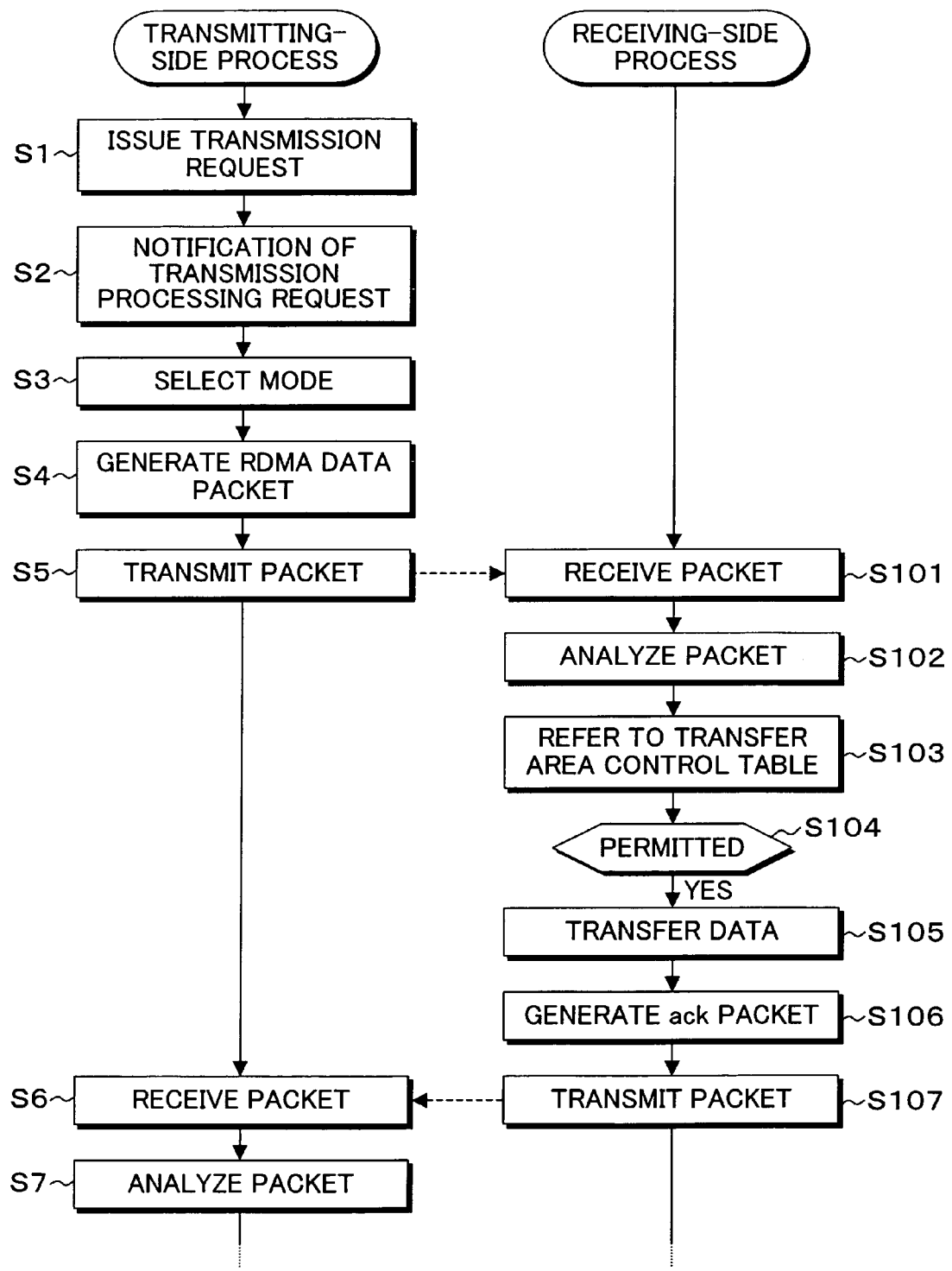
FIG. 9 is a time chart of a transfer process according to the first transfer mode in a case in which it is receivable before starting transfer.

FIG. 9 is a time chart of the transfer process according to the first transfer mode in the case in which it is receivable before transfer is started, and it will be described as the following with reference to FIGS. 2A and 2B. In the first place, in step S1, in the transmitting-side process, the transmission requesting unit 20 of the host 10-1 issues the transmission request to the NIC 12-1. In response to this, in step S2, the transmission request receiving unit 26 of the NIC 12-1 notifies a transmission processing request to the transmission control unit 30. Subsequently, in step S3, mode selection is performed such that the mode selection control unit 34 activates the first transfer mode. Subsequently in step S4, the transmission control unit 30 generates the RDMA data packet from the transfer data 24 of the transmitting area 22 of the host 10-1 and outputs it to the 10 Gb Ethernet MAC 38. In this course, the physical address of the transmission source is obtained by inquiring the transfer area control unit 28. Subsequently, in step S5, the 10 Gb Ethernet MAC 38 transmits the RDMA data packet, which has been transmitted from the transmission control unit 30, to the network. Meanwhile, in the receiving-side process, in step S101, the 10 Gb Ethernet MAC 50 receives the RDMA data packet from the network and delivers it to the reception control unit 40. The reception control unit 40 analyzes the header of the RDMA data packet in step S102 and inquires the transfer area control unit 42 in step S103 so as to obtain presence of the reception permission and the physical address of the receiving area 54. When the reception permission is determined in step S104, the data body of the received packet is transferred to the receiving area 54 in step S105, the ack packet is generated in step S106 after the transfer is completed, and the ack control packet is transmitted from the 10 Gb Ethernet MAC 50 to the network in step S107. In the transmitting-side process, in step S6, the ack control packet is received by the 10 Gb Ethernet MAC 38, and, in step S7, the reception control unit 32 recognizes that it is an ack packet by packet analysis and notifies that to the transmission control unit 30 so as to normally terminate the series of the data transfer processes.

Figure 10A:
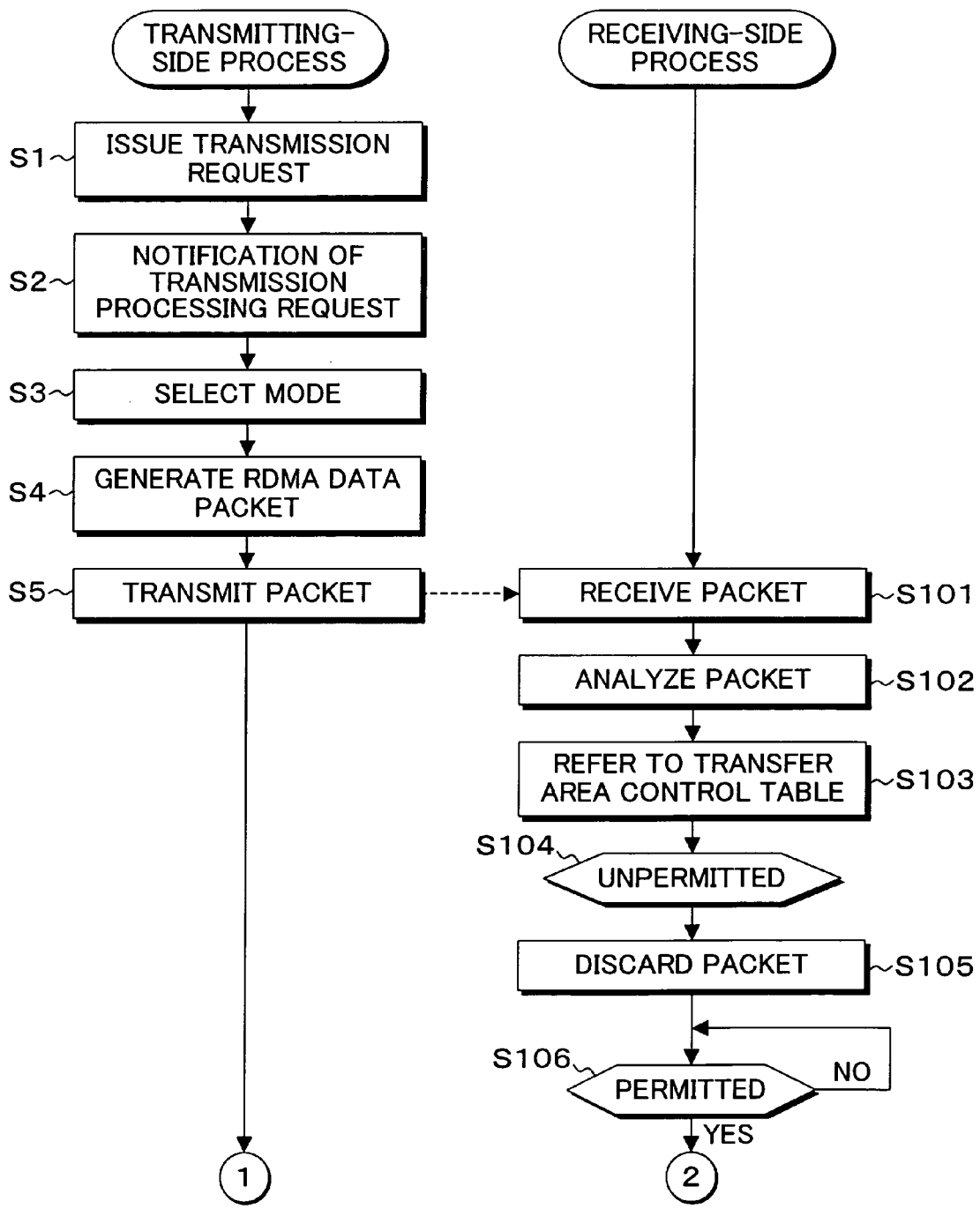
FIGS. 10A and 10B are time charts of a transfer process according to the first transfer mode in a case in which it is receivable after starting transfer.
Figure 10B:
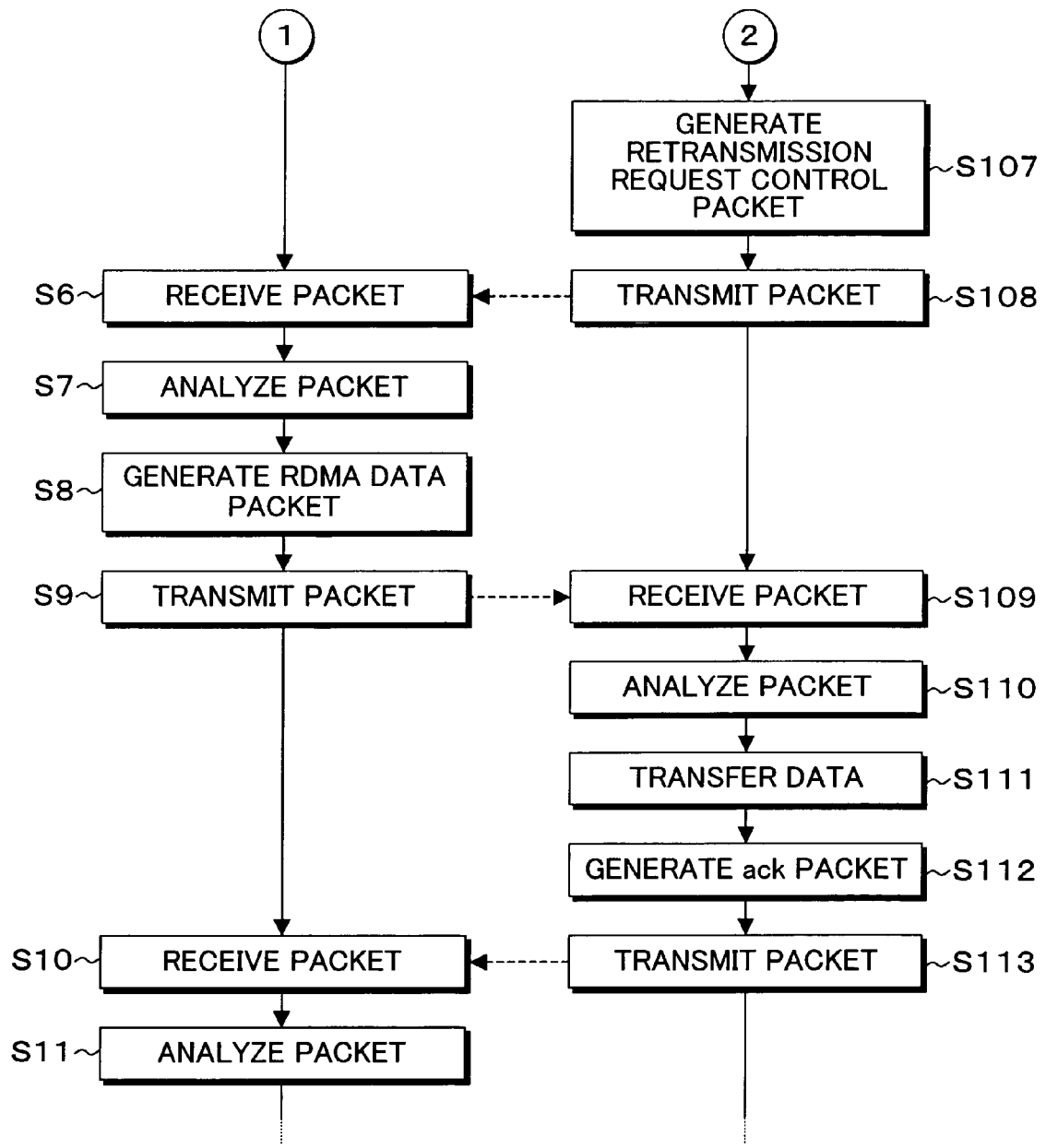

FIGS. 10A and 10B are time charts of the transfer process according to the first transfer mode in the case in which it becomes receivable after transfer is started. In FIGS. 10A and 10B, steps S1 to S5 of the transmitting-side process and steps S101 to S103 of the receiving-side process subsequent to that are same as FIG. 9.

However, in the case of FIGS. 10A and 10B, since the receiving area 54 is unpermitted when the transfer area control table is referenced in step S103, when that is determined in step S104, the received packet is discarded and that is recorded in the transfer area control table in step S105. Subsequently, presence of the reception permission of the receiving area 54 is monitored in step S106; when the reception permission is obtained, the process proceeds to step S107 in which the transmission control unit 44 generates a transmission control packet based on the record of the packet discarding in the transfer area control table, and a retransmission notification control packet is transmitted from the 10 Gb Ethernet MAC 50 to the network in step S108. In the transmitting-side process, the 10 Gb Ethernet MAC 38 receives the control packet in step S6, and the reception control unit 32 recognizes through packet analysis that it is a control packet of a retransmission request and notifies that to the transmission control unit 30 in step S7. The transmission control unit 30 generates the RDMA data packet from the transfer data corresponding to the retransmission request in step S8 and outputs that to the 10 Gb Ethernet MAC 38 so as to transmit the packet to the network in step S9. In the receiving-side process, in step S109, the 10 Gb Ethernet MAC 50 receives the RDMA data packet and outputs it to the reception control unit 40; in step S110, the reception control unit 40 analyzes the header of the RDMA data packet and inquires the transfer area control unit 42 so as to obtain the presence of the permission and the physical address of the receiving area 54; and, since reception is permitted in this case, in step S111, the data body obtained from the received packet is transferred to the receiving area 54 of the host 10-2. Subsequently, when the data transfer is completed, the transmission control unit 44 generates the ack packet and outputs that to the 10 Gb Ethernet MAC 50 in step S112, and the ack control packet is transmitted to the network in step S113. In the transmitting-side process, the 10 Gb Ethernet MAC 38 receives the control packet in step S10, and the reception control unit 32 analyzes the packet and confirms reception of the ack packet so as to normally terminate the transfer process in step S11.

Figure 11:
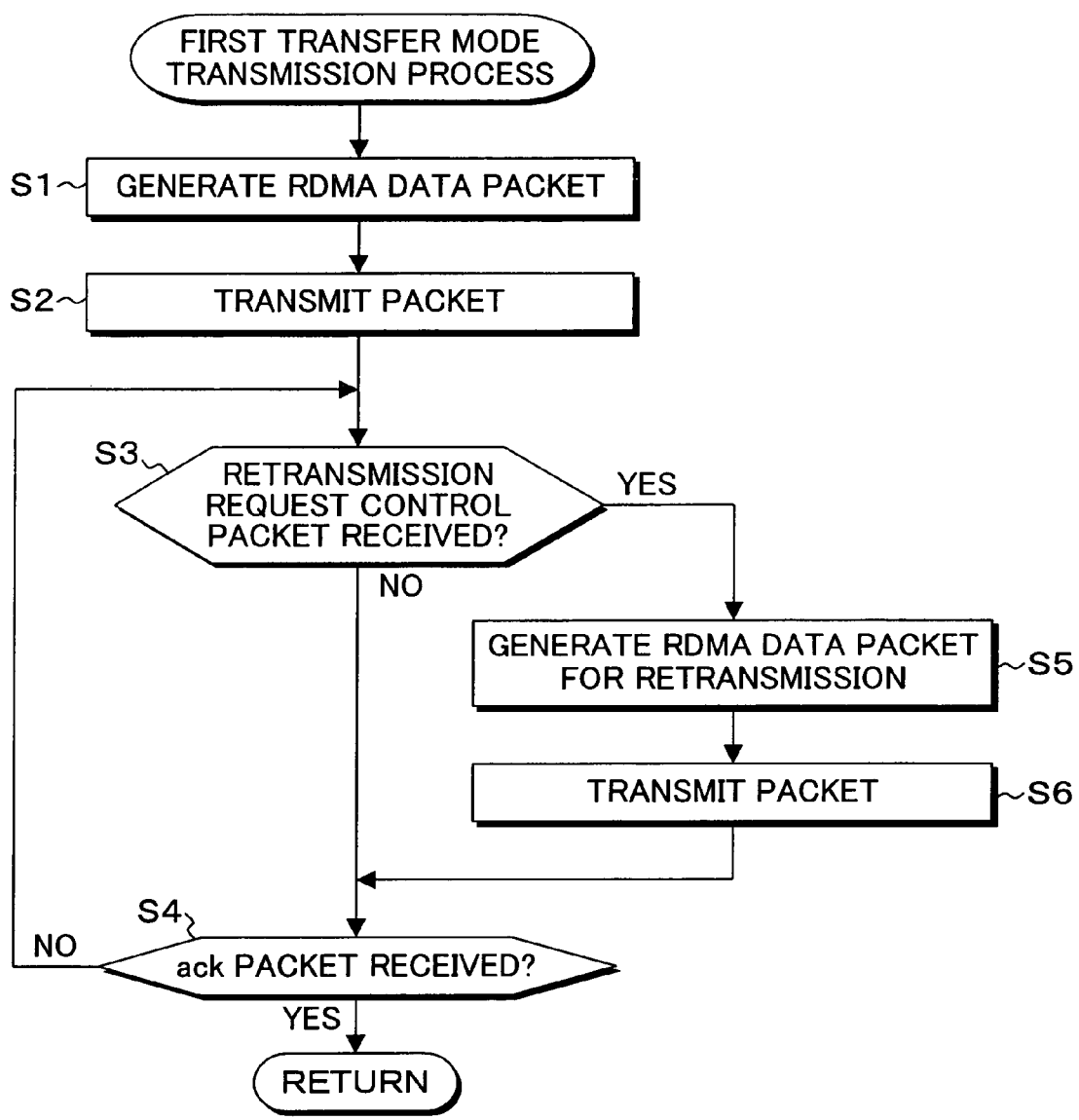
FIG. 11 is a flow chart of the first transfer mode transmission process.

FIG. 11 is a flowchart of a first transfer mode transmission process. In the first transfer mode transmission process, an RDMA data packet is generated in step S1, and the packet is transmitted to the network in step S2. Subsequently, whether a retransmission request control packet is received or not is checked in step S3, and, if the receiving area is permitted in the receiving side, an ack packet is received so as to terminate the series of transfer processes in step S4. Meanwhile, if the receiving area is unpermitted in the receiving side, since a retransmission request control packet is transmitted when the receiving area is changed to be permitted, when the retransmission request control packet is received in step S3, the process proceeds to step S5 in which an RDMA data packet for retransmission is generated corresponding to a retransmission request which is obtained by analyzing the retransmission request control packet, the packet is transmitted to the network in step S6, and reception of the ack packet is awaited in step S4 so as to terminate the series of data transfer processes.

FIG. 12 is a flow chart of a first transfer mode reception process. In FIG. 12, in the first transfer mode reception process, whether an RDMA data packet is received or not is checked in step S1; when the packet is received, the RDMA data packet is analyzed in step S2; and the transfer area control table is referenced in step S3 so as to obtain the physical address and permission of the receiving area. Subsequently, if reception in the receiving area is permitted in step S4, the process proceeds to step S5 in which the data body obtained from the received packet is transferred to the permitted receiving area, and the ack packet indicating transfer completion is generated and transferred in step S6 so as to terminate the series of reception processes. Meanwhile, if reception of the receiving area is unpermitted in step S4, the received packet is discarded in step S7, and the fact that the received packet is discarded is recorded in the transfer area control table in step S8. Subsequently, in step S9, presence or absence of reception permission of the receiving area is checked with respect to the transfer area control table; and, when the reception unpermission is changed to reception permission, the process proceeds to step S10 in which, based on the record of the received packet discarding in the transfer area control table, a retransmission request control packet is generated and transmitted to the transmission source. With respect to the transmission of this retransmission request control packet, an RDMA data packet is retransmitted from the transmission source; therefore, when the retransmitted RDMA data packet is received in step S1, the processes of steps S2 to S6 are performed, thereby completing the reception process.

(Second Transfer Mode)

Figure 13A:
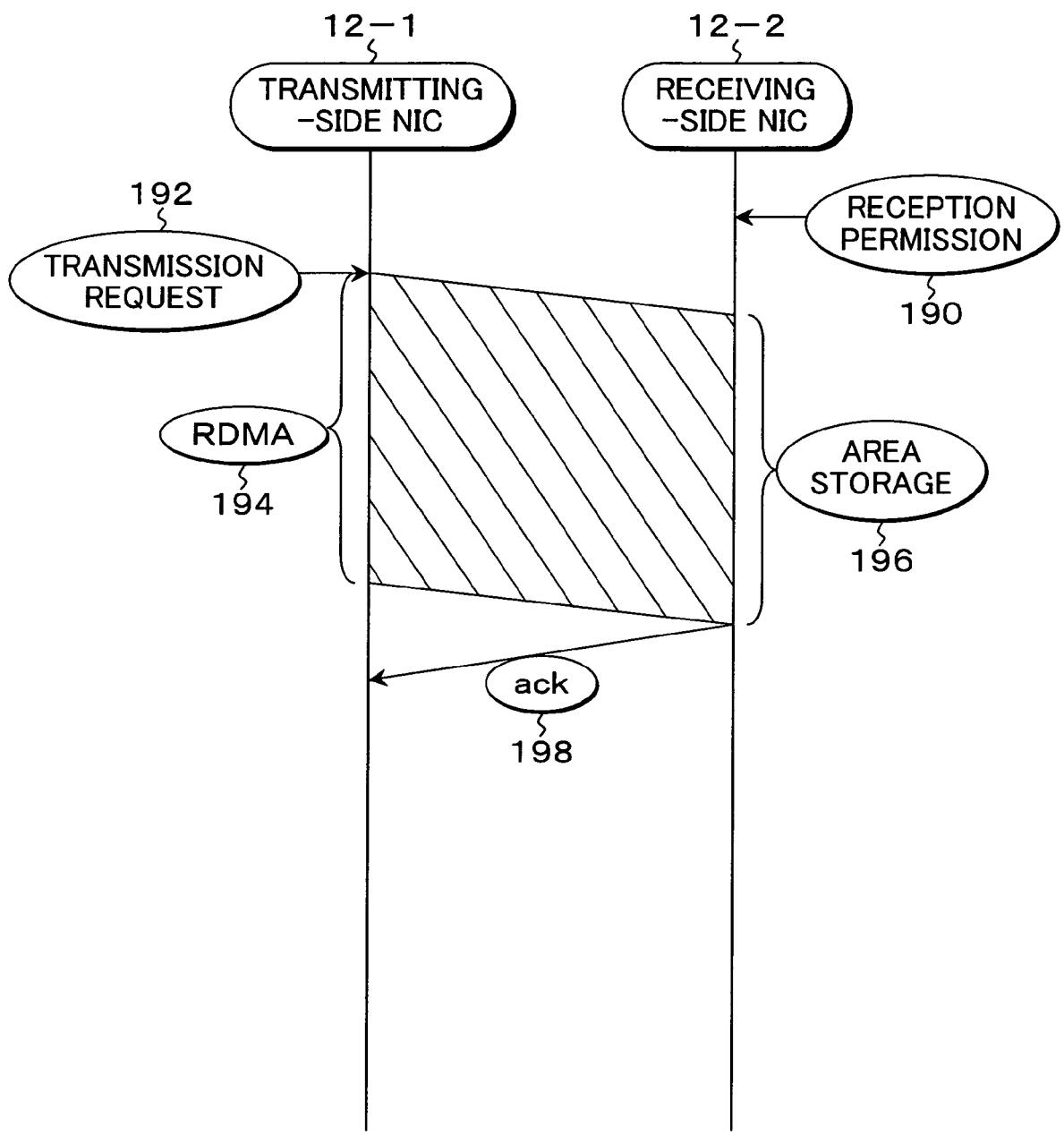
FIGS. 13A and 13B are explanatory diagrams of transfer processes according to the second transfer mode in the present embodiment.
Figure 13B:
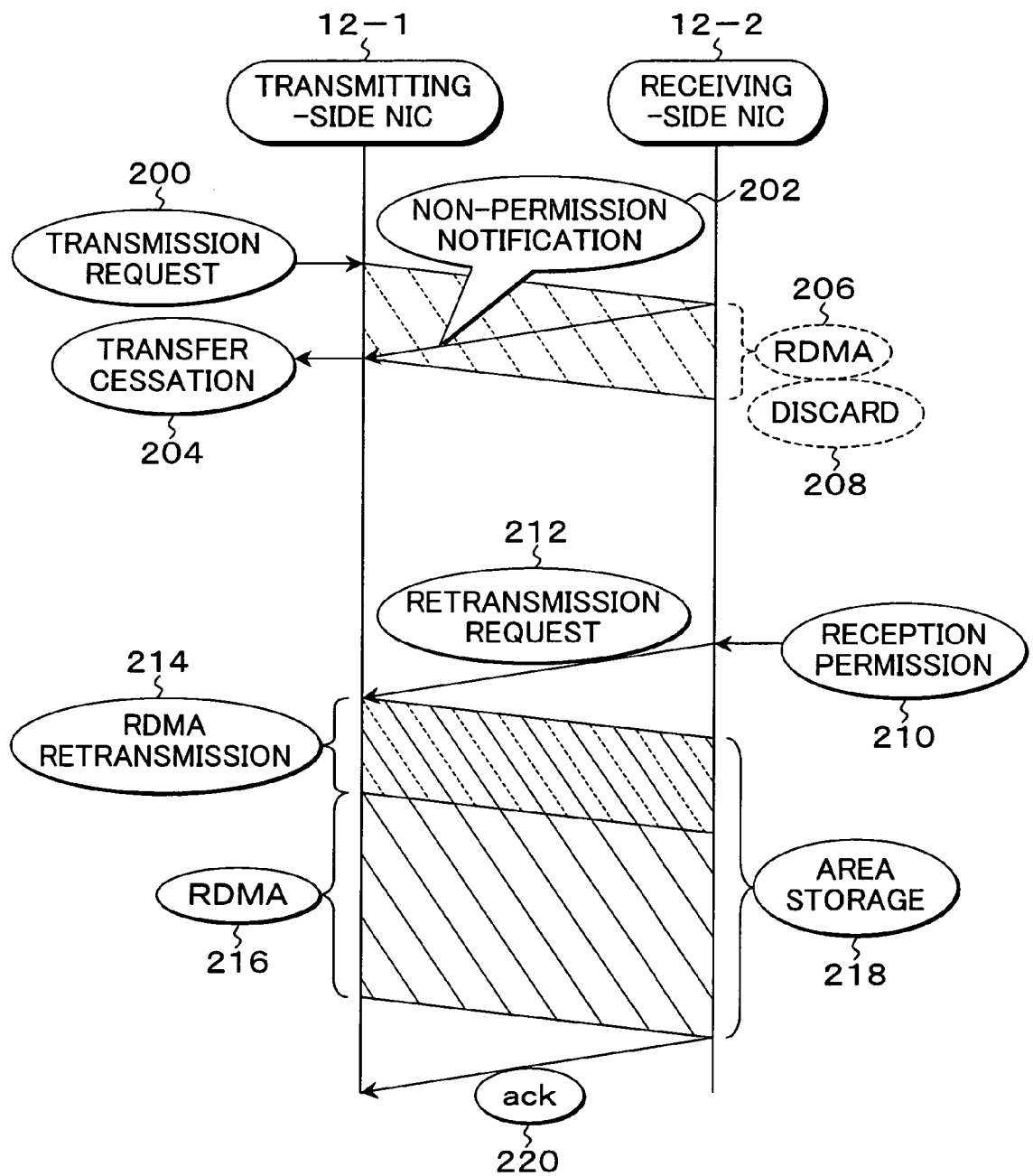

FIGS. 13A and 13B are explanatory diagrams of second transfer mode processes in the second transfer mode in the present embodiment. The second transfer mode is a process in which transfer is speculatively performed without inquiring the transfer destination, the transfer is ceased in response to a permission notification if it is unpermitted, and retransmission is performed in response to a retransmission request.

FIG. 13A is a transfer process of the second transfer mode in the case in which it is receivable before transfer is started. In this case, when reception is permitted 190 in the receiving-side NIC 12-2, and then a transmission request 192 is generated in the receiving-side NIC 12-1 with respect to the receiving area, an RDMA data packet is generated from the transmission data, and RDMA communication 194 is performed. In the receiving-side NIC 12-2, the RDMA data packet is received so as to analyze the header, reception permission of the receiving area is determined by referencing the reception area control table, area storage 196 in which the data body of the packet of the received data is transferred to the receiving area 54 which is in a permitted state is executed, and an ack control packet 198 is transmitted when the storage is terminated so as to terminate the data transfer.

FIG. 13B is a transfer process according to the second transfer mode in the case in which it becomes receivable after transfer is started. In this case, when a transmission request 200 is generated in the transmitting-side NIC 12-1, RDMA transfer 206 is speculatively performed without inquiring the receiving side. In the receiving-side NIC 12-2, the header is analyzed when the RDMA data packet is received, unpermission of the receiving area is recognized by referencing the transfer area control table, and an unpermission notification control packet 202 is transmitted to the transmitting-side NIC 12-2. In response to this unpermission notification control packet 202, the transmitting-side NIC 12-1 performs transfer cessation 204 of the RDMA communication 206 which has been performed. The data body received in this course is discarded 208, and the data discarding is recorded in the transfer area control table. In the receiving-side NIC 12-2, when reception permission 210 is given to the receiving area after the received packet is discarded 208, a retransmission request control packet 212 is transmitted. The retransmission request control packet 212 is analyzed in the transmitting-side NIC 12-1, an RDMA data packet is generated for the transfer data to which retransmission is requested, and RDMA retransmission communication 214 is performed. When the transfer corresponding to the retransmission is finished, RDMA communication 216 for the remaining transfer data is performed. In this course, since reception of the receiving area is permitted 210 in the receiving-side NIC 12-2, the data body is obtained from the retransmitted received packet and the received packet subsequent to that so as to perform area storage 218 in which the data is transferred to and stored in the receiving area, and an ack packet 220 is transmitted when the storage is terminated so as to terminate the series of processes. In the second transfer mode, when RDMA communication is speculatively performed without inquiring the receiving side like FIG. 13(B), an unpermission notification is returned if the receiving area is unpermitted so as to cease the transfer, and wasteful loss of the discarded packet is stopped by the unpermission notification, thereby reducing the network bandwidth consumption compared with the case of the first transfer mode.

Figure 14:
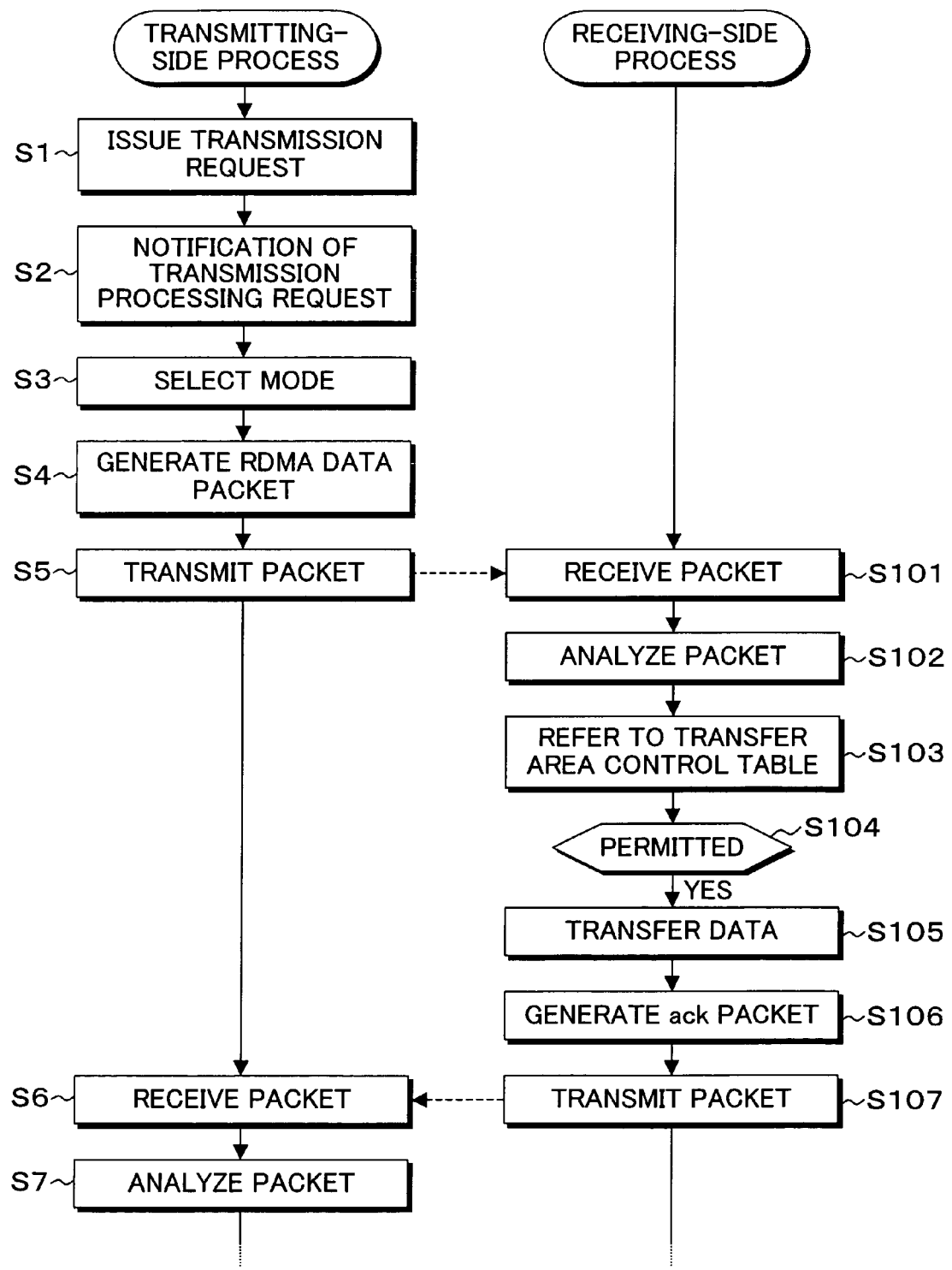
FIG. 14 is a time chart of a transfer process according to the second transfer mode in a case in which it is receivable before starting transfer.

FIG. 14 is a time chart of the transfer process according to the second transfer mode in the case in which it is receivable before transfer is started, and the transfer process of this case is same as the case of the transfer process of the first transfer mode shown in FIG. 9.

Figure 15:
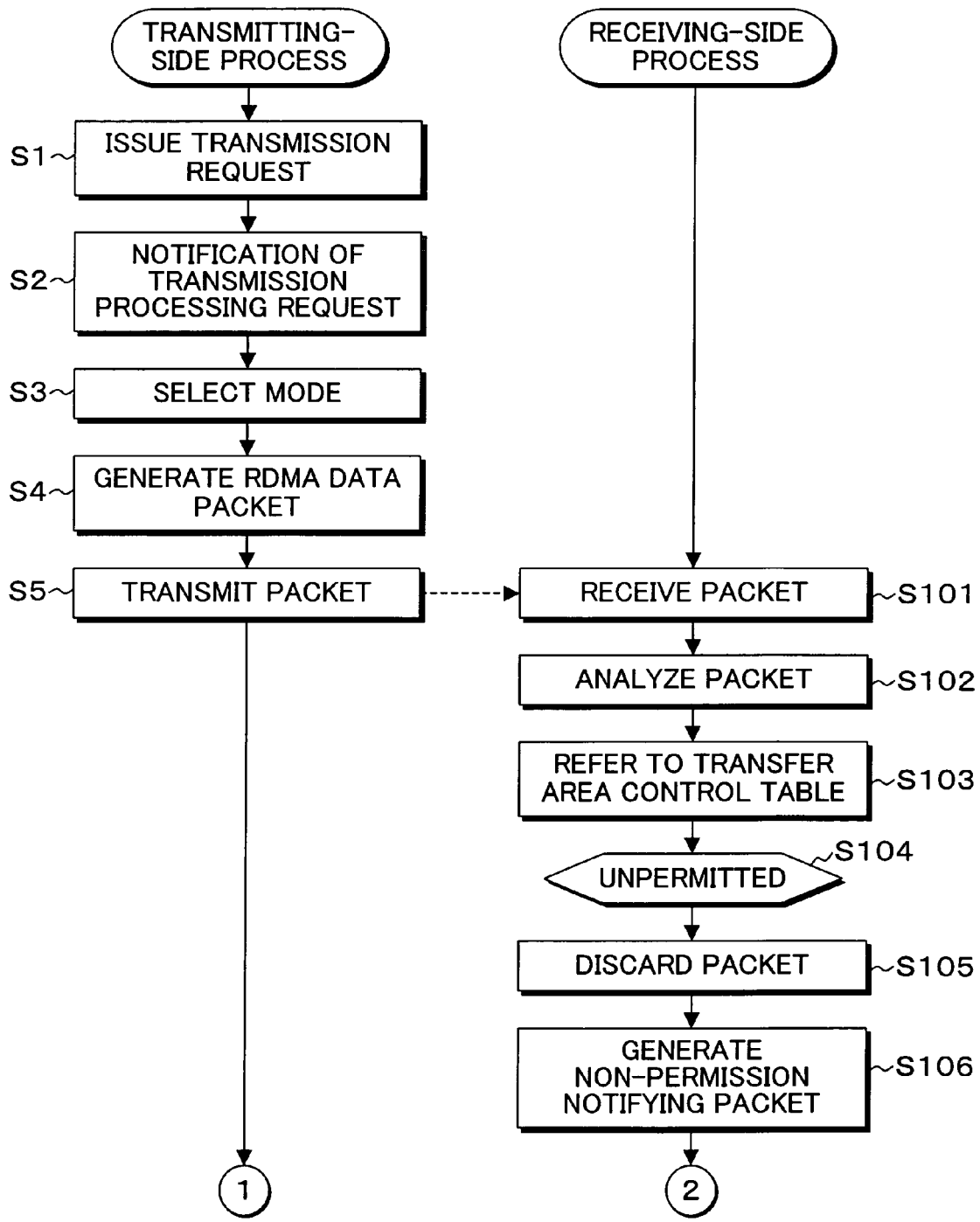
FIG. 15 is a time chart of a transfer process according to the second transfer mode in a case in which it is receivable after starting transfer.
Figure 16:
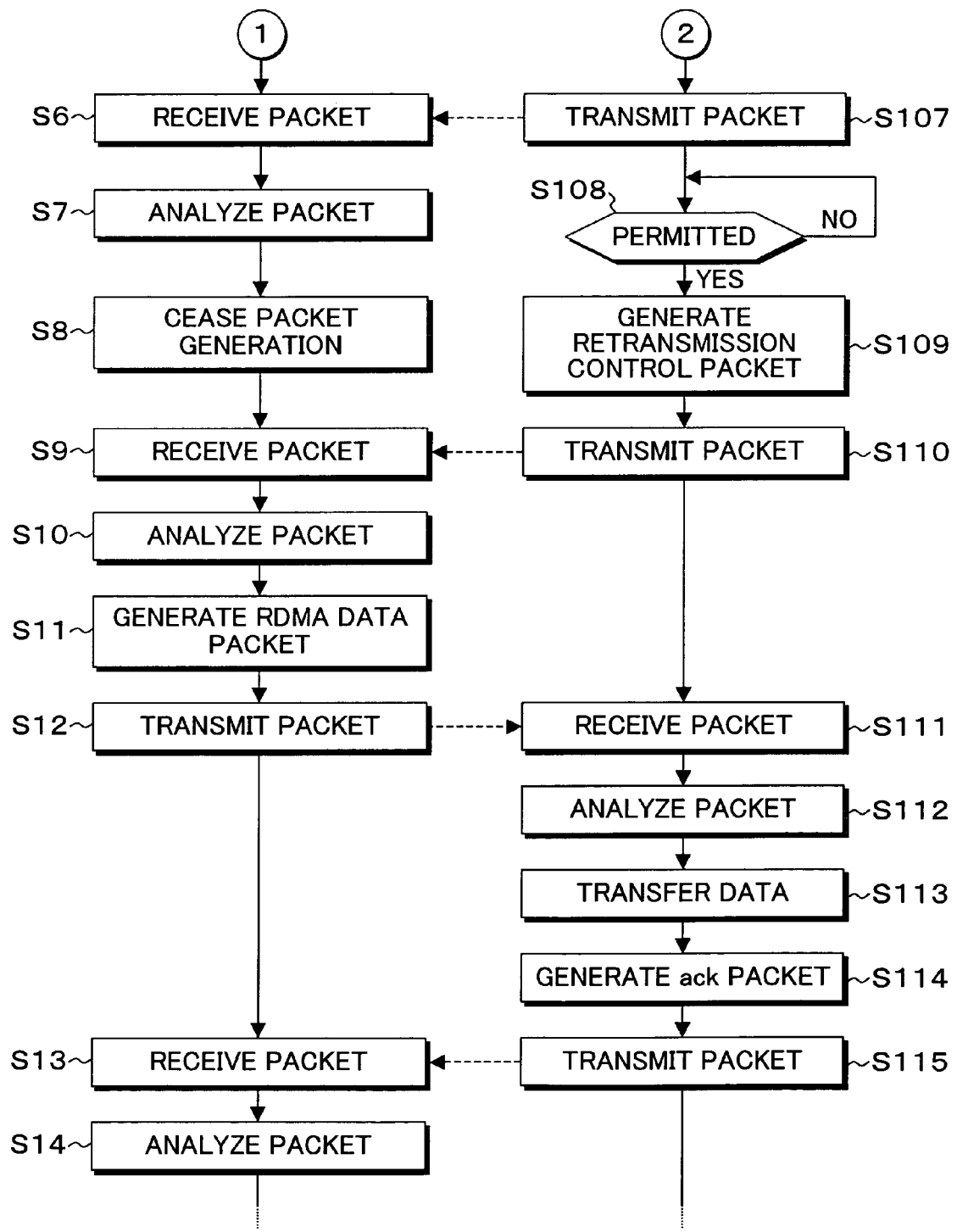
FIG. 16 is a time chart of the transfer process according to the second transfer mode subsequent to FIG. 15.
Figure 17:
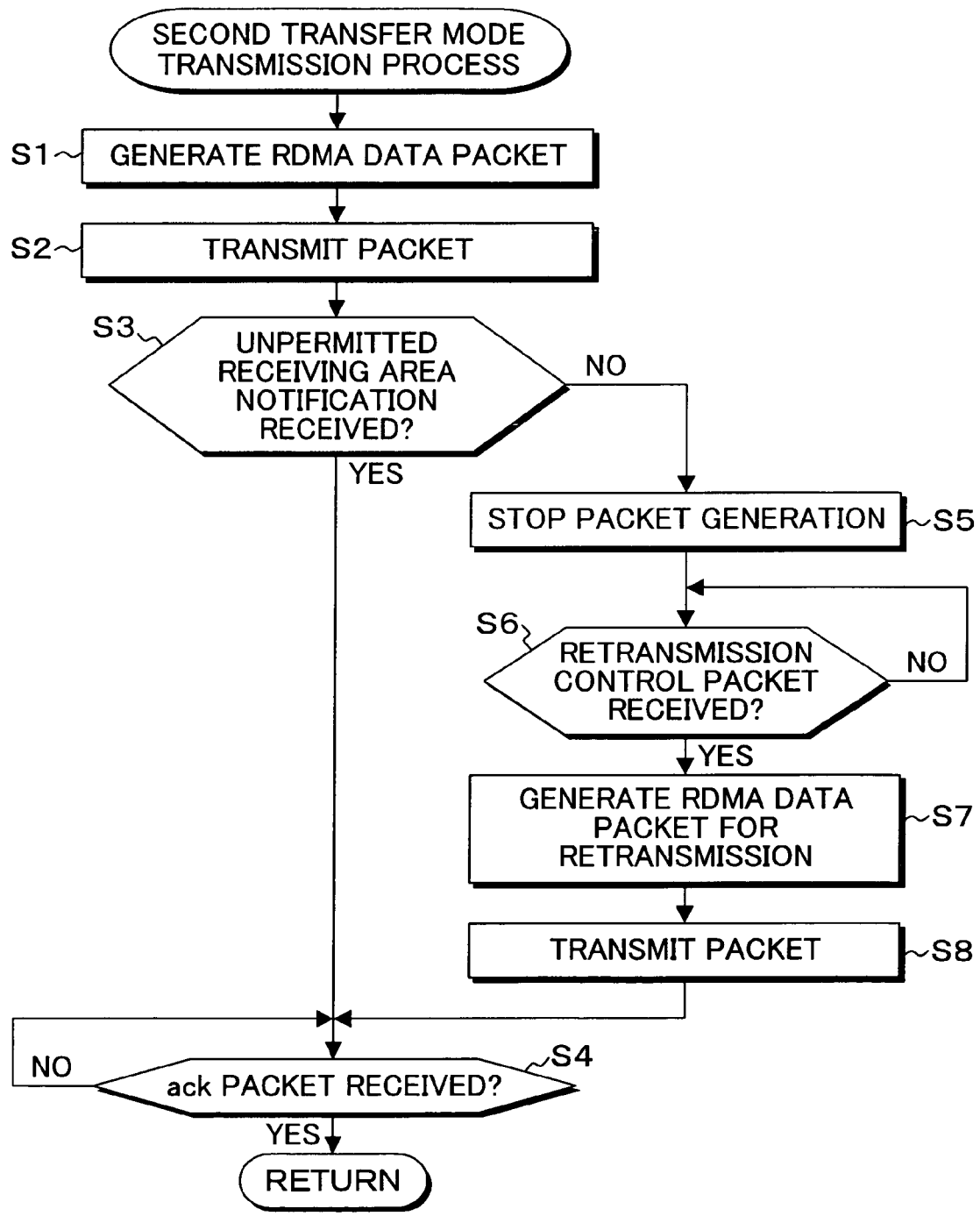
FIG. 17 is a flow chart of the second transfer mode transmission process.

FIG. 15 is a time chart of the transfer process according to the second transfer mode of the case in which it is enabled after transfer is started, and it will be described as the following with reference to FIGS. 2A and 2B. In FIG. 15, the processes of steps S1 to S5 and steps S101 to S105 of the receiving side subsequent to that are similar to the case of the first transfer mode shown in FIGS. 10A and 10B; however, in the second transfer mode, after unpermission of the receiving area is recognized and the packet is discarded in step S105, the reception control unit 40 generates the unpermission notifying packet in step S106, and the 10 Gb Ethernet MAC 50 transmits the control packet to the network in step S107. This control packet is received by the 10 Gb Ethernet MAC 38 of the transmission processing side in step S6, the transmission control unit 30 analyzes the packet and recognizes that it is an unpermission notifying packet in step S7, and packet generation from the transfer data is stopped in step S8 so as to cease the RDMA communication. After the packet transfer is ceased in the transmitting side, when permission of the receiving area is determined in step S108 in the receiving side, the transmission control unit 44 generates a retransmission control packet in step S109, and the control packet is transmitted to the network in step S110. In response to this, in the transmitting-side process, the 10 Gb Ethernet MAC 38 receives the control packet from the network in step S9, the reception control unit 32 analyzes the packet and notifies the retransmission request to the transmission control unit 30 in step S10, the communication control unit 30 generates an RDMA data packet in step S11, and the 10 Gb Ethernet MAC 38 retransmits the RDMA data packet to the network in step S12. In the receiving-side process, the 10 Gb Ethernet MAC 50 receives the retransmitted RDMA data packet in step S111, the reception control unit 40 analyzes the header of the packet and obtains reception permission and the physical address of the receiving area from the transfer area control table in step S112, and the data body is subjected to DMA data transfer to the receiving area 54 of the host 10-2 in step S113. Subsequently in step S114 of FIG. 16, the transmission control unit 44 generates an ack packet when the data transfer is completed; and, in step S115, the 10 Gb Ethernet MAC 50 transmits the ack packet to the network. In response to the packet transmission, in the receiving-side process, the 10 Gb Ethernet MAC 38 receives the packet from the network in step S13, the reception control unit 32 analyzes the received packet and notifies the transmission control unit 30 that it is an ack packet in step S14 such that data transfer completion is recognized to perform normal termination. FIG. 17 is a flow chart of a transmission process of the second transfer mode. In FIG. 17, in the second transfer mode transmission process, after an RDMA data packet is generated based on a transmission request in step S1, the packet is transmitted to the network in step S2. Subsequently in step S3, presence or absence of a reception area unpermission notification is checked. If reception of the receiving area of the receiving side is permitted, since there is no reception area unpermission notification, the process proceeds to step S4 in which reception of an ack packet is awaited so as to terminate the series of transmission processes. Meanwhile, if the receiving area is unpermitted in the receiving side, an unpermission notification of the receiving area is transmitted; therefore, when it is determined in step S3, packet generation is stopped in step S5 so as to cease the RDMA communication. Thereafter, when a retransmission control packet is received from the transfer destination in step S6, an RDMA data packet for retransmission is generated in step S7, and it is transmitted to the network in step S8. When the ack packet is received in step S4, the data transfer by the retransmission after transfer cessation is considered to be terminated, and the series of the processes are terminated.

Figure 18A:
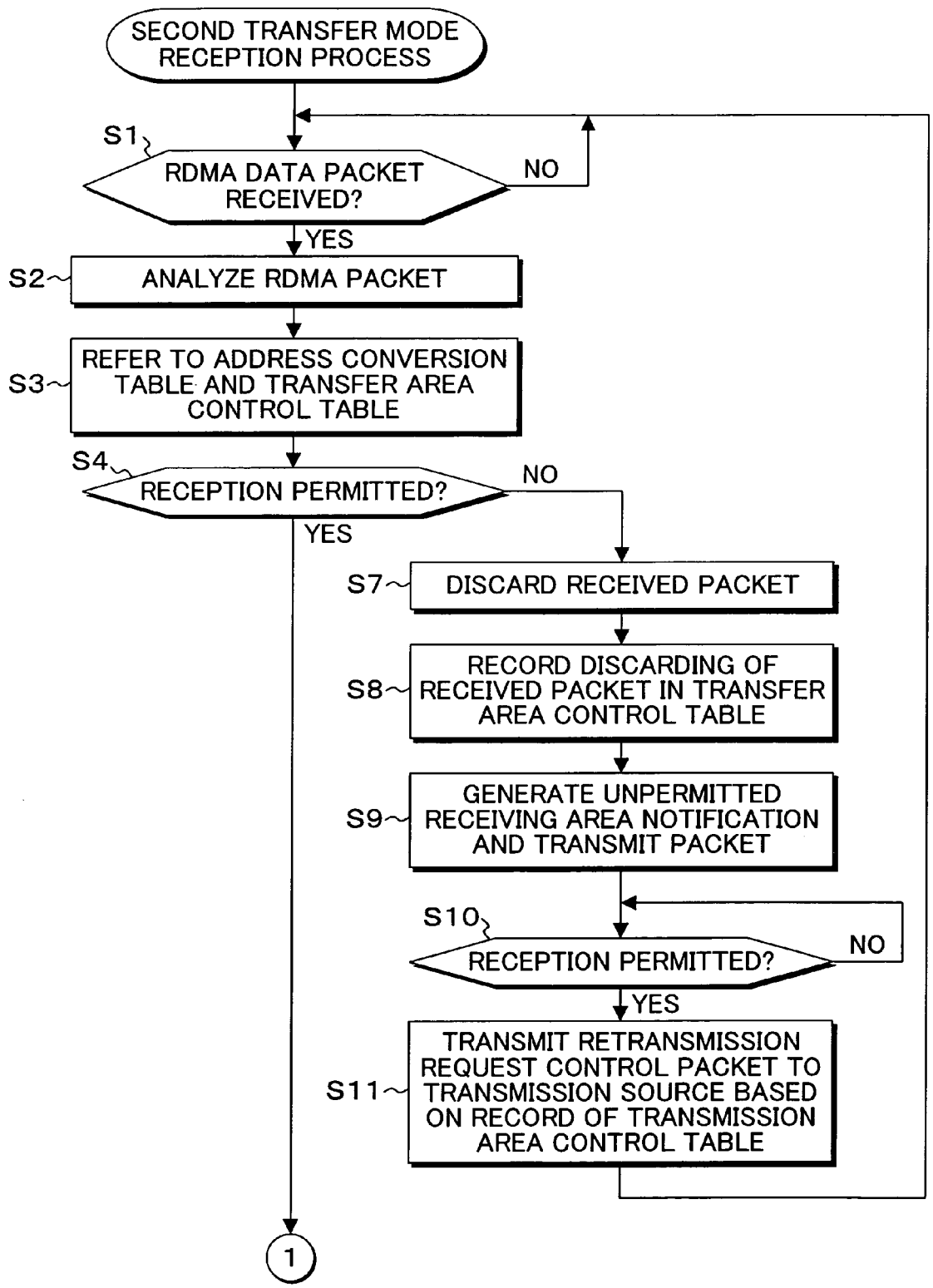
FIGS. 18A and 18B are flow charts of the second transfer mode reception process.
Figure 18B:
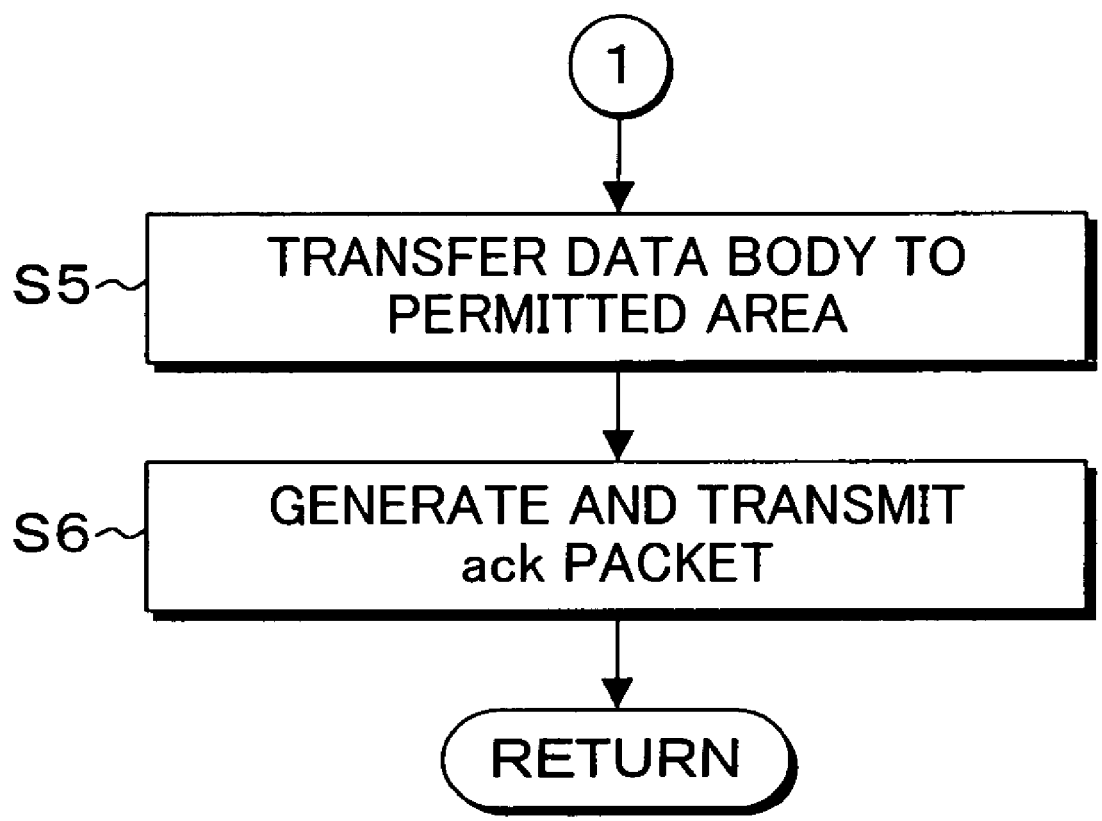

FIGS. 18A and 18B are flow charts of a second transfer mode reception process. In FIGS. 18A and 18B, whether an RDMA data packet is received or not is checked in step S1, when the packet is received, the packet is analyzed in step S2, and the physical address and reception permission or unpermission of the receiving area are obtained by referencing the transfer area control table in step S3. Subsequently, if the receiving area is permitted in step S4, the process proceeds to step S5 in which the data body obtained from the received packet is transferred to the permitted receiving area, and, when the transfer is terminated, the process proceeds to step S6 in which an ack packet is generated and transmitted so as to terminate the series of processes. Note that, when the reception permission is recognized, the permission in the transfer area control table is changed to unpermission so as to prevent double reception. Meanwhile, if the reception is unpermitted in step S4, after the received packet is discarded in step S7, the discarding of the received packet is recorded in the transfer area control table in step S8, and an unpermission notification of the receiving area is generated and packet transmission to the transfer source is performed in step S9. Thereafter, when reception permission of the receiving area is determined in step S10, a retransmission request control packet is transmitted to the transmission source based on the record of the packet discarding in the transfer area control table in step S11. In accordance with this, an RDMA data packet is retransmitted from the transmission source; therefore, it is received in step S1, and reception processes of the retransmitted RDMA data packet is performed by obtaining the processes of steps S2 to S6.

(Third Transfer Mode)

Figure 19A:
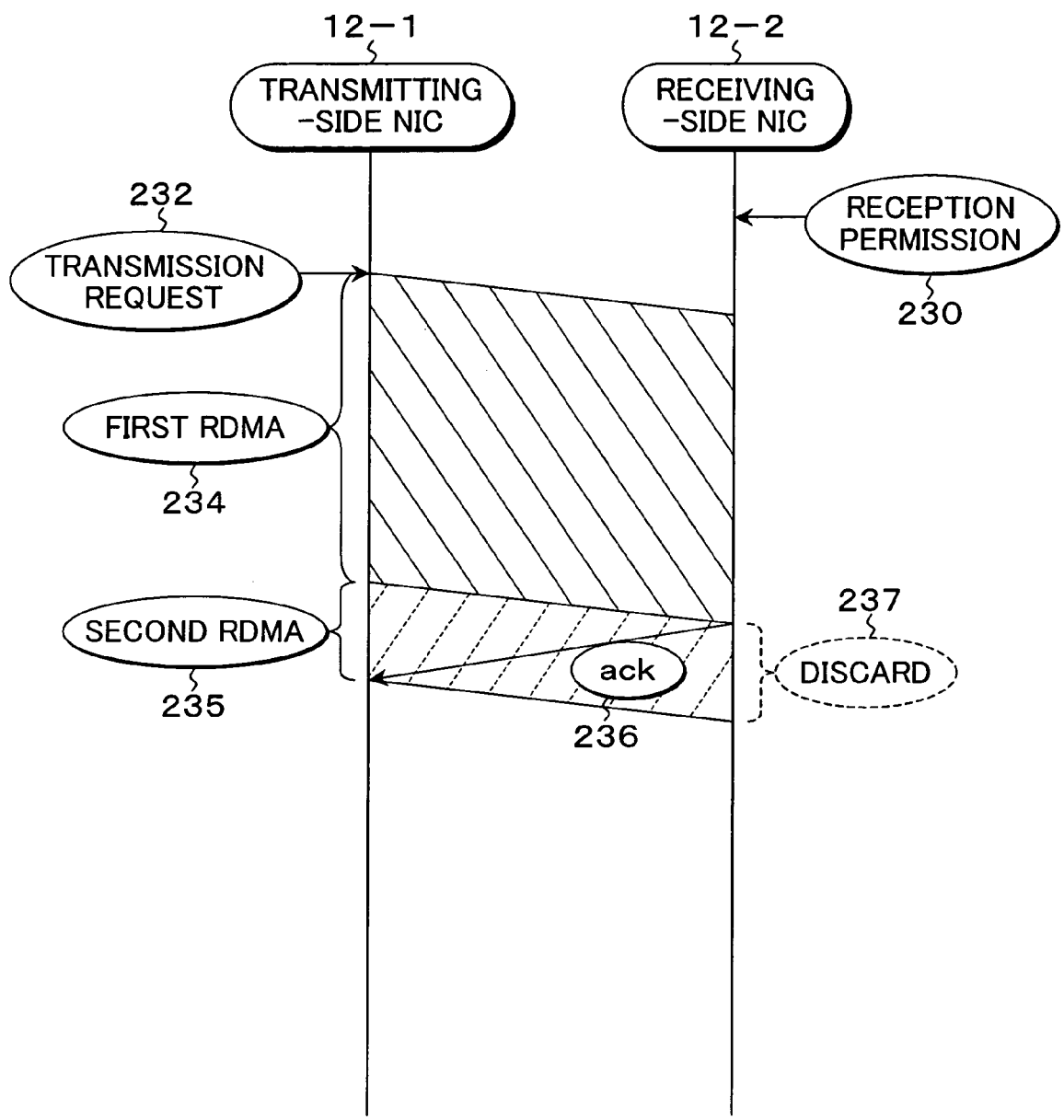

FIGS. 19A and 19B are explanatory diagrams of transfer processes according to the third transfer mode in the present embodiment. The third transfer mode is a process in which an RDMA data packet corresponding to transfer data is speculatively and repeatedly transferred until ack which is a transfer completion notification is received without inquiring permission of the transfer destination. The process according to the third transfer mode is under the assumption that the bandwidth of the network is satisfactory excessive; consequently, RDMA transfer is repeated as many times until ack is received in order to shorten transfer time.

FIG. 19A is the transfer process of the third transfer mode in the case in which it is receivable before transfer is started. In FIG. 19A, when a transmission request 232 is generated in the transmitting-side NIC 12-1, in the receiving-side NIC 12-2, reception permission 230 is given before that for the receiving area which is the object of the transmission request 232. When an RDMA packet is generated in this state from transfer data, and RDMA first communication 234 is performed, since the reception of the receiving area is permitted in the receiving side, the body data of the received packet is transferred to the receiving area so as to complete storage, and an ack control packet 236 is returned when the transfer is completed so as to terminate the series of processes. Note that, in the transmitting side, RDMA second communication 235 is continued until the ack control packet 236 is received. In the receiving side, since unpermission is set in the transfer area control table at the point when the RDMA first communication 234 is transferred to the receiving area, the entire RDMA second communication 235 is discarded 237.

FIG. 19B is the transfer process of the third transfer mode in the case in which it becomes receivable after transfer is started. In FIG. 19B, when a transmission request 238 is generated in the transmitting-side NIC 12-1 side, until an ack packet is received, RDMA data packets corresponding to transfer data are generated, and data transfer is repeatedly performed like RDMA first communication 240, RDMA second communication 244, and RDMA third communication 252. Meanwhile, in the receiving-side NIC 12-2, since the receiving area is unpermitted at the time of the RDMA first communication 240, the received packet is discarded 242. In this example, reception is permitted 248 immediately after the data transfer of the RDMA second communication 244 is started; therefore, the data body of the received packet of the RDMA second communication 244 which is received after the reception is permitted 248 is transferred to the reception-permitted receiving area so as to perform area storage 250. However, the transfer data of the top part of the RDMA second communication 244 has been discarded 246. When the RDMA second communication 244 is terminated, RDMA third communication 252 is subsequently performed. When the data of the top part of the RDMA second communication 244 which has been discarded immediately before the communication permission 248 is received in the RDMA third communication 252, the data transfer is completed, and an ack control packet 254 is returned at this point; as a result, in the transmitting-side NIC 12-1, the series of data transfer is completed during the RDMA third communication 252 in which the ack control packet 254 is received. Note that, in the transmitting side, the RDMA third communication 252 is continued until the ack control packet 254 is received. The receiving side discards 256 the RDMA third communication 252 after the ack control packet 254 is transmitted.

Figure 20:
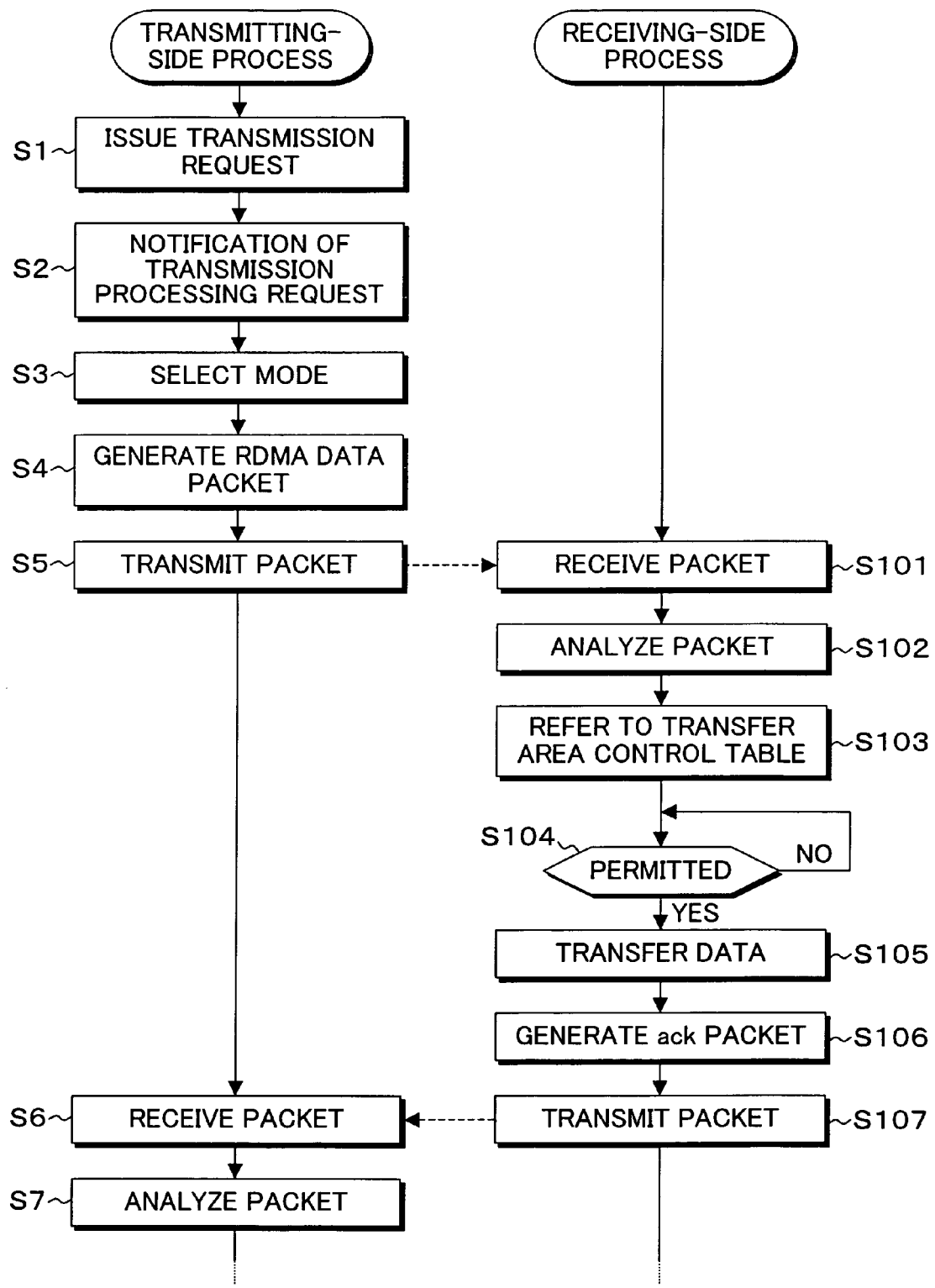
FIG. 20 is a time chart of a transfer process according to the third transfer mode.

FIG. 20 is a time chart of a transfer process according to the third transfer mode, and it will be described as the following with reference to FIGS. 2A and 2B. In the transmitting-side process, the host 10-1 issues a transmission request to the transmitting-side NIC 12-1 in step S1. In response to this, the transmission request receiving unit 26 notifies a transmission processing request to the transmission control unit 30 in step S2. Subsequently, mode selection in which the mode selection control unit 34 gives an instruction such that transfer according to the third transfer mode is activated is performed in step S3; in response to this, the transmission control unit 30 generates an RDMA data packet and outputs that to the 10 Gb Ethernet MAC 38 in step S4; and, packet transmission is performed with respect to the network in step S5. Moreover, when the RDMA data packet is generated in step S4, the transfer area control table is referenced so as to obtain the physical address of the transfer source. In the receiving-side process, the 10 Gb Ethernet MAC 50 receives the RDMA data packet from the network in step S101, the reception control unit 40 analyzes the packet in step S102, and an inquiry is made to the transfer area control unit 42 about obtainment of the reception permission and physical address according to the transfer area control table in step S103. When reception permission is determined in step S104 with respect to this inquiry, the data body of the received packet is subjected to DMA data transfer to the reception-permitted receiving area 54 of the host 10-2 in step S105, the transmission control unit 44 generates an ack packet in step S106 when the data transfer is terminated, and the ack control packet is transmitted to the network by the 10 Gb Ethernet MAC 50 in step S107. Note that, when reception permission is determined in step S104, the reception permission in the transfer area control table is changed to reception unpermission so as to prevent double reception. Meanwhile, if the state of the receiving area obtained by referencing the transfer area control table is unpermitted in step S104, it becomes a waiting process of step S104 until it is permitted, and the packets received during that are discarded. When the receiving area is permitted, the received packet is effectively received from that point, and data transfer is performed to the receiving area. In the transmitting-side process, in step S6, the 10 Gb Ethernet MAC 38 receives the ack packet from the network, and it is passed to the reception control unit 32. In step S7, the reception control unit 32 analyzes the packet, confirms the ack reception, notifies that to the transmission control unit 30, and completes the transfer process.

Figure 21:
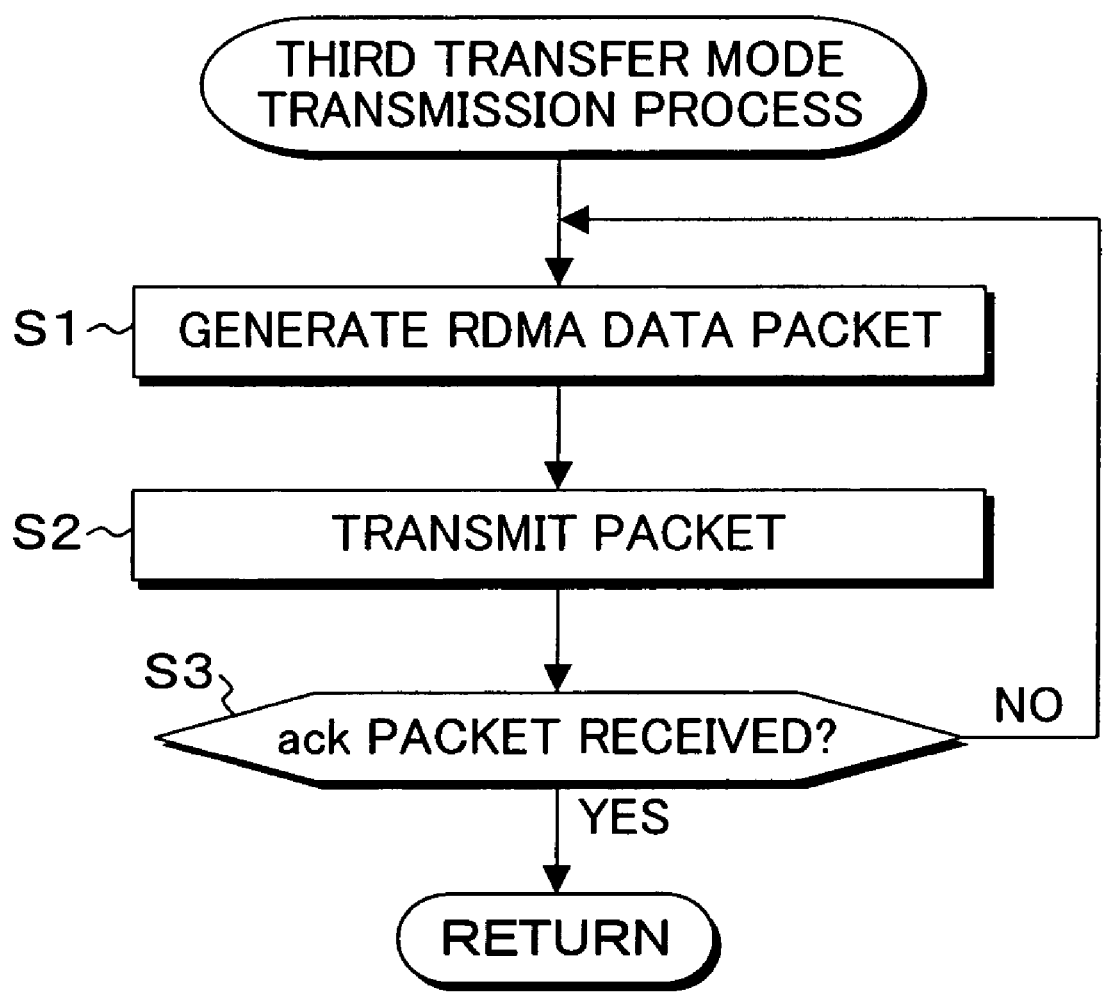
FIG. 21 is a flow chart of the third transfer mode transmission process.

FIG. 21 is a flow chart of a transmission process of the third transfer mode. In FIG. 21, in the transmission process of the third transfer mode, an RDMA data packet is generated in accordance with a transmission request in step S1, and the packet is transmitted to the network in step S2. Subsequently in step S3, whether an ack packet is received or not is checked, and the generation of the RDMA data packet and the packet transmission of steps S1 to S2 are repeated until the ack packet is received.

Figure 22:
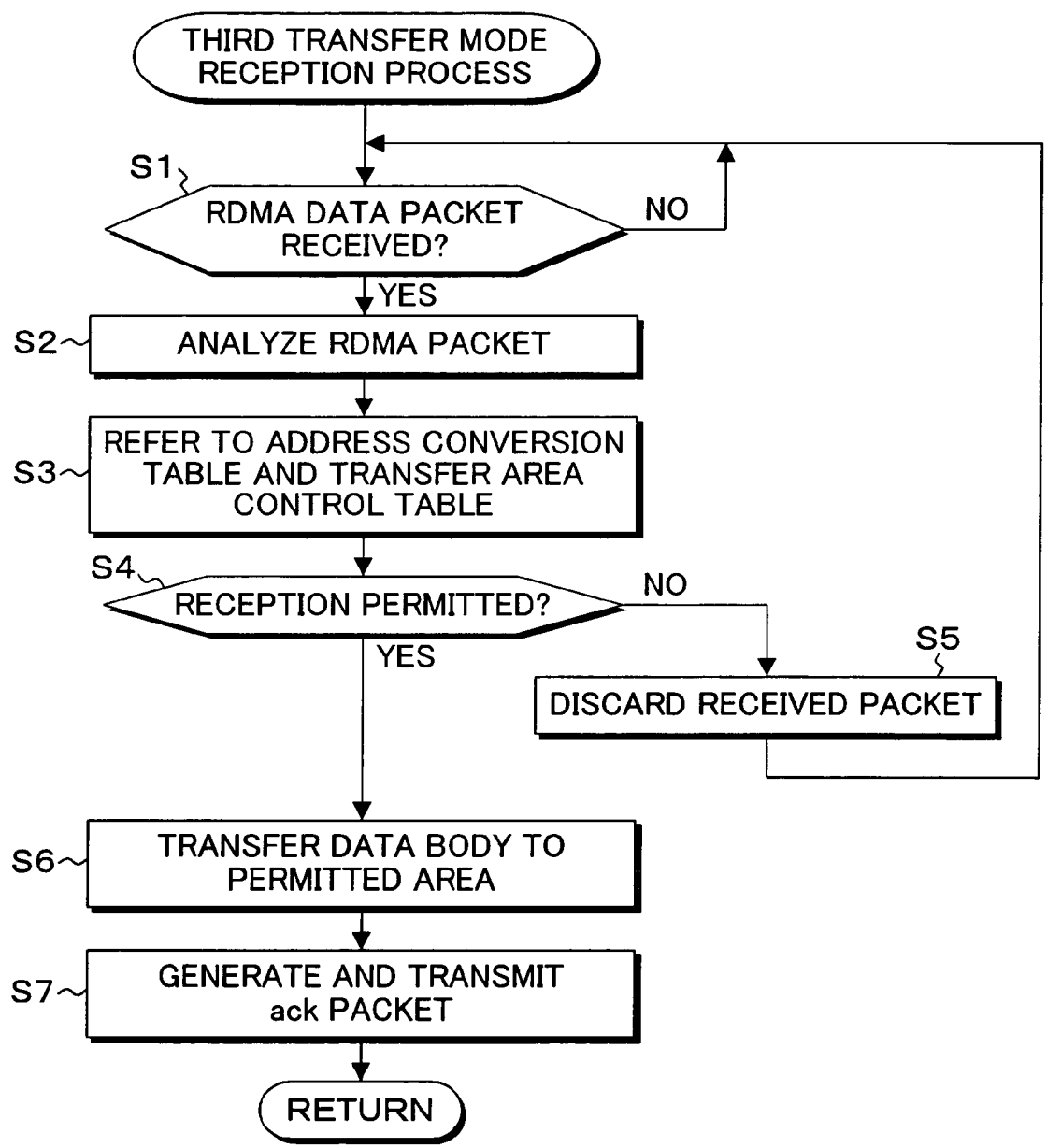
FIG. 22 is a flow chart of the third transfer mode reception process.

FIG. 22 is a flow chart of a reception process of the third transfer mode. In FIG. 22, in the third transfer mode reception process, when reception of the RDMA data packet is determined in step S1, the packet is analyzed in step S2, and the transfer area control table is referenced in step S3 so as to obtain the physical address and presence of permission of the receiving area. Subsequently, if reception of the receiving area is permitted in step S4, the data body of the received packet is transferred to the permitted receiving area in step S6, and, when the data transfer is terminated, an ack packet is generated and transmitted to the network in step S7. Meanwhile, if the receiving area is unpermitted in step S4, the received packet is discarded in step S5, and the processes of steps S1 to S5 are repeated until reception is permitted in step S4. If reception is permitted while the received packet is being discarded, the data body of the received packet is transferred to the receiving area in step S6, and, when the transfer is completed, an ack packet is generated and transmitted to the network in step S7 so as to terminate the series of processes.

(Fourth Transfer Mode)

Figure 23A:
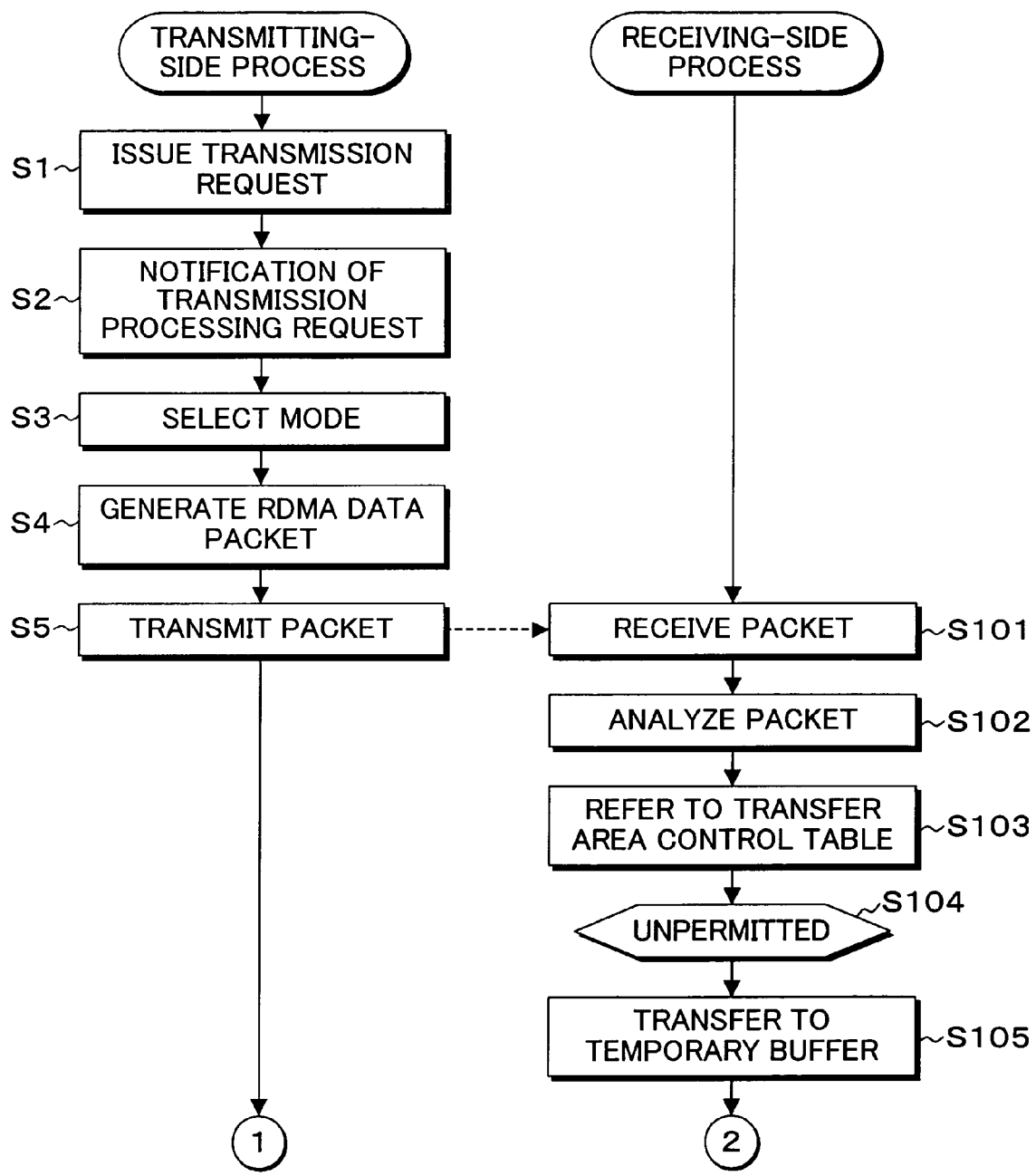
FIGS. 23A and 23B are time charts of a transfer process according to the fourth transfer mode in the present embodiment.
Figure 23B:
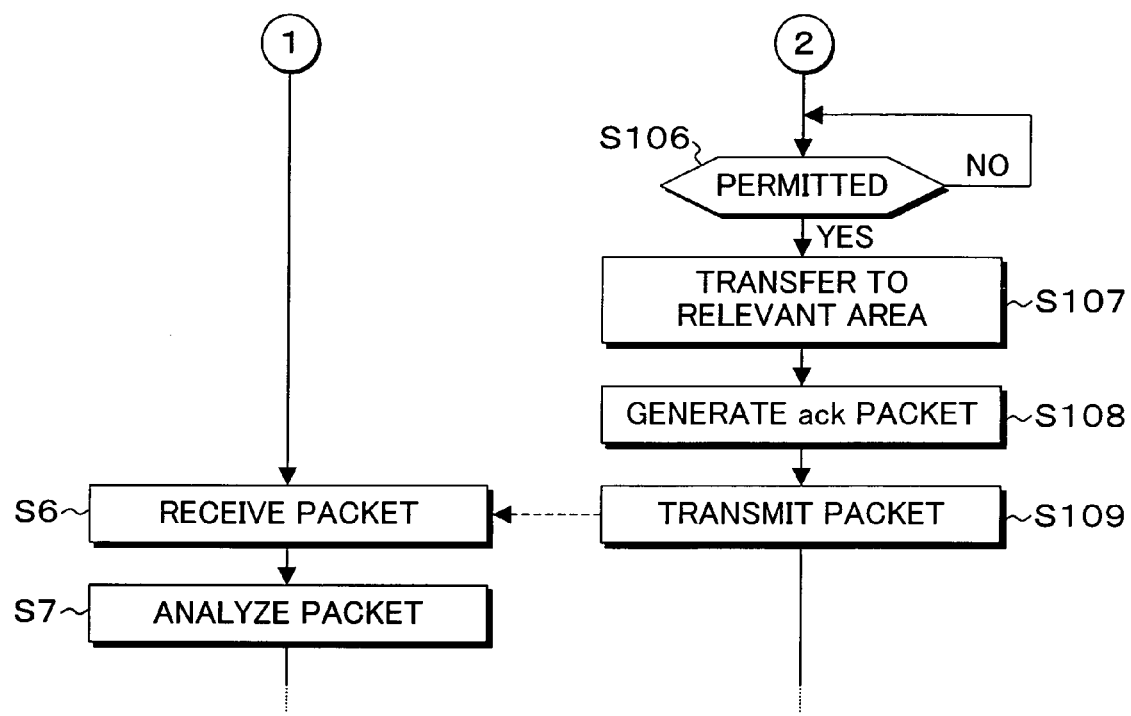

FIGS. 23a and 23B are time charts of a transfer process according to the fourth transfer mode in the present embodiment. The fourth transfer mode in the present embodiment is a process in which transfer is speculatively performed without inquiring the transfer destination about permission, it is saved in the temporary buffer in the case of unpermission, transfer from the temporary buffer to the receiving area is performed when permission is obtained. In the transfer process in the fourth transfer mode, when a memory is satisfactorily excessive in the host of the receiving side, the data body obtained from a received packet is not discarded but saved in the temporary buffer if the receiving area is unpermitted, and the saved data in the temporary buffer is transferred to the receiving area after reception of the receiving area is permitted; consequently, retransmission which is performed when the receiving area is unpermitted in the first transfer mode or the second transfer mode becomes unnecessary, and wasteful usage of the network due to data transfer which is repeatedly performed until reception is completed like the third transfer mode can be avoided. In the process of the transmitting side in the fourth transfer mode, when RDMA can be transmitted by a transmission request from the host side, RDMA communication is speculatively started without inquiring the receiving side about the presence or absence of reception permission of the receiving area, and the transmission is completed when an ack packet is received. Meanwhile, in the process of the receiving side in the fourth transfer mode, when the RDMA packet is received, the transfer area control table is referenced, and, if reception of the receiving area is permitted, the data boy of the received packet is transferred to the receiving area and stored. In this course, in order to prevent double reception, transfer permission of the receiving area is changed to unpermission. When the transfer process of the receiving area is completed, an ack packet is returned. Meanwhile, if the receiving area is unpermitted when the RDMA data packet is received, the data body of the received packet is transferred to and saved in a buffer area which is registered in advance and functions as the temporary buffer. In this course, the address of the buffer area of the temporary buffer in which the data is saved is stored in the transfer area control table. Thereafter, when reception permission is obtained for the receiving area, based on the information corresponding to the buffer saving stored in the receiving area control table, the saved data of the buffer area is moved to the receiving area as a process of the host side, and an ack packet is returned when the movement is completed. The process of such fourth transfer mode will be described as the following with reference to FIGS. 2A and 2B according to the time chart of FIGS. 23A and 23B.

In FIGS. 23A and 23B, in the transmitting-side process, when the host 10-1 issues a transmission request to the transmitting-side NIC 12-1 in step S1, the transmission request receiving unit 26 notifies the transmission control unit 30 of a transmission processing request in step S2. Subsequently in step S3, the mode selection control unit 34 selects, in this case, the fourth transfer mode and gives an instruction such that transfer is issued in the fourth transfer mode. The transmission control unit 30 generates an RDMA data packet from the transfer data in step S4 and transmits the packet to the network by the 10 Gb Ethernet MAC 38 in step S5. In this course, the transmission control unit 30 obtains the physical address by referencing the transfer area control table and reads out the transfer data according to the physical address so as to perform the packet transfer. In the receiving-side process, in step S101, the 10 Gb Ethernet MAC 50 receives the RDMA packet from the network and transfers it to the reception control unit 40. In step S102, the reception control unit 40 analyzes the RDMA packet and transfers the data body to the receiving area. In step S103, the transfer area control unit 42 is inquired so as to obtain presence or absence of the permission and the physical address of the receiving area from the transfer area control table. Subsequently, in step S104, when the receiving area is unpermitted, the process proceeds to step S105 in which the data body of the received packet is transferred to and saved in the temporary buffer 56. In this course, it is stored in the data area control table that the data body of the received packet is saved in the temporary buffer 56 as transfer data 58. Subsequently, when reception permission is obtained for the receiving area in step S106, the process proceeds to step S107 in which the transfer control unit 60 of the host 10-2 side reads the transfer data 58 from the temporary buffer 56 based on the storage of the temporary buffer 56 in the transfer area control table and moves the data to the receiving area 54. When the data movement is finished, the transmission control unit 44 generates an ack packet in step S108, and the 10 Gb Ethernet MAC 50 transmits the packet to the network in step S109. The ack packet is received by the 10 Gb Ethernet MAC 38 and transferred to the reception control unit 32 in step S6 in the receiving-side process, and the reception control unit 32 recognizes that it is an ack packet and notifies that to the transmission control unit 30 in step S7 so as to complete the data transfer process.

Figure 24:
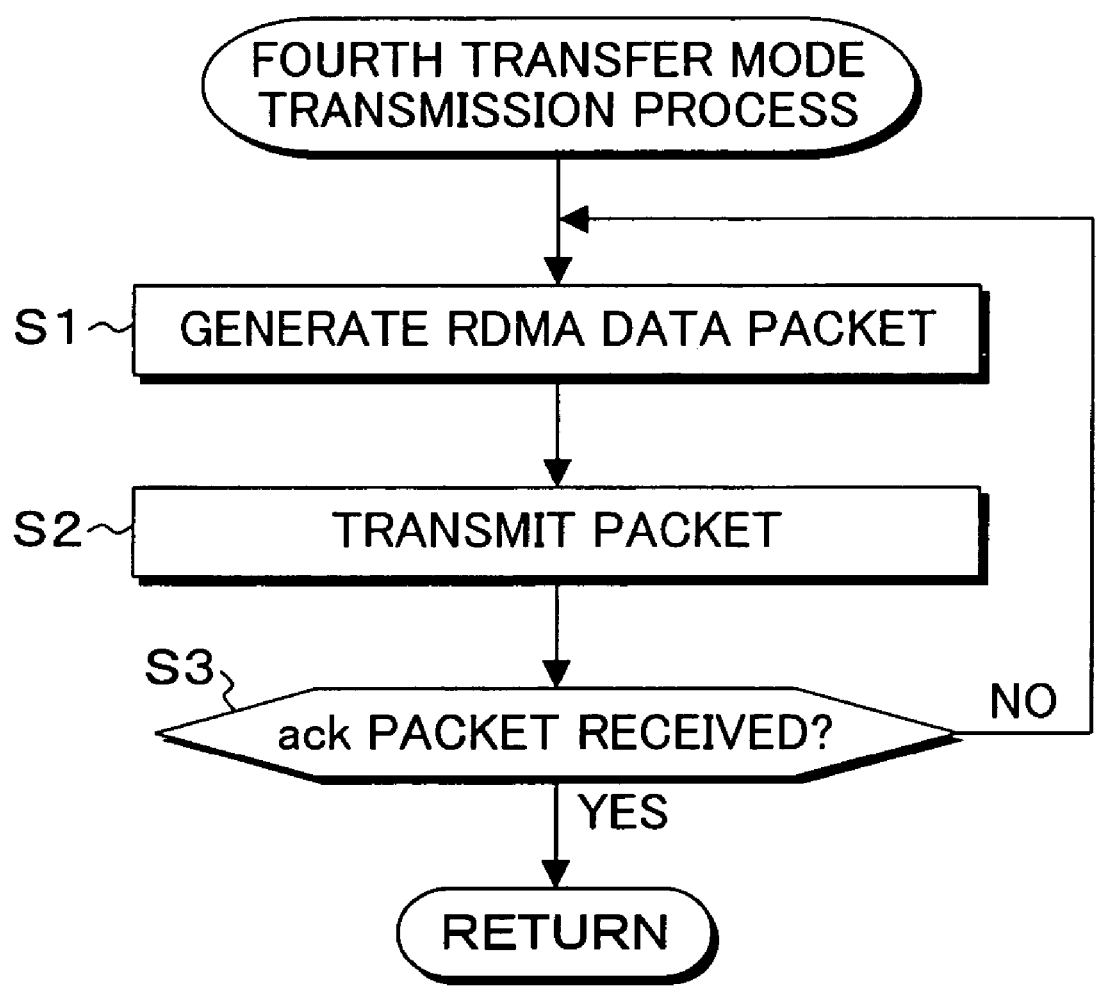
FIG. 24 is a flow chart of the fourth transfer mode transmission process.

FIG. 24 is a flow chart of a transmission process of the fourth transfer mode. In FIG. 24, in the transmission process of the fourth transfer mode, an RDMA data packet is generated based on a transmission request in step S1, and the packet is transmitted to the network in step S2. Subsequently, in step S3, transmission of the ack packet is determined, and the series of transmission processes are completed when reception of the ack packet is determined.

Figure 25:
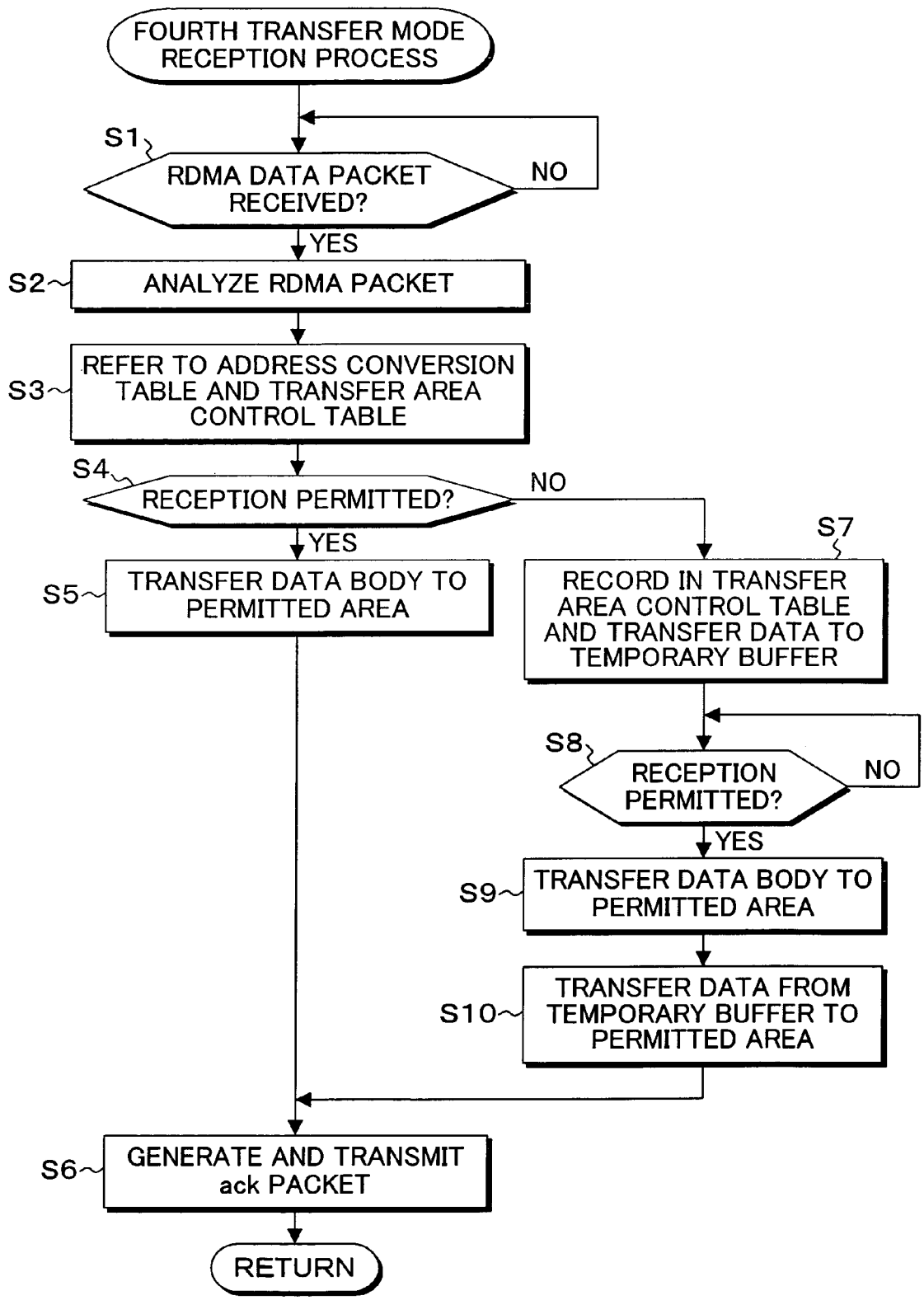
FIG. 25 is a flow chart of the fourth transfer mode reception process.

FIG. 25 is a flow chart of a fourth transfer mode reception process. In FIG. 25, in the fourth transfer mode reception process, whether the RDMA data packet is received or not is checked in step S1; when the packet is received, the packet is analyzed in step S2; and the transfer area control table is referenced so as to obtain the physical address and presence of the reception permission of the receiving area in step S3. Subsequently, if reception of the receiving area is permitted in step S4, the data body of the received packet is transferred to the permitted receiving area in step S5. In this case, in order to prevent double reception, the reception permission of the transfer area control table is changed to reception unpermission. When data transfer with respect to the receiving area is terminated, an ack packet is generated and transmitted to the transfer source in step S6. Meanwhile, if the reception of the receiving area is unpermitted in step S4, the process proceeds to step S7 in which transfer to the temporary buffer is stored in the receiving area control table, and the data body of the received packet is transferred to and saved in the temporary buffer. Subsequently, whether reception of the receiving area is permitted or not is checked in step S8, and, when the reception permission is determined, the data body of the received packet which is received at that time is transferred to and stored in the reception-permitted receiving area in step S9. Moreover, in step S10, based on the record in the transfer area control table, the saved data is read from the temporary buffer, and the data is moved to the reception-permitted receiving area. When data transfer is completed by transferring the data body of the received packet with respect to the receiving area and/or moving data from the temporary buffer, an ack packet is generated and transmitted to the transfer source in step S6.

Figure 26:
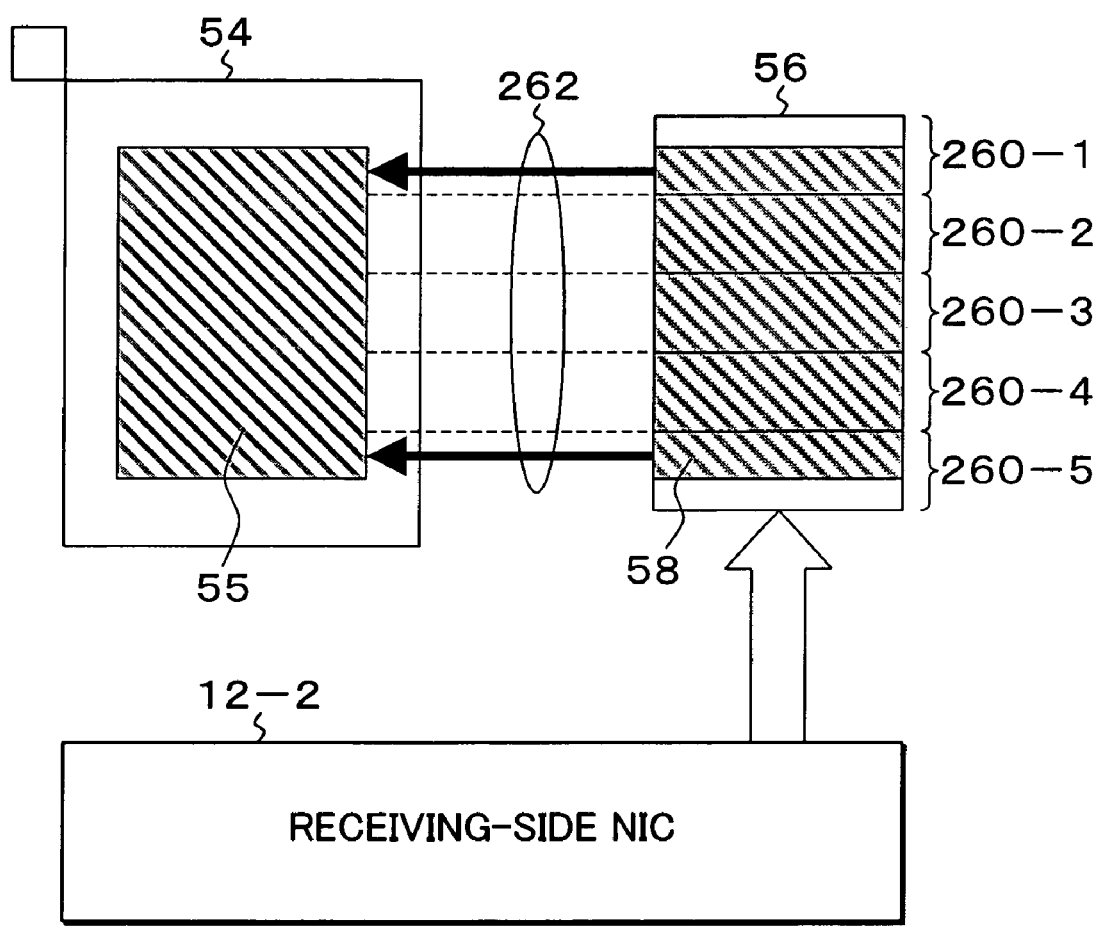
FIG. 26 is an explanatory diagram of data movement from the temporary buffer to the receiving area in the receiving side of the fourth transfer mode.

FIG. 26 is an explanatory diagram of data movement from the temporary buffer to the receiving area in the receiving side of the fourth transfer mode. In the receiving-side NIC 12-2, when reception of the receiving area is unpermitted in the reception process according to the fourth transfer mode, the data body of the received packet is transferred to and saved in the temporary buffer 56. Herein, for example, it is saved separately in areas of five pages in the temporary buffer 56, and, as shown in hatched part, the transfer data 58 is saved from the middle of a first page 260-1 to the middle of a fifth page 260-5. In such a save state of the transfer data 58 with respect to the temporary buffer 56, when reception permission of the receiving area is recognized in the receiving-side NIC 12-2, a process of moving the transfer data 58 of the temporary buffer 56 to the receiving area 54 is performed. In this movement process, copy processing is performed for the top first page 260-1 and the last fifth page 260-5; however, for a second page 260-2 to a fourth page 260-4 therebetween, since the transfer data is stored in the entire page areas, a process of mapping the address range in page units is performed, such that copy processing becomes unnecessary by virtue of the mapping process in page units and overhead of copy processing is reduced.

Figure 27:
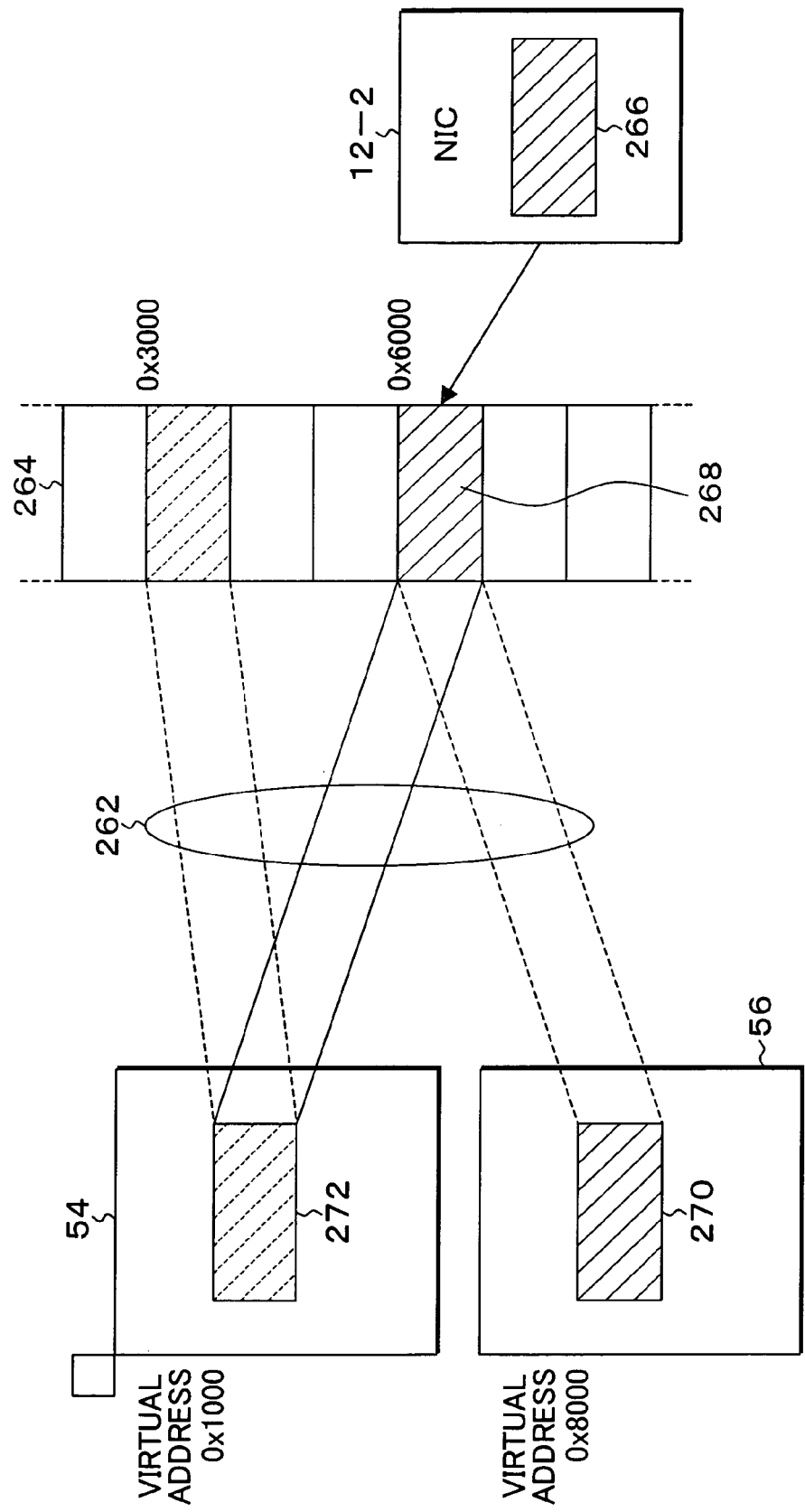
FIG. 27 is an explanatory diagram of address mapping in the data movement of FIG. 26.

FIG. 27 is an explanatory diagram of the data movement performed by address map conversion. In FIG. 27, the receiving area 54 and the temporary buffer 56 are controlled by virtual addresses (logical addresses); for example, transfer data 270 is saved at a virtual address 0x8000 of the temporary buffer 56, which means that transfer data 280 is stored at an address 0x6000 of a physical memory 264 by an address conversion table 262. Herein, a case in which the transfer data 270 of the temporary buffer 56 is to be moved to a virtual address 0x1000 of the receiving area 54 will be examined. Before movement, the virtual address 0x1000 corresponds to an address 0x3000 of the physical memory 264. This address conversion table 262 before data movement has the contents of FIG. 28A. Thereat, in order to move the transfer data 270 of the virtual address 0x8000 to the virtual address 0x1000 of the receiving area 54, remapping of rewriting the physical address 0x3000 of the virtual address 0x1000 which is the movement destination in the address conversion table 262 to the physical address 0x6000 corresponding to the transfer data 270 in the temporary buffer 56 is performed. In other words, the physical address 0x3000 corresponding to the virtual address 0x1000 in the address conversion table 262 of FIG. 28A is rewritten to 0x6000 in the manner of FIG. 28B. As a result, the transfer data 268 in the physical memory 264 corresponding to the transfer data 270 at the virtual address 0x8000 in the temporary buffer 56 of FIG. 27 is mapped with the virtual address 0x1000 of the receiving area 54 by mapping according to the address conversion table 262; thus, the transfer data 270 can be moved from the temporary buffer 56 to the virtual address 0x1000 of the reception process, thereby providing transfer data 272. Note that the physical address 0x3000 is allocated to the virtual address 0x8000 of the temporary buffer 56 as shown in FIG. 28B, and, in this case, the physical address 0x3000 is free space.

(Fifth Transfer Mode)

FIGS. 29 are explanatory diagrams of transfer processes according to the fifth transfer mode in the present embodiment. Herein, the fifth transfer mode is a process in which an inquiry is made to the transfer destination about permission and transfer is performed in response to a permission notification; although this is absolutely conventional RDMA transfer, in the present embodiment, the conventional transfer mode is added as the fifth transfer mode in selection of an optimal transfer mode in addition to the above described first to fourth transfer modes which are unique to the present embodiment.

Figure 29A:
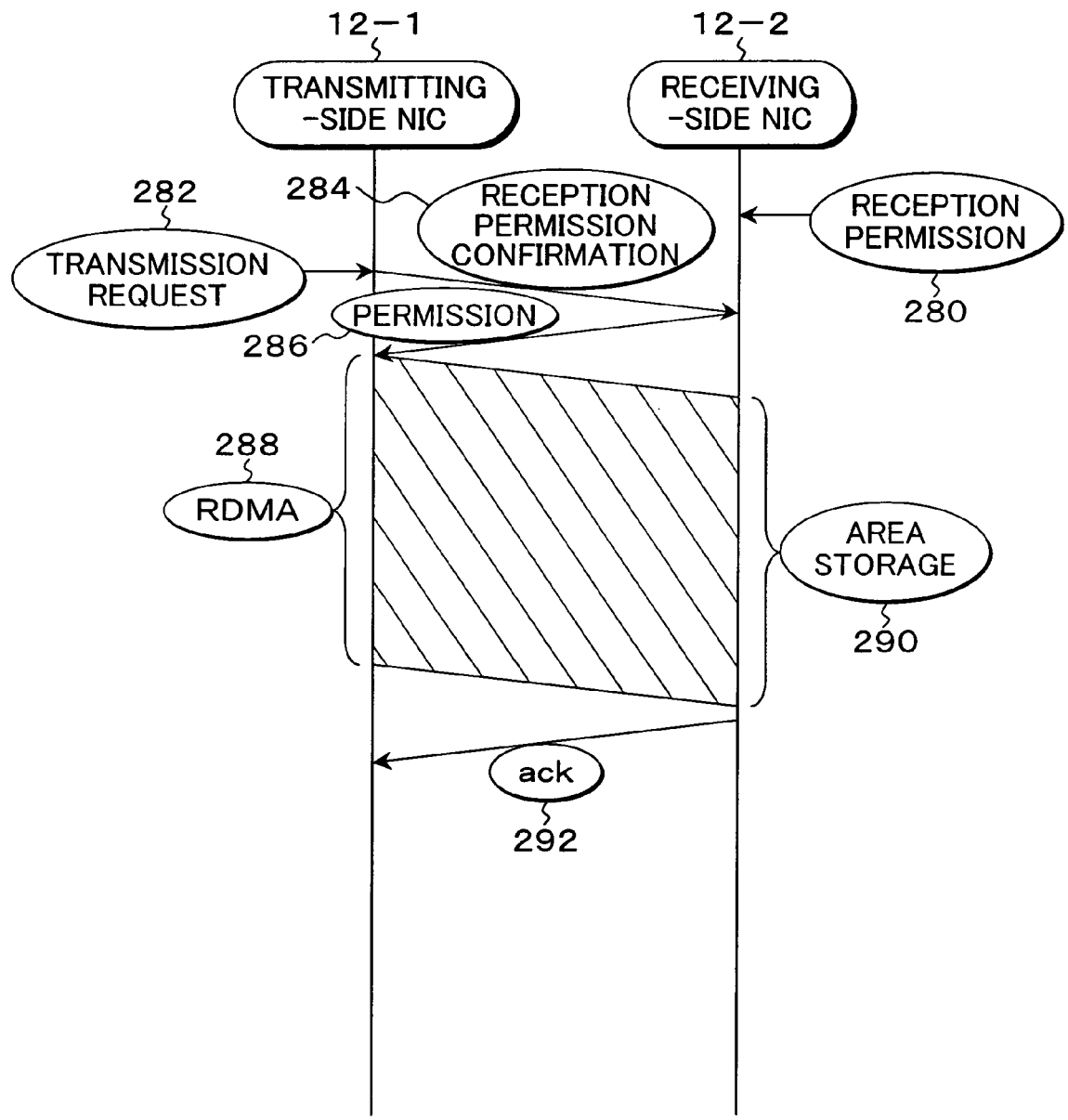
FIGS. 29A and 29B are explanatory diagrams of transfer processes according to the fifth transfer mode in the present embodiment.
Figure 29B:
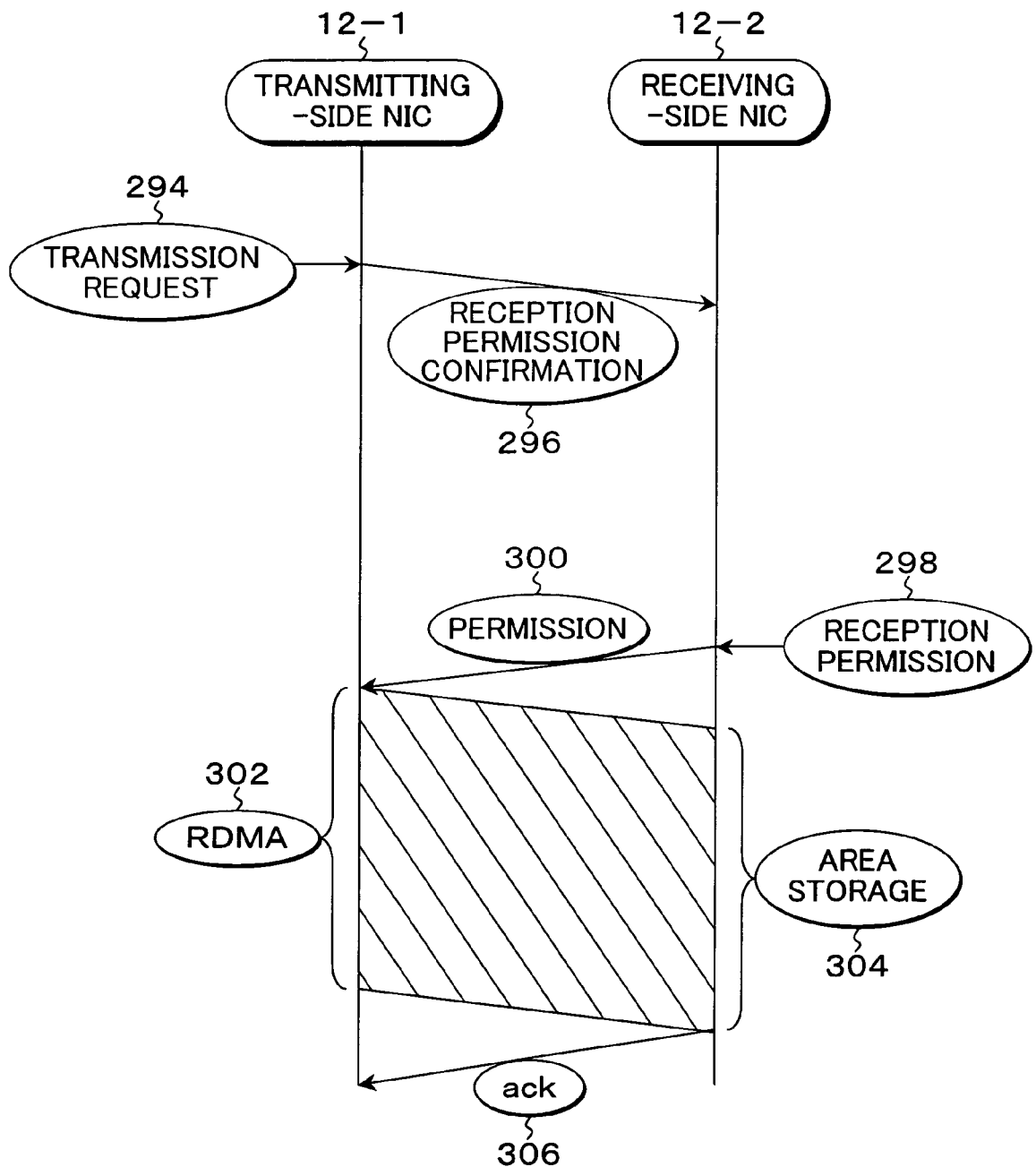

FIGS. 29A And 29B are the transfer process of the fifth transfer mode in the case in which it is receivable before transfer is started. In FIG. 29A, when a transmission request 282 is generated in the transmitting-side NIC 12-1, a reception permission confirming packet 284 is transmitted to the receiving side. At this point, since reception permission 280 has been obtained before that, the receiving-side NIC 12-2 returns a permission packet 286. In response to this, the transmitting-side NIC 12-1 generates an RDMA data packet from the transfer data and performs RDMA communication 288. Since reception of the receiving area is permitted in the receiving-side NIC 12-2, the data body obtained from the received RDMA data packet is transferred to and stored in the receiving area so as to perform area storage 290, and an ack packet 292 is transmitted when storage is terminated so as to complete the data transfer.

FIG. 29B is the case in which reception is permitted after transfer is started. When a transmission request 294 is generated, the transmitting-side NIC 12-1 transmits a reception permission confirmation packet 296 to the receiving side. The reception permission of the receiving area is not obtained in the receiving-side NIC 12-2 at this point; therefore, reception permission is awaited. Thereafter, when reception permission 298 is obtained, a permission packet 300 is transmitted. In response to this permission packet 300, the transmitting-side NIC 12-1 performs RDMA communication 302, and, when area storage 304 performed by transferring and storing the data body, which is obtained in the receiving-side from the received packet, to and in the receiving area is terminated, an ack packet 306 is transmitted so as to complete the data transfer. As described above, in the fifth transfer mode, presence or absence of reception permission of the receiving area is inquired to the receiving side when a transmission request is generated, and RDMA transfer is performed when a notification of reception permission is obtained; thus, latency is increased compared with the first to fourth modes by an amount required for the communication for inquiring the presence of permission of the receiving area.

Figure 30A:
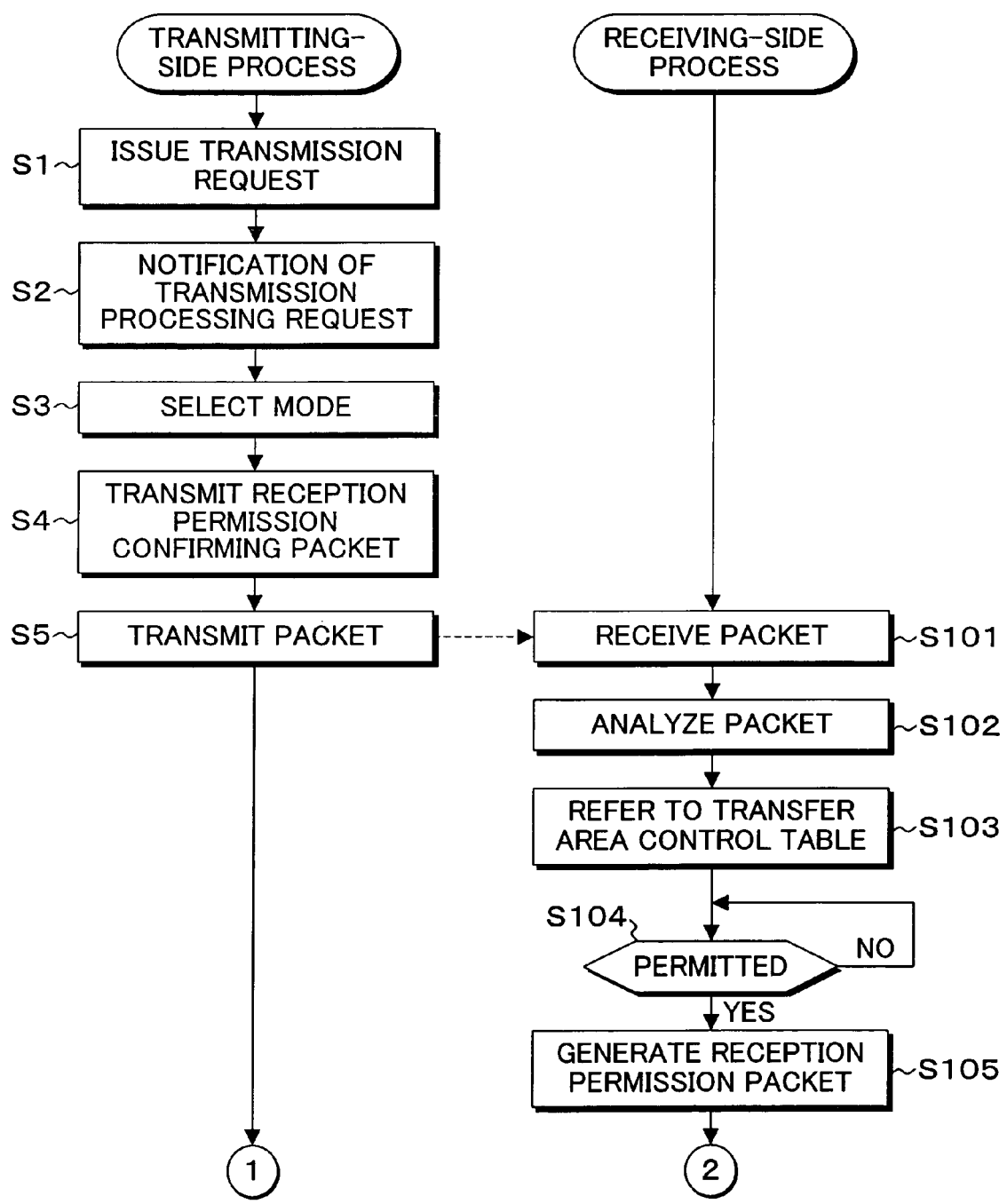
FIGS. 30A and 30B are time charts of a transfer process according to the fifth transfer mode.
Figure 30B:
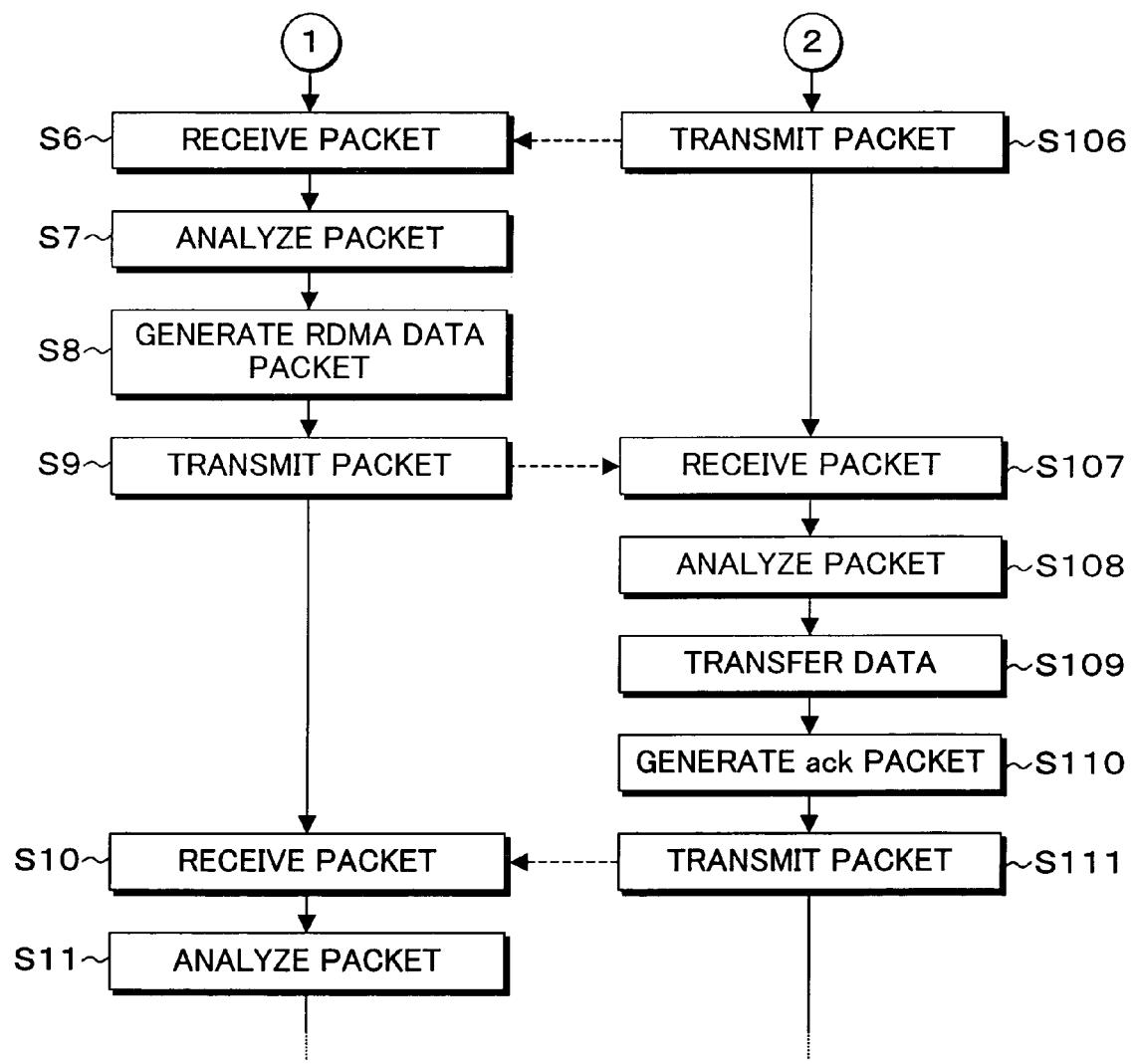

FIGS. 30A and 30B are time charts of a transfer process according to the fifth transfer mode, which will be as the following when described with reference with FIGS. 2A and 2B. In the transmitting-side process, the host 10-1 issues a reception request to the NIC 12-1 in step S1. In response to this, the transmission request receiving unit 26 notifies the transmission control unit 30 of a transmission processing request in step S2. Subsequently, in step S3, the mode selection control unit 34 gives an instruction such that, in this case, the fifth transfer mode is selected so as to activate a transfer process. Subsequently, the transmission control unit 30 generates a reception permission confirming unit in step S4, and the packet is transmitted from the 10 Gb Ethernet MAC 38 to the network in step S5. In the receiving-side process, the 10 Gb Ethernet MAC 50 receives the packet from the network and transfers it to the reception control unit 40 in step S101, the reception control unit 40 analyzes the packet in step S102, an inquiry is made to the transfer area control unit 40 in step S103 since it is a reception permission confirming packet, thereby obtaining presence or absence of reception permission of the receiving area from the transfer area control table. When reception permission is obtained in step S104, the reception control unit 40 generates a reception permission packet in step S105, and the 10 Gb Ethernet MAC 50 transmits the packet to the network in step S106. In the transmitting-side process, the 10 Gb Ethernet MAC 38 receives the packet in step S6, and the reception control unit 32 analyzes the packet and notifies the transmission control unit 30 of the reception permission in step S7. In response to this, the transmission control unit 30 generates an RDMA data packet in step S8, and the 10 Gb Ethernet MAC 38 transmits the packet to the network in step S9. In the receiving-side process, the 10 Gb Ethernet MAC 50 receives the packet and transfers it to the reception control unit 40 in step S107, and the reception control unit 40 analyzes the packet and inquires the transfer area control unit 42 so as to obtain presence or absence of reception permission and the physical address of the receiving area in step S108. Since reception of the receiving area is permitted at this point, the data body obtained from the RDMA data packet received in step S109 is transferred to the receiving area 54 of the host 10-2. When this data transfer is terminated, the transmission control unit 44 generates an ack packet in step S110, and the packet is transmitted from the 10 Gb Ethernet MAC 50 to the network in step S111. In the transmitting-side process, the 10 Gb Ethernet MAC 38 receives the ack packet and delivers it to the reception control unit 32 in step S10, and the reception control unit 32 analyzes the packet so as to confirm the ack reception and notifies the transmission control unit 30 of that in step S11 so as to complete the transfer process.

Figure 31:
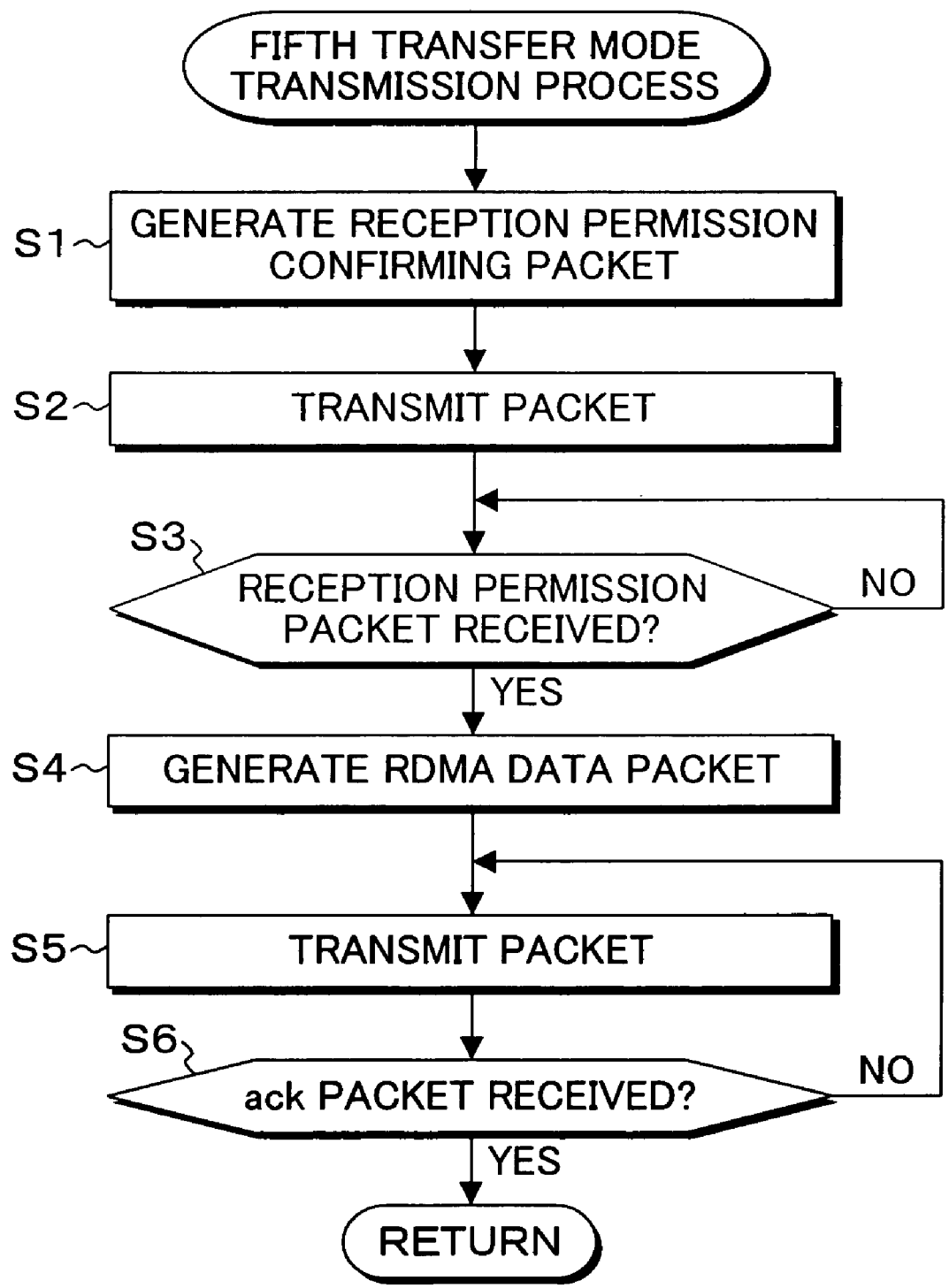
FIG. 31 is a flow chart of the fifth transfer mode transmission process.

FIG. 31 is a flow chart of the fifth transfer mode process. In FIG. 31, in the fifth transfer mode transmission process, the reception permission confirming packet is generated in step S1 when the transmission request is received, and the packet is transmitted to the network in step S2. Subsequently, presence or absence of reception of the reception permission packet from the transfer destination is checked in step S3, the RDMA data packet is generated in step S4 when the packet is received, and the packet is transmitted to the network in step S5. Then, in step S6, the series of transmission processes is terminated when reception of the ack packet is confirmed.

Figure 32A:
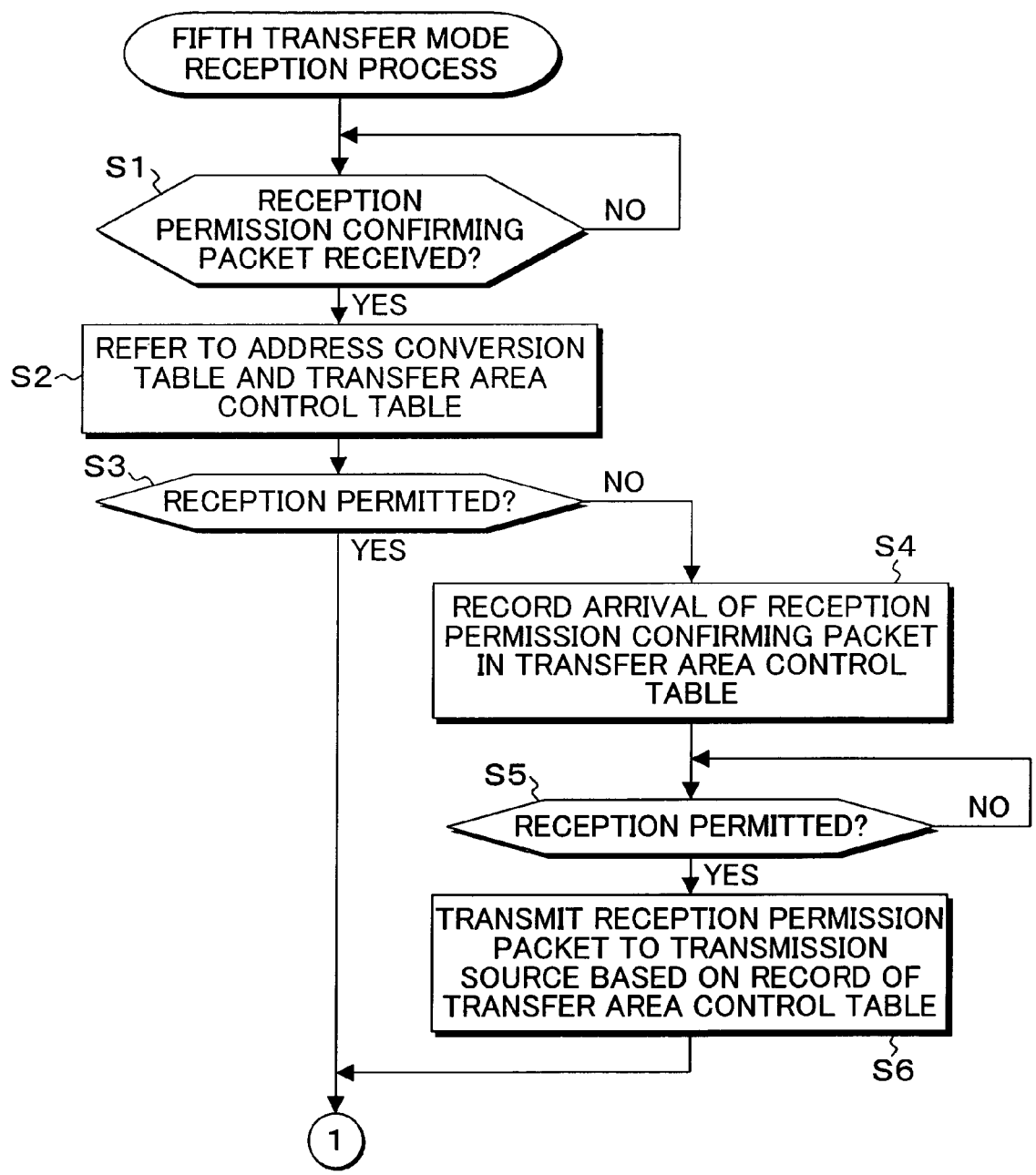
FIGS. 32A and 32B are flow charts of the fifth transfer mode reception process.
Figure 32B:
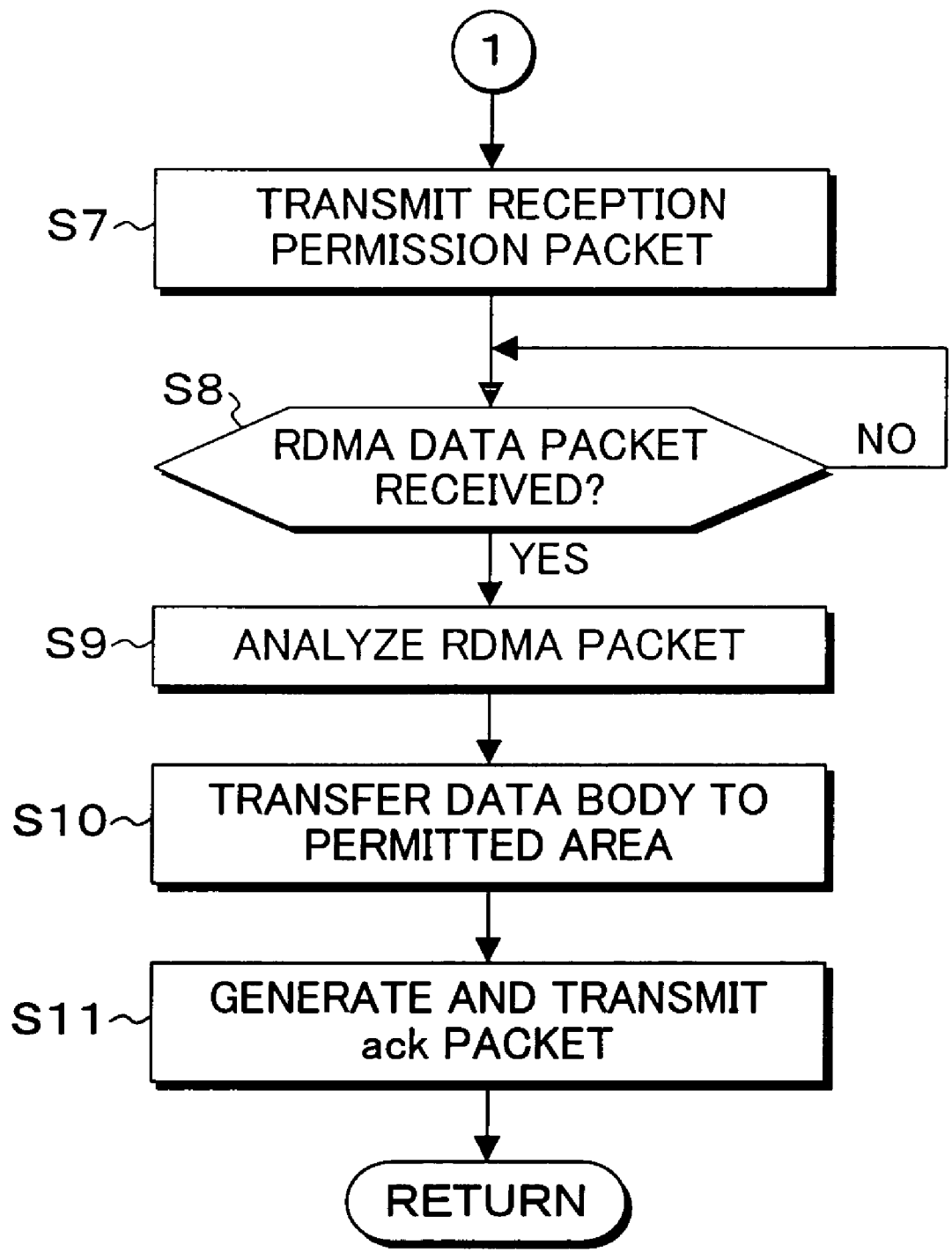

FIGS. 32A and 32B are flow charts of the reception process of the fifth transfer mode. In the fifth transfer mode reception process, whether the reception permission confirming packet is received or not is checked in step S1, and, when it is received, the transfer area control table is referenced so as to obtain presence or absence of the reception permission of the receiving area in step S2. When the reception permission is determined in step S3, the reception permission packet is transmitted to the transfer destination in step S7. Since the RDMA data packet is transmitted from the transfer source in response to this, reception thereof is determined in step S8; the RDMA data packet is analyzed, and the physical address and reception permission of the receiving area are obtained by referencing the transfer area control table in step S9; and the data body is transferred to the reception-permitted transfer area in step S10. When the data transfer is terminated, the ack packet is generated and transmitted to the network in step S11 so as to terminate the series of reception processes.

(Selection of Transfer Mode)

In the present embodiment, when RDMA transfer is to be performed, an optimal transfer mode is selected from among the first to fifth transfer modes based on the network load and the memory usage rate of the receiving side so as to perform the RDMA transfer. Thereat, the first to third transfer modes in the present embodiment will be compared with the fifth transfer mode which is a conventional method.

FIGS. 33 are explanatory diagrams showing transfer completion time of the first to third transfer modes in the case in which it is receivable before transfer is started in comparison with the fifth transfer mode which is the conventional method. FIG. 33A is the fifth transfer mode of the conventional method, FIG. 33B is the first transfer mode, FIG. 33C is the second transfer mode, and FIG. 33D is the third transfer mode. Herein, the transfer completion time of the first to third transfer modes and the fifth transfer mode which is the conventional method is T1, T2, T3, and T5; and one-way latency $\delta$, an inverse number k of throughput, and a data length L are set as parameters 310 for obtaining the transfer completion time. Note that (kL) which is the inverse number k of throughput multiplied by the data length L serves as transmission time of normal RDMA transfer 314, 316, 318, and 320 in FIGS. 33A to 33D.

In FIGS. 33A to 33D, the receiving side is receivable 312 before a transmission request is generated; therefore, in any of the first to third transfer modes, transfer is started without causing loss to the transfer destination, and the normal RDMA transfer 316, 318, and 320 is performed. Meanwhile, in the fifth transfer mode of FIG. 33A which is the conventional method, the normal RDMA 314 is performed after reception permission confirmation to the transfer destination is performed and a permission notification is obtained. Note that, in the third transfer mode of FIG. 33D, since RDMA transfer is repeatedly performed until ack is obtained from the transferred side, the transfer which is performed until ack is received from the transfer destination is lost transfer 322. The transfer completion time of the first to the third transfer modes and the fifth transfer mode which is the conventional method in the case in which, as described above, it is receivable 312 before transfer is started is as the following.

$T1 = 2\delta + kL$            First transfer mode $T2 = 2\delta + kL$            Second transfer mode $T3 = 2\delta + kL$            Third transfer mode $T5 = 5\delta + kL$            Fifth transfer mode In this case, transfer is speculatively performed without making a confirmation about reception permission to the transfer destination in any of the first to third transfer modes in the present embodiment; therefore, compared with the fifth transfer mode, it can be reduced by communication time ($2\delta$) which is for reception permission confirmation.

FIGS. 34 illustrate details for calculating the transfer completion time T5 and T1 to T3 respectively in the fifth transfer mode and the first to the third transfer modes in FIGS. 33A to 33D. Next, about the case in which reception permission of the transfer destination is issued after transfer is started, the transfer completion time of the first to the third transfer modes will be described in comparison with the fifth transfer mode which is the conventional method.

FIGS. 35A to 35D are the cases in which waiting time W from a transmission request until reception permission is issued is $W \geq kL$ as shown in parameters 324. The transfer completion time T1 to T3 of the first to the third transfer modes in this case will be as the following.

$T1 = W + 4\delta + kL$            First transfer mode $T2 = W + 4\delta + kL$            Second transfer mode $T3 = W + 2\delta + kL$            Third transfer mode The transfer completion time T5 of the fifth transfer mode which is the conventional method is $T5 = W + 4\delta + kL$ (fixed).            fifth transfer mode In FIGS. 35A to 35D, transfer to the receiving area is performed in RDMA communication 328, 342, and 344 and retransmission RDMA communication 332 and 336, and the received packet is discarded in the transfer destination in RDMA communication 330, 334, 338, 340, and 346.

FIGS. 36A to 36D illustrate details of respective calculation components of the transfer completion time T5 and T1 to T3 corresponding to FIGS. 35A to 35D.

FIGS. 37A to 37D are the cases in which the waiting time W from a transmission request until reception permission is issued is $kL \geq W \geq kL - 2\delta$ as shown by parameters 348. The transfer completion time of the first to the third transfer modes of FIGS. 37B to 37D in this case will be as the following.

$T1 = 2W + 4\delta$            First transfer mode $T2 = W + 4\delta + kL$            Second transfer mode $T3 = W + 2\delta + kL$            Third transfer mode The fifth transfer mode which is the conventional method of FIG. 37A is, as well as the case of FIGS. 35A to 35D, $$T5 = W + 4\delta + kL \text{ (fixed)}, \quad \text{fifth transfer mode}$$

wherein merely the waiting time W is shortened.

In FIGS. 37A to 37D, transfer to the receiving area is performed in RDMA communication 352, 355, 362, 366, and 368 and retransmission RDMA communication 356 and 360, and the received packet is discarded in the transfer destination in RDMA communication 354, 358, 364, 370, and 372. FIGS. 38A to 38D illustrate calculation components of the transfer completion time T5 and T1 to T3 in FIGS. 37A to 37D. Herein, in the first transfer mode of FIG. 38B, regarding the waiting time W until it becomes receivable 350 and the transfer time kL of normal RDMA transfer after the receivable 350 is issued, the data transfer time is equal to the waiting time W since the lost data discarded in the transfer destination is transferred at the same speed; therefore, $$T1 = W + 4\delta + kL = 2W + 4\delta.$$

FIGS. 39A to 39D illustrate the transfer completion time of the first to the third transfer modes in the case in which the waiting time W from a transmission request until reception permission is issued is $$kL - 2\delta \geq W \geq 2\delta$$

as shown in parameters 374, in comparison with the fifth transfer mode which is the conventional method.

The transfer completion time of the first to the third transfer modes of this case will be as the following.

$$T1 = W + 2\delta + kL \quad \text{First transfer mode}$$

$$T2 = W + 4\delta + kL \quad \text{Second transfer mode}$$

$$T3 = W + 2\delta + kL \quad \text{Third transfer mode}$$

Note that the transfer completion time of the fifth transfer mode is $$T4 = W + 4\delta + kL \text{ (fixed)}, \quad \text{Fifth transfer mode}$$

wherein merely the waiting time W is shortened. In FIGS. 39A to 39D, transfer to the receiving area is performed in RDMA communication 378, 382, 390, 394, and 396 and retransmission RDMA communication 384 and 388, and the received packet is discarded in the transfer destination in RDMA communication 380, 386, 392, and 398.

FIGS. 40A to 40D illustrates calculation components of the transfer completion time respectively corresponding to FIGS. 39A to 39D.

FIGS. 41A to 41D are the cases in which the waiting time W from a transmission request until reception permission is issued is $$2\delta \geq W$$

as shown in parameters 400, and the transfer completion time of the first to the third transfer modes in this case will be as the following.

$$T1 = W + 2\delta + kL \quad \text{First transfer mode}$$

$$T2 = 2W + 2\delta + kL \quad \text{Second transfer mode}$$

$$T3 = W + 2\delta + kL \quad \text{Third transfer mode}$$

The transfer completion time of the fifth transfer mode is $$T4 = W + 4\delta + kL \text{ (fixed)}, \quad \text{fifth transfer mode}$$

wherein merely the waiting time W is shortened.

Moreover, in FIGS. 41A to 41D, transfer to the receiving area is performed in RDMA transfer 404, 408, 414, 416, 422, and 424 and retransmission RDMA transfer 410 and 418, and the received packet is discarded in the transfer destination in RDMA communication 406, 412, 420, and 426.

Figure 43:
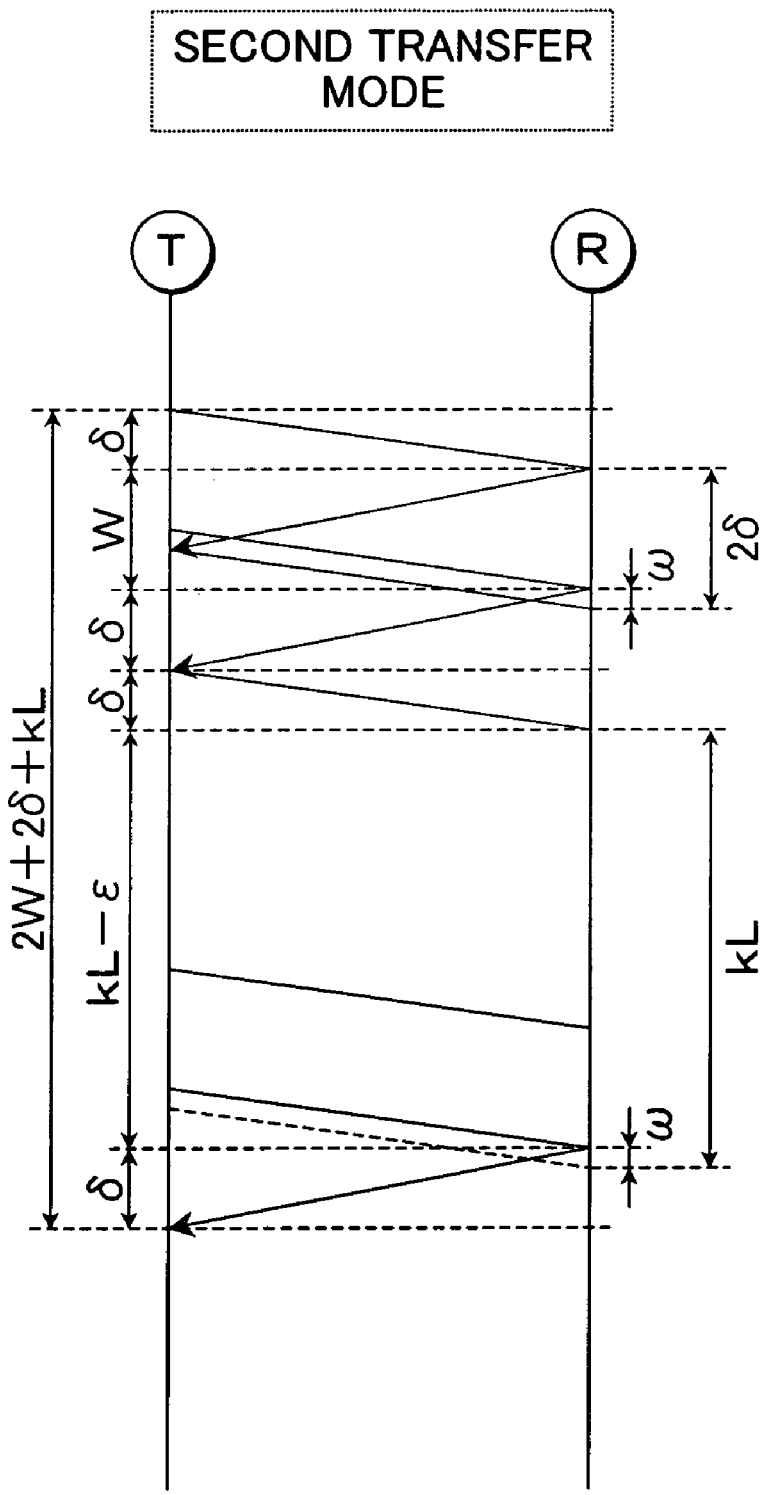
FIG. 43 is explanatory diagram showing calculation detail of the transfer completion time in FIG. 42C.

FIGS. 42A to 42D illustrate calculation components of the transfer completion time of FIGS. 41A to 41D. Herein, the transfer completion time T2 of the second transfer mode of FIG. 42 (C) is $$T2 = 2W + 2\delta + kL,$$

and this is calculated in the manner shown in FIG. 43.

In FIG. 43, the transfer completion time time T2 in the second transfer mode is $$T2 = W + 4\delta + kL - \epsilon.$$

Herein, $\epsilon$ is $\epsilon = 2\delta - W$ according to FIG. 43, and, when this is substituted therefor, $$T2 = W + 4\delta + kL - (2\delta - W) = 2W + 2\delta + kL$$

is obtained.

The above described transfer completion time T1 to T3 of the first to the third transfer modes with respect to differences of the waiting time W in the case in which reception permission is issued after transfer is started will be summarized as the following.

When $W \geq kL$      (1)

$$T1 = W + 4\delta + kL \quad \text{First transfer mode}$$

$$T2 = W + 4\delta + kL \quad \text{Second transfer mode}$$

$$T3 = W + 2\delta + kL \quad \text{Third transfer mode}$$

When $kL \geq W \geq kL - 2\delta$      (2)

$$T1 = 2W + 4\delta \quad \text{First transfer mode}$$

$$T2 = W + 4\delta + kL \quad \text{Second transfer mode}$$

$$T3 = W + 2\delta + kL \quad \text{Third transfer mode}$$

When $kL - 2\delta \geq W \geq 2\delta$      (3)

$$T1 = W + 2\delta + kL \quad \text{First transfer mode}$$

$$T2 = W + 4\delta + kL \quad \text{Second transfer mode}$$

$$T3 = W + 2\delta + kL \quad \text{Third transfer mode}$$

When $2\delta \geq W$      (4)

$$T1 = W + 2\delta + kL \quad \text{First transfer mode}$$

$$T2 = 2W + 2\delta + kL \quad \text{Second transfer mode}$$

$$T3 = W + 2\delta + kL \quad \text{Third transfer mode}$$

According to the relation of the transfer completion time T1 to T3 in the first to third transfer modes, from a point of view for simply shortening the transfer time, it can be understood that the third transfer mode is the best. However, the third transfer mode has a problem that the network bandwidth is consumed the most since RDMA transfer is repeatedly performed until ack is obtained. Therefore, an optimal transfer mode has to be selected in accordance with the state of the network load. In the present embodiment, as shown in FIGS. 2A and 2B, the network information can be collected by both the network load information collecting unit 36 of the transmitting side and the network load information collecting unit 48 of the receiving side. Therefore, either (1) a method in which a transfer mode is selected upon transmission based on the network collected information when the network load information is collected in the transmitting side or (2) a method in which, when it is collected in the receiving side, a transfer mode which is selected based on the collected information is transmitted to the transmitting side, and, based on that, a transmission process is performed in the specified method in the transmitting side can be employed. The present embodiment selects the transfer mode in the transmitting side according to (1).

Furthermore, the first to third transfer methods in the present embodiment does not require the temporary buffer in the host of the receiving side although network bandwidth is increased due to retransmission; on the other hand, in the fourth transfer mode of the present embodiment, the temporary buffer in the host of the receiving side is required although network bandwidth is not increased by retransmission. Therefore, in the method in which the transfer method is determined in the transmitting side, the memory usage rate of the host 10-2 is collected by the memory usage rate information collecting unit 49 which is provided in the NIC 12-2 provided in the receiving side in the manner of FIGS. 2A and 2B, the transmitting side is notified of this, and the transfer mode is selected based on the memory usage rate. More specifically, the fourth transfer mode in which the temporary buffer is used is selected when the memory usage rate is low and there is enough memory, and any of the first to the third transfer mode is selected when the memory usage rate is high and there is not enough memory, thereby efficiently performing a transfer process. Furthermore, when a case in which the network load is high and the memory usage rate of the host of the receiving side is high is presupposed, the first to third transfer modes are not preferable, since they involve wasteful packet transfer and the network load is high. The fourth transfer mode in which the temporary buffer is used is not preferred as well since the host memory usage amount of the receiving side is large. In such a case, the fifth transfer mode which is the conventional method is the optimal method. Therefore, in the present embodiment, the memory usage rate information collecting unit 49 of the NIC 12-2 of the receiving side of FIGS. 2A and 2B collects the memory usage rate information of the host 10-2 and notifies that to the mode selection control unit 46; and the fourth transfer mode is selected in the mode selection control unit 46 if the memory usage rate is low, meanwhile, if the memory usage rate is high and the fourth transfer mode cannot be selected, the point that the fourth transfer mode cannot be selected is notified to the mode selection control unit 34 of the NIC 12-1 of the transmitting side. In response to this, based on the network information obtained from the network load information collecting unit 36, the mode selection control unit 34 of the transmitting side selects an optimal transfer mode from among the first to the third transfer modes or the fifth transfer mode which is the conventional method. Note that the memory usage rate may be notified to the mode selection control unit 34 of the transmitting side, and everything about the first to the fifth transfer modes may be selected and controlled by the mode selection control unit 34.

Figure 44:
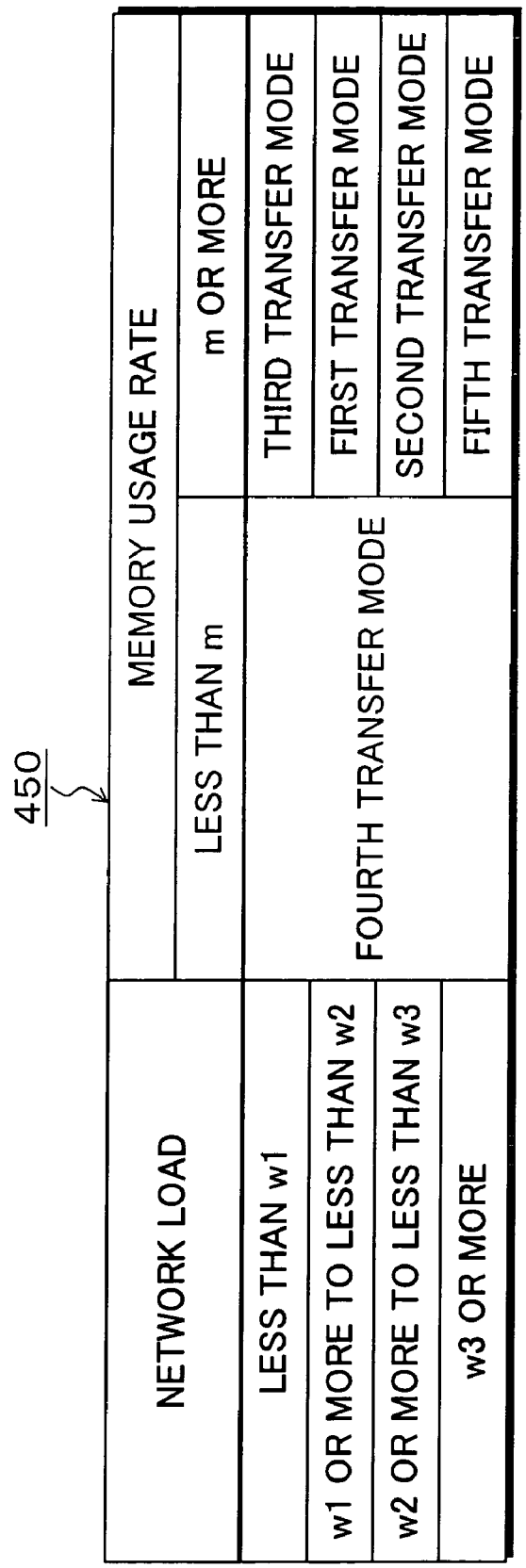
FIG. 44 is an explanatory diagram of transfer mode control table used in the present embodiment.

FIG. 44 is an explanatory diagram of a transfer mode control table 450 for transfer mode selection based on the network load information and the memory usage rate of the receiving side. In FIG. 44, in the transfer mode control table 450, three threshold values w1, w2, and w3 are set in the ascending order for the network load, thereby dividing the network load into four regions. Meanwhile, a threshold value m is set for the memory usage amount, thereby dividing it into two regions, that is, less than m and m or more. Based on the transfer mode control table 450, selection of the transfer mode is performed in the following manner.

(1) If the memory usage rate is less than the threshold value m, the forth transfer mode in which storage to the temporary buffer is performed if reception is unpermitted is selected.

(2) If the memory usage rate is equal to the threshold value m or more, the transfer mode is selected based on the network load.

Moreover, selection of the transfer mode based on-the network load is as the following.

(1) If the network load is less than w1, the third transfer mode is selected.

(2) If the network load is w1 or more and less than w2, the first transfer mode is selected.

(3) If the network load is w2 or more and less than w3, the second transfer mode is selected.

(4) If the network load is w3 or more, the fifth transfer mode which is the conventional method is selected. Herein, regarding the memory usage rate, the threshold value is obtained from the memory amount which can be used as the temporary buffer in the host of the receiving side and the data transfer amount. Regarding the network load, the network load information is collected, and network load actual performance values are calculated, thereby evaluating appropriateness of the threshold values.

Figure 45:
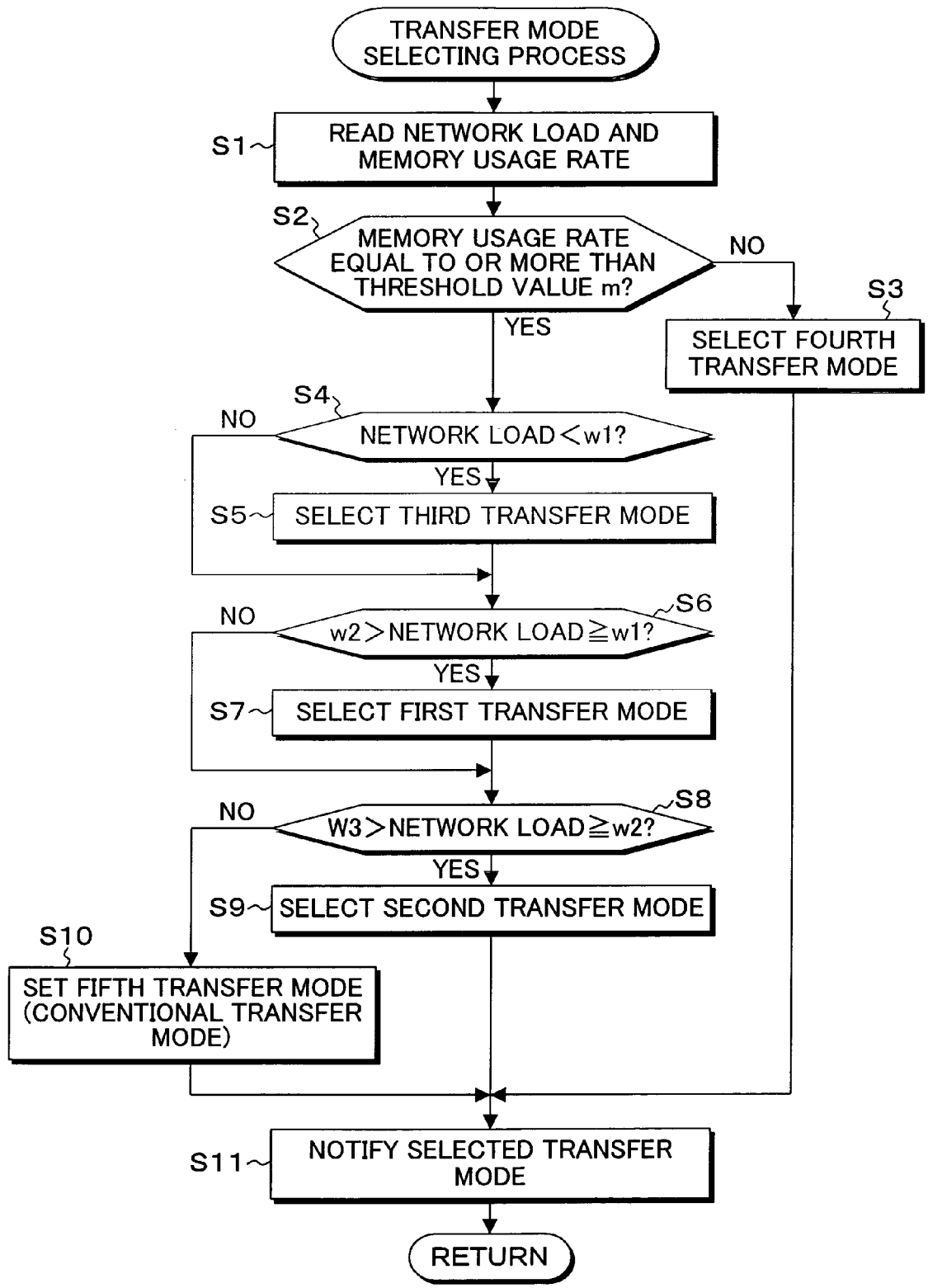
FIG. 45 is a flow chart of a transfer mode selecting process in the present embodiment.

FIG. 45 is a flow chart showing the details of the transfer mode selecting process in the transmitting side of step S2 of FIG. 6 based on the transfer mode control table 450 of FIG. 44, and it will be as the following when described with reference to FIGS. 2A and 2B.

In FIG. 45, in the transfer mode selecting process, in step S1, the mode selection control unit 34 reads the network load information which is collected by the network load information collecting unit 36 and the memory usage rate which is, at this point, collected by and transferred from the memory usage rate information collecting unit 49 of the NIC 12-2 of the receiving side. Subsequently, in step S2, whether the memory usage rate is equal to or more than the threshold value m is checked. If it is less than m, the process proceeds to step S3 in which the fourth transfer mode in which the temporary buffer 56 of the host 10-2 of the receiving side is used is set. If the memory usage rate is equal to or more than the threshold value m in step S2, the process proceeds to step S4 in which whether the network load is less than the threshold value w1 or not is checked. If it is less than the threshold value w1, the process proceeds to step S5 in which the third transfer mode in which the transfer data is repeatedly transferred until the ack packet is obtained is set. Moreover, if the network load is equal to or more than the threshold value w1 and less than the threshold value w2 in step S6, the first transfer mode is set in step S7. Moreover, if the network load is equal to or more than the threshold value w2 and less than the threshold value w3 in step S8, the second transfer mode is set in step S9. Furthermore, if the network load is equal to or more than the threshold value w3 in step S8, the process proceeds to step S10 in which the fifth transfer mode which is the conventional method is set. Note that, although the mode selection control unit 34 of the NIC 12-1 of the transmitting side selects the transfer mode and gives a selection instruction in the transfer mode setting process of FIG. 45, mode selection of selection of the first transfer mode, the second transfer mode, and the fourth transfer mode can be configured to be performed in the mode selection control unit 46 of the receiving-side NIC 12-2. In this case, the procedure of notifying the mode selection obtained from statistical information of the receiving side to the transmitting side can be omitted. Note that, although the present embodiment employs, as an example, the case in which an optimal transfer mode is selected from among the first to fourth transfer modes and the fifth transfer mode which is the conventional method based on the memory usage rate of the receiver side so as to perform RDMA transfer, any one of the first to the fourth transfer modes in the present embodiment can be configured to be fixedly selected so as to perform RDMA transfer. Moreover, an optimal transfer mode can be configured to be selected from at least any one of the first to fourth transfer modes in the present embodiment and the fifth transfer mode which is the conventional method, based on the network load and the memory usage rate of the receiving side so as to perform RDMA transfer. Moreover, the present embodiment provides programs executed as the transmitting unit and the receiving unit in the NICs provided in the receiving side and the transmitting side, and the programs have the contents shown in flow charts of FIG. 6, FIG. 7, FIG. 11, FIG. 12, FIG. 17, FIG. 18A, FIG. 18B, FIG. 21, FIG. 22, FIG. 24, FIG. 25, FIG. 31, FIGS. 32A, FIG. 32B, and FIG. 45. Moreover, the present invention provides a computer-readable recording medium storing an RDMA communication program of the present embodiment; and examples of the recording medium include portable-type storage media such as a CD-ROM, a floppy (R) disk, a DVD disk, a magneto-optical disk, and an IC card; storage devices such as hard disk drives provided inside/outside computer systems; and a database or another computer system and a database retaining the program via a line; and a transmission medium on a line. Moreover, although the above described present embodiment employs, as an example, NICs supporting 10 Gb Ethernet but is not limited thereto, and as long as an interface network card or a communication device supports equivalent RDMA communication, the present invention can be applied thereto without modification. Moreover, the present invention is not limited to the present embodiment, includes arbitrary modifications that do not impair the object and advantages thereof, and is not limited by the numerical values shown in the present embodiment.

What is claimed is:

1. A communication device for supporting RDMA communication having a transmitting unit for generating and transmitting an RDMA packet and a receiving unit for receiving the RDMA packet, the communication device is characterized in that the transmitting unit has a packet transmitting unit for, when a data transfer request is received, generating the RDMA packet from transfer data and speculatively transmitting the packet without inquiring the transfer destination about presence or absence of reception permission, a packet retransmitting unit for, when a retransmission request is received from the transfer destination, generating the RDMA packet from the requested transfer data and transmitting the packet, and a transmission completion unit for receiving a transfer completion notification from the transfer destination and normally terminating the packet transmission; and the receiving unit has a transfer area control unit for controlling transfer area control information including transfer permission or transfer unpermission with respect to a receiving area, a packet receiving unit for, if transfer permission of the receiving area is determined by referencing the transfer area control information upon packet reception, transferring the received packet to the receiving area and changing the transfer permission of the receiving area to transfer unpermission, a packet discarding unit for, if transfer unpermission of the receiving area is determined by referencing the transfer area control information upon packet reception, discarding the received packet and recording the discarding of the packet in the transfer area control information, a retransmission requesting unit for, if transfer permission of the receiving area is determined after the received packet is discarded by the packet discarding unit, transmitting a retransmission request to the transfer source based on the record of the packet discarding of the transfer area control information, and a completion notifying unit for recognizing transfer completion of the received packet with respect to the receiving area and transmitting a transfer completion notification.

2. A communication device for supporting RDMA communication having a transmitting unit for generating and transmitting an RDMA packet and a receiving unit for receiving the RDMA packet, the communication device is characterized in that the transmitting unit has a packet transmitting unit for, when a data transfer request is received, generating the RDMA packet from transfer data and speculatively transmitting the packet without inquiring the transfer destination about presence or absence of reception permission, a transfer cessation unit for ceasing the packet transfer performed by the packet transmitting unit when a reception unpermission notification is received from the transfer destination, a packet retransmitting unit for, when a retransmission request is received from the transfer destination, generating the RDMA packet from the requested transfer data and transmitting the packet, and a transmission completion unit for receiving a transfer completion notification from the transfer destination and normally terminating the packet transmission; and the receiving unit has a transfer area control unit for controlling transfer area control information including transfer permission or transfer unpermission with respect to a receiving area, a packet receiving unit for, if transfer permission of the receiving area is determined by referencing the transfer area control information upon packet reception, transferring the received packet to the receiving area and changing the transfer permission of the receiving area to transfer unpermission, a packet discarding unit for, if transfer unpermission of the receiving area is determined by referencing the transfer area control information upon packet reception, discarding the received packet and recording the discarding of the packet in the transfer area control information, an unpermission notifying unit for transmitting a reception unpermission notification to the transfer source when transfer unpermission of the receiving area is determined by the packet discarding unit, a retransmission requesting unit for, if transfer permission of the receiving area is determined after the received packet is discarded by the packet discarding unit, transmitting a retransmission request to the transfer source based on the record of the packet discarding of the transfer area control information, and a completion notifying unit for recognizing transfer completion of the received packet with respect to the receiving area and transmitting a transfer completion notification.

3. A communication device for supporting RDMA communication having a transmitting unit for generating and transmitting an RDMA packet and a receiving unit for receiving the RDMA packet, the communication device is characterized in that the transmitting unit has a packet transmitting unit for, when a data transfer request is received, generating the RDMA packet from transfer data and speculatively and repeatedly transmitting the packet without inquiring the transfer destination about presence or absence of reception permission, and a transmission completion unit for receiving a transfer completion notification from the transfer destination and normally terminating the packet transmission; and the receiving unit has a transfer area control unit for controlling transfer area control information including transfer permission or transfer unpermission with respect to a receiving area, a packet receiving unit for, if transfer permission of the receiving area is determined by referencing the transfer area control information upon packet reception, transferring the received packet to the receiving area and changing the transfer permission of the receiving area to transfer unpermission, a packet discarding unit for discarding the received packet if transfer unpermission of the receiving area is determined by referencing the transfer area control information upon packet reception, and a completion notifying unit for recognizing transfer completion of the received packet with respect to the receiving area and transmitting a transfer completion notification.

4. A communication device for supporting RDMA communication having a transmitting unit for generating and transmitting an RDMA packet and a receiving unit for receiving the RDMA packet, the communication device is characterized in that the transmitting unit has a packet transmitting unit for, when a data transfer request is received, generating the RDMA packet from transfer data and speculatively transmitting the packet without inquiring the transfer destination about reception permission, and a transmission completion unit for receiving a transfer completion notification from the transfer destination and normally terminating the packet transmission; and the receiving unit has a transfer area control unit for controlling transfer area control information including transfer permission or transfer unpermission with respect to a receiving area, a packet receiving unit for, if transfer permission of the receiving area is determined by referencing the transfer area control information upon packet reception, transferring the received packet to the receiving area and changing the transfer permission of the receiving area to transfer unpermission, a buffer transfer unit for, if transfer unpermission of the receiving area is determined by referencing the transfer area control information upon packet reception, transferring the received packet to a buffer area and recording the buffer transfer in the transfer area control information, a data moving unit for, if transfer permission of the receiving area is determined after the buffer transfer, moving the data of the buffer area to the receiving area based on the record of the buffer transfer of the transfer area control information, and a completion notifying unit for recognizing transfer completion of the received packet with respect to the receiving area and transmitting a transfer completion notification.

5. A communication device for supporting RDMA communication having a transmitting unit for generating and transmitting an RDMA packet and a receiving unit for receiving the RDMA packet, the communication device is characterized by having a first transfer mode processing unit for speculatively transferring the packet without inquiring the transfer destination about permission and retransmitting the packet in response to a retransmission request if it is unpermitted;

a second transfer mode processing unit for speculatively transferring the packet without inquiring the transfer destination, ceasing the transfer in response to an unpermission notification if it is unpermitted, and retransmitting the packet in response to a retransmission request;

a third transfer mode processing unit for speculatively and repeatedly transferring the packet without inquiring the transfer destination about permission until a transfer completion notification is received;

a fourth transfer mode processing unit for speculatively transferring the packet without inquiring the transfer destination about permission, saving the packet in a temporary buffer if it is unpermitted, and transferring the packet from the temporary buffer to a receiving area when permission is obtained;

a fifth transfer mode processing unit for inquiring the transfer destination about permission and transferring the packet in response to a permission notification; and a transfer mode selection control unit for selecting any one of the first to fifth transfer mode processing unit based on at least either one of network load and a memory usage amount of the receiving side and executing RDMA data transfer.

6. The communication device according to claim 5 characterized in that a transmitting unit of the first transfer mode processing unit has a packet transmitting unit for, when a data transfer request is received, generating the RDMA packet from transfer data and speculatively transmitting the packet without inquiring the transfer destination about presence or absence of reception permission, a packet retransmitting unit for, when the retransmission request is received from the transfer destination, generating the RDMA packet from the requested transfer data and transmitting the packet, and a transmission completion unit for receiving a transfer completion notification from the transfer destination and normally terminating the packet transmission; and a receiving unit of the first transfer mode processing unit has a transfer area control unit for controlling transfer area control information including transfer permission or transfer unpermission with respect to the receiving area, a packet receiving unit for, if transfer permission of the receiving area is determined by referencing the transfer area control information upon packet reception, transferring the received packet to the receiving area and changing the transfer permission of the receiving area to transfer unpermission, a packet discarding unit for, if transfer unpermission of the receiving area is determined by referencing the transfer area control information upon packet reception, discarding the received packet and recording the discarding of the packet in the transfer area control information, a retransmission requesting unit for, if transfer permission of the receiving area is determined after the received packet is discarded by the packet discarding unit, transmitting a retransmission request to the transfer source based on the record of the packet discarding of the transfer area control information, and a completion notifying unit for recognizing transfer completion of the received packet with respect to the receiving area and transmitting a transfer completion notification.

7. The communication device according to claim 5 characterized in that a transmitting unit of the second transfer mode processing unit has a packet transmitting unit for, when a data transfer request is received, generating the RDMA packet from transfer data and speculatively transmitting the packet without inquiring the transfer destination about presence or absence of reception permission, a transfer cessation unit for ceasing the packet transfer performed by the packet transmitting unit when a reception unpermission notification is received from the transfer destination, a packet retransmitting unit for, when a retransmission request is received from the transfer destination, generating the RDMA packet from the requested transfer data and transmitting the packet, and a transmission completion unit for receiving a transfer completion notification from the transfer destination and normally terminating the packet transmission; and a receiving unit of the second transfer mode processing unit has a transfer area control unit for controlling transfer area control information including transfer permission or transfer unpermission with respect to the receiving area, a packet receiving unit for, if transfer permission of the receiving area is determined by referencing the transfer area control information upon packet reception, transferring the received packet to the receiving area and changing the transfer permission of the receiving area to transfer unpermission, a packet discarding unit for, if transfer unpermission of the receiving area is determined by referencing the transfer area control information upon packet reception, discarding the received packet and recording the discarding of the packet in the transfer area control information, an unpermission notifying unit for transmitting a reception unpermission notification to the transfer source if transfer unpermission of the receiving area is determined by the packet discarding unit, a retransmission requesting unit for, if transfer permission of the receiving area is determined after the received packet is discarded by the packet discarding unit, transmitting the retransmission request to the transfer source based on the record of the packet discarding of the transfer area control information, and a completion notifying unit for recognizing transfer completion of the received packet with respect to the receiving area and transmitting a transfer completion notification.

8. The communication device according to claim 5 characterized in that a transmitting unit of the third transfer mode processing unit has a packet transmitting unit for, when a data transfer request is received, generating the RDMA packet from transfer data and speculatively and repeatedly transmitting the packet without inquiring the transfer destination about presence or absence of reception permission, and a transmission completion unit for receiving a transfer completion notification from the transfer destination and normally terminating the packet transmission; and a receiving unit of the third transfer mode processing unit has a transfer area control unit for controlling transfer area control information including transfer permission or transfer unpermission with respect to the receiving area, a packet receiving unit for, if transfer permission of the receiving area is determined by referencing the transfer area control information upon packet reception, transferring the received packet to the receiving area and changing the transfer permission of the receiving area to transfer unpermission, a packet discarding unit for discarding the received packet if transfer unpermission of the receiving area is determined by referencing the transfer area control information upon packet reception, and a completion notifying unit for recognizing transfer completion of the received packet with respect to the receiving area and transmitting a transfer completion notification.

9. The communication device according to claim 5 characterized in that a transmitting unit of the fourth transfer mode processing unit has a packet transmitting unit for, when a data transfer request is received, generating the RDMA packet from transfer data and speculatively transmitting the packet without inquiring the transfer destination about presence or absence of reception permission, and a transmission completion unit for receiving a transfer completion notification from the transfer destination and normally terminating the packet transmission; and a receiving unit of the fourth transfer mode processing unit has a transfer area control unit for controlling transfer area control information including transfer permission and transfer unpermission with respect to the receiving area, a packet receiving unit for, if transfer permission of the receiving area is determined by referencing the transfer area control information upon packet reception, transferring the received packet to the receiving area and changing the transfer permission of the receiving area to transfer unpermission, a buffer transfer unit for, if transfer unpermission of the receiving area is determined by referencing the transfer area control information upon packet reception, transferring the received packet to a buffer area and recording the buffer transfer in the transfer area control information, a data moving unit for, if transfer permission of the receiving area is determined after the buffer transfer, moving the data of the buffer area to the receiving area based on the record of the buffer transfer of the transfer area control information, and a completion notifying unit for recognizing transfer completion of the received packet with respect to the receiving area and transmitting a transfer completion notification.

10. The communication device accordant to claim 5, characterized in that
a transmitting unit of the fifth transfer mode processing unit has
a packet transmitting unit for, when a data transfer request is received, transmitting a reception permission confirmation to the transfer destination and, if a reception permission notification is received, generating the RDMA packet from transfer data and transmitting the packet, and
a transmission completion unit for receiving a transfer completion notification from the transfer destination and normally terminating the packet transmission; and
a receiving unit of the fifth transfer mode processing unit has
a transfer area control unit for controlling transfer area control information including transfer permission or transfer unpermission with respect to the receiving area,
an acknowledgement unit for referencing the transfer area control information when the reception confirmation notification from the transfer source is received and transmitting the reception permission notification or a reception unpermission notification,
a packet receiving unit for transferring the received packet to the receiving area, and
a transfer completion notifying unit for recognizing transfer completion of the received packet with respect to the receiving area and transmitting the transfer completion notification.

11. The communication device according to claim 5 characterized in that the transfer mode setting unit is provided in the transmitting unit and notifies a selected transfer mode to the transmitting unit and the receiving unit of the transfer source so as to execute RDMA data transfer by any one of the first to fifth transfer mode processing units.

12. The communication device according to claim 5 characterized in that the transfer mode setting unit is provided in the receiving unit and notifies a selected transfer mode to the transmitting unit and the receiving unit so as to execute RDMA data transfer by any one of the first to fifth transfer mode processing unit.

13. The communication device according to claim 5 characterized in that the transfer mode setting unit
selects the fourth transfer mode processing unit if a memory usage rate of the receiving side is low, and,
if the memory usage rate of the receiving side is high, the third transfer mode processing unit, the first transfer mode processing unit, and the fifth transfer mode processing unit are sequentially selected in the ascending order of the network load.

14. The communication device according to any one of claims 1 to 5, characterized by further having address conversion information of a logical address and a physical address, wherein the transfer area control information is contained in and integrated with the address conversion information.

15. A communication method of supporting RDMA communication having a transmitting step of generating and transmitting an RDMA packet and a receiving step of receiving the RDMA packet, the communication method is characterized in that
the transmitting step has
a packet transmitting step of, when a data transfer request is received, generating the RDMA packet from transfer data and speculatively transmitting the packet without inquiring the transfer destination about reception permission, a packet retransmitting step of, when a retransmission request is received from the transfer destination, generating the RDMA packet from the requested transfer data and transmitting the packet, and
a transmission completion step of receiving a transfer completion notification from the transfer destination and normally terminating the packet transmission; and
the receiving step has
a transfer area control step of controlling transfer area control information including transfer permission or transfer unpermission with respect to a receiving area,
a packet receiving step of, if transfer permission of the receiving area is determined by referencing the transfer area control information upon packet reception, transferring the received packet to the receiving area and changing the transfer permission of the receiving area to transfer unpermission,
a packet discarding step of, if transfer unpermission of the receiving area is determined by referencing the transfer area control information upon packet reception, discarding the received packet and recording the discarding of the packet in the transfer area control information,
a retransmission requesting step of, if transfer permission of the receiving area is determined after the received packet is discarded in the packet discarding step, transmitting a retransmission request to the transfer source based on the record of the packet discarding of the transfer area control information, and
a completion notifying step of recognizing transfer completion of the received packet with respect to the receiving area and transmitting a transfer completion notification.

16. A communication method of supporting RDMA communication having a transmitting step of generating and transmitting an RDMA packet and a receiving step of receiving the RDMA packet, the communication method is characterized in that
the transmitting step has
a packet transmitting step of, when a data transfer request is received, generating the RDMA packet from transfer data and speculatively transmitting the packet without inquiring the transfer destination about presence or absence of reception permission,
a transfer cessation step of ceasing the packet transfer performed in the packet transmitting step when a reception unpermission notification is received from the transfer destination,
a packet retransmitting step of, when a retransmission request is received from the transfer destination, generating the RDMA packet from the requested transfer data and transmitting the packet, and
a transmission completion step of receiving a transfer completion notification from the transfer destination and normally terminating the packet transmission; and
the receiving step has
a transfer area control step of controlling transfer area control information including transfer permission or transfer unpermission with respect to a receiving area,
a packet receiving step of, if transfer permission of the receiving area is determined by referencing the transfer area control information upon packet reception, transferring the received packet to the receiving area and changing the transfer permission of the receiving area to transfer unpermission,
a packet discarding step of, if transfer unpermission of the receiving area is determined by referencing the transfer area control information upon packet reception, discarding the received packet and recording the discarding of the packet in the transfer area control information,
an unpermission notifying step of transmitting a reception unpermission notification to the transfer source when transfer unpermission of the receiving area is determined in the packet discarding step,
a retransmission requesting step of, if transfer permission of the receiving area is determined after the received packet is discarded in the packet discarding step, transmitting a retransmission request to the transfer source based on the record of the packet discarding of the transfer area control information, and
a completion notifying step of recognizing transfer completion of the received packet with respect to the receiving area and transmitting a transfer completion notification.

17. A communication method of supporting RDMA communication having a transmitting step of generating and transmitting an RDMA packet and a receiving step of receiving the RDMA packet, the communication method is characterized in that
the transmitting step has
a packet transmitting step of, when a data transfer request is received, generating the RDMA packet from transfer data and speculatively and repeatedly transmitting the packet without inquiring the transfer destination about presence or absence of reception permission, and
a transmission completion step of receiving a transfer completion notification from the transfer destination and normally terminating the packet transmission; and
the receiving step has
a transfer area control step of controlling transfer area control information including transfer permission or transfer unpermission with respect to a receiving area,
a packet receiving step of, if transfer permission of the receiving area is determined by referencing the transfer area control information upon packet reception, transferring the received packet to the receiving area and changing the transfer permission of the receiving area to transfer unpermission,
a packet discarding step of discarding the received packet if transfer unpermission of the receiving area is determined by referencing the transfer area control information upon packet reception, and
a completion notifying step of recognizing transfer completion of the received packet with respect to the receiving area and transmitting a transfer completion notification.

18. A communication method of supporting RDMA communication having a transmitting step of generating and transmitting an RDMA packet and a receiving step of receiving the RDMA packet, the communication method is characterized in that the transmitting step has
a packet transmitting step of, when a data transfer request is received, generating the RDMA packet from transfer data and speculatively transmitting the packet without inquiring the transfer destination about reception permission, and
a transmission completion step of receiving a transfer completion notification from the transfer destination and normally terminating the packet transmission; and
the receiving step has
a transfer area control step of controlling transfer area control information including transfer permission or transfer unpermission with respect to a receiving area,
a packet receiving step of, if transfer permission of the receiving area is determined by referencing the transfer area control information upon packet reception, transferring the received packet to the receiving area and changing the transfer permission of the receiving area to transfer unpermission,
a buffer transfer step of, if transfer unpermission of the receiving area is determined by referencing the transfer area control information upon packet reception, transferring the received packet to a buffer area and recording the buffer transfer in the transfer area control information,
a data moving step of, if transfer permission of the receiving area is determined after the buffer transfer, moving the data of the buffer area to the receiving area based on the record of the buffer transfer of the transfer area control information, and
a completion notifying step of recognizing transfer completion of the received packet with respect to the receiving area and transmitting a transfer completion notification.

19. A communication method supporting RDMA communication having a transmitting step of generating and transmitting an RDMA packet and a receiving step of receiving the RDMA packet, the communication method is characterized by having
a first transfer mode processing step of speculatively transferring the packet without inquiring the transfer destination about permission and retransmitting the packet in response to a retransmission request if it is unpermitted;
a second transfer mode processing step of speculatively transferring the packet without inquiring the transfer destination, ceasing the transfer in response to an unpermission notification if it is unpermitted, and retransmitting the packet in response to a retransmission request;
a third transfer mode processing step of speculatively and repeatedly transferring the packet without inquiring the transfer destination about permission until a transfer completion notification is received;
a fourth transfer mode processing step of speculatively transferring the packet without inquiring the transfer destination about permission, saving the packet in a temporary buffer if it is unpermitted, and transferring the packet from the temporary buffer to a receiving area when permission is obtained;
a fifth transfer mode processing step of inquiring the transfer destination about permission and transferring the packet in response to a permission notification; and
a transfer mode setting step of selecting any one of the first to fifth transfer mode processing step based on at least either one of network load and a memory usage amount of the receiving side and executing RDMA data transfer.

20. A communication method according to claim 19 characterized in that
a transmitting step of the first transfer mode processing step has
a packet transmitting step of, when a data transfer request is received, generating the RDMA packet from transfer data and speculatively transmitting the packet without inquiring the transfer destination about presence or absence of reception permission,
a packet retransmitting step of, when the retransmission request is received from the transfer destination, generating the RDMA packet from the requested transfer data and transmitting the packet, and
a transmission completion step of receiving a transfer completion notification from the transfer destination and normally terminating the packet transmission; and a receiving step of the first transfer mode processing step has a transfer area control step of controlling transfer area control information including transfer permission or transfer unpermission with respect to the receiving area, a packet receiving step of, if transfer permission of the receiving area is determined by referencing the transfer area control information upon packet reception, transferring the received packet to the receiving area and changing the transfer permission of the receiving area to transfer unpermission, a packet discarding step of, if transfer unpermission of the receiving area is determined by referencing the transfer area control information upon packet reception, discarding the received packet and recording the discarding of the packet in the transfer area control information, a retransmission requesting step of, if transfer permission of the receiving area is determined after the received packet is discarded in the packet discarding step, transmitting a retransmission request to the transfer source based on the record of the packet discarding of the transfer area control information, and a completion notifying step of recognizing transfer completion of the received packet with respect to the receiving area and transmitting a transfer completion notification.

21. The communication method according to claim 19 characterized in that a transmitting step of the second transfer mode processing step has a packet transmitting step of, when a data transfer request is received, generating the RDMA packet from transfer data and speculatively transmitting the packet without inquiring the transfer destination about presence of reception permission, a transfer cessation step of ceasing the packet transfer performed in the packet transmitting step when a reception unpermission notification is received from the transfer destination, a packet retransmitting step of, when a retransmission request is received from the transfer destination, generating the RDMA packet from the requested transfer data and transmitting the packet, and a transmission completion step of receiving a transfer completion notification from the transfer destination and normally terminating the packet transmission; and a receiving step of the second transfer mode processing step has a transfer area control step of controlling transfer area control information including transfer permission or transfer unpermission with respect to the receiving area, a packet receiving step of, if transfer permission of the receiving area is determined by referencing the transfer area control information upon packet reception, transferring the received packet to the receiving area and changing the transfer permission of the receiving area to transfer unpermission, a packet discarding step of, if transfer unpermission of the receiving area is determined by referencing the transfer area control information upon packet reception, discarding the received packet and recording the discarding of the packet in the transfer area control information, an unpermission notifying step of transmitting a reception unpermission notification to the transfer source when transfer unpermission of the receiving area is determined in the packet discarding step, a retransmission requesting step of, if transfer permission of the receiving area is determined after the received packet is discarded in the packet discarding step, transmitting the retransmission request to the transfer source based on the record of the packet discarding of the transfer area control information, and a completion notifying step of recognizing transfer completion of the received packet with respect to the receiving area and transmitting a transfer completion notification.

22. The communication method according to claim 19 characterized in that a transmitting step of the third transfer mode processing step has a packet transmitting step of, when a data transfer request is received, generating the RDMA packet from transfer data and speculatively and repeatedly transmitting the packet without inquiring the transfer destination about reception permission, and a transmission completion step of receiving a transfer completion notification from the transfer destination and normally terminating the packet transmission; and a receiving step of the third transfer mode processing step has a transfer area control step of controlling transfer area control information including transfer permission or transfer unpermission with respect to the receiving area, a packet receiving step of, if transfer permission of the receiving area is determined by referencing the transfer area control information upon packet reception, transferring the received packet to the receiving area and changing the transfer permission of the receiving area to transfer unpermission, a packet discarding step of discarding the received packet if transfer unpermission of the receiving area is determined by referencing the transfer area control information upon packet reception, and a completion notifying step of recognizing transfer completion of the received packet with respect to the receiving area and transmitting a transfer completion notification.

23. The communication method according to claim 19 characterized in that a transmitting step of the fourth transfer mode processing step has a packet transmitting step of, when a data transfer request is received, generating the RDMA packet from transfer data and speculatively transmitting the packet without inquiring the transfer destination about presence of reception permission, and a transmission completion step of receiving a transfer completion notification from the transfer destination and normally terminating the packet transmission; and a receiving step of the fourth transfer mode processing step has a transfer area control step of controlling transfer area control information including transfer permission and transfer unpermission with respect to the receiving area, a packet receiving step of, if transfer permission of the receiving area is determined by referencing the transfer area control information upon packet reception, transferring the received packet to the receiving area and changing the transfer permission of the receiving area to transfer unpermission, a buffer transfer step of, if transfer unpermission of the receiving area is determined by referencing the transfer area control information upon packet reception, transferring the received packet to a buffer area and recording the buffer transfer in the transfer area control information, a data moving step of, if transfer permission of the receiving area is determined after the buffer transfer, moving the data of the buffer area to the receiving area based on the record of the buffer transfer of the transfer area control information, and a completion notifying step of recognizing transfer completion of the received packet with respect to the receiving area and transmitting a transfer completion notification.

24. The communication method according to claim 19, characterized in that a fifth transmitting step of the fifth transfer mode processing step has a packet transmitting step of, when a data transfer request is received, transmitting a reception permission confirmation to the transfer destination and, if a reception permission notification is received, generating the RDMA packet from transfer data and transmitting the packet, and a transmission completion step of receiving a transfer completion notification from the transfer destination and normally terminating the packet transmission; and a fifth receiving step of the fifth transfer mode processing step has a transfer area control step of controlling transfer area control information including transfer permission or transfer unpermission with respect to the receiving area, an acknowledgement step of referencing the transfer area control information when the reception confirmation notification from the transfer source is received and transmitting the reception permission notification or a reception unpermission notification, a packet receiving step of transferring the received packet to the receiving area, and a completion notifying step of recognizing transfer completion of the received packet with respect to the receiving area and transmitting the transfer completion notification.

25. The communication method according to claim 19 characterized in that the transfer mode selecting step is provided in the transmitting step of the transfer source and notifies a selected transfer mode to the transfer source and the transfer destination so as to execute RDMA data transfer by any one of the first to fifth transfer mode processing steps.

26. The communication method according to claim 19 characterized in that the transfer mode setting step is provided in the receiving step of the transfer destination and notifies a selected transfer mode to the transfer source and the transfer destination so as to execute RDMA data transfer by any one of the first to fifth transfer mode processing steps.

27. The communication method according to claim 19 characterized in that the transfer mode setting step selects the fourth transfer mode processing step if a memory usage rate of the receiving side is low, and, if the memory usage rate of the receiving side is high, the third transfer mode processing step, the first transfer mode processing step, and the fifth transfer mode processing step are sequentially selected in the ascending order of the network load.

28. The communication method described in any one of claims 15 to 19, characterized by further having address conversion information of a logical address and a physical address, wherein the transfer area control information is contained in and integrated with the address conversion information.

29. A computer-readable storage medium which stores a communication program characterized by causing a computer of a communication device for supporting RDMA communication to execute, as a transmitting step, a packet transmitting step of, when a data transfer request is received, generating the RDMA packet from transfer data and speculatively transmitting the packet without inquiring the transfer destination about reception permission, a packet retransmitting step of, when a retransmission request is received from the transfer destination, generating the RDMA packet from the requested transfer data and transmitting the packet, and a transmission completion step of receiving a transfer completion notification from the transfer destination and normally terminating the packet transmission; and causing the computer to execute, as the receiving step, a transfer area control step of controlling transfer area control information including transfer permission or transfer unpermission with respect to a receiving area, a packet receiving step of, if transfer permission of the receiving area is determined by referencing the transfer area control information upon packet reception, transferring the received packet to the receiving area and changing the transfer permission of the receiving area to transfer unpermission, a packet discarding step of, if transfer unpermission of the receiving area is determined by referencing the transfer area control information upon packet reception, discarding the received packet and recording the discarding of the packet in the transfer area control information, a retransmission requesting step of, if transfer permission of the receiving area is determined after the received packet is discarded in the packet discarding step, transmitting a retransmission request to the transfer source based on the record of the packet discarding of the transfer area control information, and a completion notifying step of recognizing transfer completion of the received packet with respect to the receiving area and transmitting a transfer completion notification.

30. A computer-readable storage medium which stores a communication program characterized by causing a computer of a communication device for supporting RDMA communication to execute, as a transmitting step, a packet transmitting step of, when a data transfer request is received, generating the RDMA packet from transfer data and speculatively transmitting the packet without inquiring the transfer destination about presence or absence of reception permission, a transfer cessation step of ceasing the packet transfer performed in the packet transmitting step when a reception unpermission notification is received from the transfer destination, a packet retransmitting step of, when a retransmission request is received from the transfer destination, generating the RDMA packet from the requested transfer data and transmitting the packet, and a transmission completion step of receiving a transfer completion notification from the transfer destination and normally terminating the packet transmission; and causing the computer to execute, as a receiving step, a transfer area control step of controlling transfer area control information including transfer permission or transfer unpermission with respect to a receiving area, a packet receiving step of, if transfer permission of the receiving area is determined by referencing the transfer area control information upon packet reception, transferring the received packet to the receiving area and changing the transfer permission of the receiving area to transfer unpermission, a packet discarding step of, if transfer unpermission of the receiving area is determined by referencing the transfer area control information upon packet reception, discarding the received packet and recording the discarding of the packet in the transfer area control information, an unpermission notifying step of transmitting a reception unpermission notification to the transfer source when transfer unpermission of the receiving area is determined in the packet discarding step, a retransmission requesting step of, if transfer permission of the receiving area is determined after the received packet is discarded in the packet discarding step, transmitting a retransmission request to the transfer source based on the record of the packet discarding of the transfer area control information, and a completion notifying step of recognizing transfer completion of the received packet with respect to the receiving area and transmitting a transfer completion notification.

31. A computer-readable storage medium which stores a communication program characterized by causing a computer of a communication device for supporting RDMA communication to execute, as a transmitting step, a packet transmitting step of, when a data transfer request is received, generating the RDMA packet from transfer data and speculatively and repeatedly transmitting the packet without inquiring the transfer destination about presence or absence of reception permission, and a transmission completion step of receiving a transfer completion notification from the transfer destination and normally terminating the packet transmission; and causing the computer to execute, as a receiving step, a transfer area control step of controlling transfer area control information including transfer permission or transfer unpermission with respect to a receiving area, a packet receiving step of, if transfer permission of the receiving area is determined by referencing the transfer area control information upon packet reception, transferring the received packet to the receiving area and changing the transfer permission of the receiving area to transfer unpermission, a packet discarding step of discarding the received packet if transfer unpermission of the receiving area is determined by referencing the transfer area control information upon packet reception, and a completion notifying step of recognizing transfer completion of the received packet with respect to the receiving area and transmitting a transfer completion notification.

32. A computer-readable storage medium which stores a communication program characterized by causing a computer of a communication device for supporting RDMA communication to execute, as a transmitting step, a packet transmitting step of, when a data transfer request is received, generating the RDMA packet from transfer data and speculatively transmitting the packet without inquiring the transfer destination about presence or absence of reception permission, and a transmission completion step of receiving a transfer completion notification from the transfer destination and normally terminating the packet transmission; and causing the computer to execute, as a receiving step, a transfer area control step of controlling transfer area control information including transfer permission or transfer unpermission with respect to a receiving area, a packet receiving step of, if transfer permission of the receiving area is determined by referencing the transfer area control information upon packet reception, transferring the received packet to the receiving area and changing the transfer permission of the receiving area to transfer unpermission, a buffer transfer step of, if transfer unpermission of the receiving area is determined by referencing the transfer area control information upon packet reception, transferring the received packet to a buffer area and recording the buffer transfer in the transfer area control information, a data moving step of, if transfer permission of the receiving area is determined after the buffer transfer, moving the data of the buffer area to the receiving area based on the record of the buffer transfer of the transfer area control information, and a completion notifying step of recognizing transfer completion of the received packet with respect to the receiving area and transmitting a transfer completion notification.

* * * * *

UNITED STATES PATENT AND TRADEMARK OFFICE
CERTIFICATE OF CORRECTION

PATENT NO. : 7,581,015 B2  
APPLICATION NO. : 11/475908  
DATED : August 25, 2009  
INVENTOR(S) : Kohta Nakashima et al.

Page 1 of 1

It is certified that error appears in the above-identified patent and that said Letters Patent is hereby corrected as shown below:

Title Page, Item (54) (Title), Line 3, change "SUPPORTS" to --SUPPORT--.

Title Page, Item (75) (Inventors), Line 1, change "Kota Nakashima" to --Kohta Nakashima--.

Column 1, Line 3, change "SUPPORTS" to --SUPPORT--.

Column 1, Line 6, change "Feb. 24," to --Mar. 24,--.

Signed and Sealed this

First Day of December, 2009

David J. Kappos
*Director of the United States Patent and Trademark Office*